United States Patent
Yang et al.

(10) Patent No.: US 7,960,487 B2
(45) Date of Patent: Jun. 14, 2011

(54) DUAL METALLOCENE CATALYSTS FOR POLYMERIZATION OF BIMODAL POLYMERS

(75) Inventors: Qing Yang, Bartlesville, OK (US); Kumudini C. Jayaratne, Groningen (NL); Michael D. Jensen, Laurel, MD (US); Max P. McDaniel, Bartlesville, OK (US); Joel L. Martin, Bartlesville, OK (US); Matthew G. Thorn, Mason, OH (US); Jerry T. Lanier, Bartlesville, OK (US); Tony R. Crain, Niotaze, KS (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 0 days.

(21) Appl. No.: 12/571,824

(22) Filed: Oct. 1, 2009

(65) Prior Publication Data

US 2010/0041842 A1    Feb. 18, 2010

Related U.S. Application Data

(62) Division of application No. 11/359,972, filed on Feb. 22, 2006, now Pat. No. 7,619,047.

(51) Int. Cl.
*C08F 4/02* (2006.01)
*C08F 4/6592* (2006.01)
*C08F 4/76* (2006.01)
*B01J 31/22* (2006.01)

(52) U.S. Cl. ........ 526/113; 526/114; 526/129; 526/160; 526/165; 526/943; 502/113; 502/120; 502/152

(58) Field of Classification Search .................. 526/114, 526/116, 129, 160, 165, 943, 113; 502/113, 502/120, 152
See application file for complete search history.

(56) References Cited

U.S. PATENT DOCUMENTS

| | | |
|---|---|---|
| 3,161,629 A | 12/1964 | Gorsich |
| 3,242,099 A | 3/1966 | Manyik et al. |
| 3,248,179 A | 4/1966 | Norwood |
| 4,060,480 A | 11/1977 | Reed |
| 4,452,910 A | 6/1984 | Hopkins et al. |
| 4,501,885 A | 2/1985 | Sherk et al. |
| 4,547,551 A | 10/1985 | Bailey et al. |
| 4,588,790 A | 5/1986 | Jenkins, III et al. |
| 4,794,096 A | 12/1988 | Ewen |
| 4,808,561 A | 2/1989 | Welborn |
| 4,892,851 A | 1/1990 | Ewen et al. |
| 4,939,217 A | 7/1990 | Stricklen |
| 5,036,034 A | 7/1991 | Ewen |
| 5,049,535 A | 9/1991 | Resconi et al. |
| 5,071,808 A | 12/1991 | Antberg et al. |
| 5,075,467 A | 12/1991 | Desobry |
| 5,162,278 A | 11/1992 | Razavi |
| 5,191,132 A | 3/1993 | Patsidis et al. |
| 5,210,352 A | 5/1993 | Alt et al. |
| 5,223,467 A | 6/1993 | Razavi |
| 5,347,026 A | 9/1994 | Patsidis et al. |
| 5,352,749 A | 10/1994 | Dechellis et al. |
| 5,376,611 A | 12/1994 | Shveima |
| 5,399,636 A | 3/1995 | Alt et al. |
| 5,401,817 A | 3/1995 | Palackal et al. |
| 5,416,228 A | 5/1995 | Ewen et al. |
| 5,420,320 A | 5/1995 | Zenk et al. |
| 5,436,304 A | 7/1995 | Griffin et al. |
| 5,436,305 A | 7/1995 | Alt et al. |
| 5,451,649 A | 9/1995 | Zenk et al. |
| 5,455,314 A | 10/1995 | Burns et al. |
| 5,483,014 A | 1/1996 | Turner et al. |
| 5,496,781 A | 3/1996 | Geerts et al. |
| 5,498,581 A | 3/1996 | Welch et al. |
| 5,534,473 A | 7/1996 | Welch et al. |
| 5,541,272 A | 7/1996 | Schmid et al. |
| 5,554,795 A | 9/1996 | Frey et al. |
| 5,563,284 A | 10/1996 | Frey et al. |
| 5,565,175 A | 10/1996 | Hottovy et al. |
| 5,565,592 A | 10/1996 | Patsidis et al. |
| 5,571,880 A | 11/1996 | Alt et al. |
| 5,575,979 A | 11/1996 | Hanson |
| 5,576,259 A | 11/1996 | Hasegawa et al. |
| 5,587,501 A | 12/1996 | Winter et al. |
| 5,594,078 A | 1/1997 | Welch et al. |
| 5,594,080 A | 1/1997 | Waymouth et al. |
| 5,631,203 A | 5/1997 | Welch et al. |
| 5,631,335 A | 5/1997 | Alt et al. |
| 5,646,322 A | 7/1997 | Van Beek et al. |
| 5,654,454 A | 8/1997 | Peifer et al. |
| 5,668,230 A | 9/1997 | Schertl |
| 5,700,748 A | 12/1997 | Murray |
| 5,705,578 A | 1/1998 | Peifer |

(Continued)

FOREIGN PATENT DOCUMENTS

DE    1 959 322    11/1969

(Continued)

OTHER PUBLICATIONS

International Search Report and Written Opinion,.PCT/US07/062555, Aug. 2, 2007.11 pages. International Search Report, PCT/US2006/032542, Aug. 9, 2007, 8 pages.
Alt et al., J. Organomet. Chem., 1998, 558, 111-121.
Alt, H.G. et al., "C1-Bridged Fluorenylidene Cyclopentadienylidene . . . ", Journal of Organometallic Chemistry, vol. 568. pp. 87-112 (1998).
Alt, H.G. et al., "C1-verbrijckte Fluorenyliden-Indenylidenkornplexe des Typs . . . ", Journal of Organometallic Chemistry vol. 562, pp. 153-181 (1998).

(Continued)

*Primary Examiner* — Caixia Lu
(74) *Attorney, Agent, or Firm* — Merchant & Gould, P.C.

(57) ABSTRACT

This invention relates to catalyst compositions, methods, and polymers encompassing at least one first Group 4 metallocene compound comprising bridging $\eta^5$-cyclopentadienyl-type ligands, in combination with at least one second Group 4 metallocene with non-bridging $\eta^5$-cyclopentadienyl-type ligands, typically in combination with at least one cocatalyst, and at least one activator. The compositions and methods disclosed herein provide ethylene polymers with a bimodal molecular weight distribution.

29 Claims, 3 Drawing Sheets

U.S. PATENT DOCUMENTS

| | | | |
|---|---|---|---|
| 5,705,579 A | 1/1998 | Hawley et al. |
| 5,714,425 A | 2/1998 | Chabrand et al. |
| 5,714,555 A | 2/1998 | Chabrand et al. |
| 5,719,241 A | 2/1998 | Razavi et al. |
| 5,780,659 A | 7/1998 | Schmid et al. |
| 5,807,938 A | 9/1998 | Kaneko et al. |
| 5,854,363 A | 12/1998 | Jung et al. |
| 5,866,497 A | 2/1999 | Murray |
| 5,886,202 A | 3/1999 | Jung et al. |
| 5,906,955 A | 5/1999 | Humura et al. |
| 5,907,021 A | 5/1999 | Turner et al. |
| 5,919,983 A | 7/1999 | Rosen et al. |
| 5,942,459 A | 8/1999 | Sugano et al. |
| 6,034,187 A | 3/2000 | Maehama et al. |
| 6,107,230 A | 8/2000 | McDaniel et al. |
| 6,114,477 A | 9/2000 | Merrill et al. |
| 6,150,544 A | 11/2000 | Seki et al. |
| 6,165,929 A | 12/2000 | McDaniel et al. |
| 6,169,151 B1 | 1/2001 | Waymouth et al. |
| 6,174,981 B1 | 1/2001 | Bergmeister et al. |
| 6,180,736 B1 | 1/2001 | Muhle et al. |
| 6,187,880 B1 | 2/2001 | Welch et al. |
| 6,201,077 B1 | 3/2001 | Bergmeister et al. |
| 6,204,346 B1 | 3/2001 | Bergmeister et al. |
| 6,225,425 B1 | 5/2001 | Dolle et al. |
| 6,239,235 B1 | 5/2001 | Hottovy et al. |
| 6,262,191 B1 | 7/2001 | Hottovy et al. |
| 6,262,201 B1 | 7/2001 | Welch et al. |
| 6,268,447 B1 | 7/2001 | Murray et al. |
| 6,274,684 B1 | 8/2001 | Loveday et al. |
| 6,291,699 B1 | 9/2001 | Birmingham |
| 6,294,494 B1 | 9/2001 | McDaniel et al. |
| 6,300,271 B1 | 10/2001 | McDaniel et al. |
| 6,300,451 B1 | 10/2001 | Mehta et al. |
| 6,316,553 B1 | 11/2001 | McDaniel et al. |
| 6,340,651 B1 | 1/2002 | Litch et al. |
| 6,340,652 B1 | 1/2002 | Sugano et al. |
| 6,355,594 B1 | 3/2002 | McDaniel et al. |
| 6,376,415 B1 | 4/2002 | McDaniel et al. |
| 6,391,816 B1 | 5/2002 | McDaniel et al. |
| 6,395,666 B1 | 5/2002 | McDaniel et al. |
| 6,462,161 B1 | 10/2002 | Cady et al. |
| 6,469,188 B1 | 10/2002 | Miller |
| 6,482,905 B1 | 11/2002 | Schmidt et al. |
| 6,489,263 B2 | 12/2002 | Murray et al. |
| 6,509,427 B1 | 1/2003 | Welch et al. |
| 6,515,086 B1 | 2/2003 | Razavi |
| 6,524,987 B1 | 2/2003 | Collins et al. |
| 6,541,413 B1 | 4/2003 | Razavi et al. |
| 6,548,441 B1 | 4/2003 | McDaniel et al. |
| 6,632,894 B1 | 10/2003 | McDaniel et al. |
| 6,667,274 B1 | 12/2003 | Hawley et al. |
| 6,693,153 B2 | 2/2004 | Miller et al. |
| 6,750,302 B1 | 6/2004 | McDaniel et al. |
| 6,833,415 B2 | 12/2004 | Kendrick et al. |
| 6,897,176 B2 | 5/2005 | Nakayama |
| 6,939,928 B1 | 9/2005 | Kawai et al. |
| 6,982,306 B2 | 1/2006 | Martin et al. |
| 7,026,494 B1 | 4/2006 | Yang et al. |
| 7,041,617 B2 | 5/2006 | Jensen et al. |
| 7,094,857 B2 | 8/2006 | Sukhadia et al. |
| 7,119,153 B2 | 10/2006 | Jensen et al. |
| 7,148,298 B2 | 12/2006 | Jensen et al. |
| 7,226,886 B2 | 6/2007 | Jayaratne et al. |
| 7,312,283 B2 | 12/2007 | Martin et al. |
| 7,393,965 B2 | 7/2008 | Tohi et al. |
| 7,396,888 B2 | 7/2008 | Razavi |
| 7,517,939 B2 | 4/2009 | Yang et al. |
| 7,521,572 B2 | 4/2009 | Jayaratne et al. |
| 7,619,047 B2 | 11/2009 | Yang et al. |
| 7,652,160 B2 | 1/2010 | Yang et al. |
| 7,732,542 B2 | 6/2010 | Yang et al. |
| 2002/0169072 A1 | 11/2002 | Nakayama |
| 2004/0152591 A1 | 8/2004 | Jin et al. |
| 2005/0113243 A1 | 5/2005 | Thorn et al. |
| 2005/0119425 A1 | 6/2005 | Razavi |
| 2005/0148460 A1 | 7/2005 | Marin et al. |
| 2005/0153830 A1 | 7/2005 | Jensen et al. |
| 2005/0159300 A1 | 7/2005 | Jensen et al. |
| 2005/0203261 A1 | 9/2005 | Sukhadia et al. |
| 2005/0288461 A1 | 12/2005 | Jensen et al. |
| 2007/0043176 A1 | 2/2007 | Martin |
| 2007/0060726 A1 | 3/2007 | Razavi |
| 2007/0073013 A1 | 3/2007 | Razavi et al. |
| 2007/0179044 A1 | 8/2007 | Yang et al. |
| 2007/0197374 A1 | 8/2007 | Yang et al. |
| 2007/0232483 A1 | 10/2007 | Yang et al. |
| 2008/0004460 A1 | 1/2008 | Jayaratne et al. |
| 2009/0198078 A1 | 8/2009 | Jayaratne et al. |
| 2009/0281342 A1 | 11/2009 | Yang et al. |

FOREIGN PATENT DOCUMENTS

| | | |
|---|---|---|
| EP | 0 666 267 A2 | 8/1995 |
| EP | 0 729 978 A1 | 9/1996 |
| EP | 0 853 086 A1 | 7/1998 |
| EP | 0 881 236 A1 | 12/1998 |
| EP | 1 201 711 A1 | 5/2002 |
| EP | 1 325 899 | 7/2003 |
| EP | 1 405 866 A1 | 4/2004 |
| JP | 9-59289 | 3/1997 |
| WO | WO 99/14219 A1 | 3/1999 |
| WO | WO 99/48934 A1 | 9/1999 |
| WO | WO 99/60033 A1 | 11/1999 |
| WO | WO 00/24792 | 5/2000 |
| WO | WO 01/23433 A1 | 4/2001 |
| WO | WO 01/23434 A1 | 4/2001 |
| WO | WO 01/41920 A1 | 6/2001 |
| WO | WO 01/44309 A1 | 6/2001 |
| WO | WO 01/58587 A1 | 8/2001 |
| WO | WO 01/83498 A1 | 11/2001 |
| WO | WO 01/90239 A1 | 11/2001 |
| WO | WO 03/008468 A1 | 1/2003 |
| WO | WO 03/020821 | 3/2003 |
| WO | WO 2004/087770 A1 | 10/2004 |
| WO | WO 2006/008127 | 1/2006 |
| WO | WO 2007/024773 A1 | 3/2007 |

OTHER PUBLICATIONS

Alt, H.G. et al., "Syndiospezifische Polymerisation von Propylen . . . , Journal of Organometallic Chemistry". vol. 522. pp. 39-54 (1996).

Alt, Helmut G., et al., "ansa-Metallocene complexes of type . . .", Journal of Organometallic Chemistry. 1998. vol. 562, pp. 229-253.

Amor, J. et al., "Synthesis of bis(tert-butyl) cyclopentaidienyl Derivatives of Titanium and Zirconium . . . ", J. Organmetallic Chem., vol. 497, pp. 127-131 (1995).

Arnett, R.L. et al., "Zero-Shear Viscosity of Some Ethyl Branched Paraffinic Model Polymers", Journal of Physical Chemistry, vol. 84, No. 6, pp. 649-652 (Mar. 31, 1980).

Das, P.K., "Computational Chemistry of Metallocene Catalyzed Olefin Polymerization", 21.9 Century Syrnp. S.W. Regional American Chemical Society Meeting (Oct. 25-28, 2003—OK).

Deppner, M., "Substituted Idenyl Complexes of Zirconium as Catalysts for Olefin Polymerization", Dissertation, Univ. of Bayreauth—Germany (Feb. 1998).

E.I. Negishi, et al., "Product Class 11: Organometallic Complexes of Zirconium and Hafnium", Science of Synthesis, 2, 681-848 2003.

Erker, G et al., "Convenient Route to Monocyclopentadienylzirconiurn (IV) Complexes", Inorg. Chem., vol. 21, pp. 1277-1278 (1982).

Gladysz, J.A. et al., "Reactions of Organocyclopropanes and Spirocycles with Metal Atoms", Chemical Abstracts Service, Journal of the American Chemical Society 101 (1 2), 3388-90 CODEN: JACSAT; ISSN:0002-7863 1979.

Hitchcock, P. et al., "Ligand Redistribution Reactions As a Route to Cyclopentadienyl- or 1-aza-allylzirconium (IV) . . . ". Polyhedron, vol. 14, No. 19, pp. 2745-2752 (1995).

Jany, G., et al., Para-fluro benzyl Substituted bis(indenyl)metallocene as Catalysts Precursors in Ethene Polymerization, J. Organo. Chem., vol. 533, pp. 173-178 (Feb. 1998).

Jung, M., "ansa Metallocene Complexes of Zirconium as Catalysts for the Olefin Polymerization", Dissertation, Univ. of Bayreuth-Germany (1997).

Kajigaeshi, S et al., Selective Preparation of Fluorene Derivatives Using the t-Butyl Function As a Positional . . . , The Chem. Society of Japan, vol. 59, p. 97 (1986).

Kokko, E., Influence of the Catalyst and Polymerization Conditions on the Long-Chain Branching of Metallocene . . . 'I, Journal of Polymer Science, vol. 38, pp. 376-388 (2000).

Kolodka, E. et al., "Long Chain Branching in Slurry Polymerization of Ethylene With Zirconocene DichlorideIModified Methy . . . ", Polymer. vol. 41, No. 11, pp. 3985-3991 (2000).

Koppl, A. "Aluminoxane Based Immobilized Cocatalysts for Heterogeneous Olefin Polymerization", Disseration. Univ. of Bayreauth—Germany (Dec. 13, 1997—updated).

Koppl, A. et al., "Heterogeneous Metallocene Catalysts for Ethlene Polymerization", Journal of Molecular Catalysis A: Chemical, vol. 165, pp. 23-32 (2001).

Kravchenko, R. et al., "Propylene Polymerization with Chiral and Archiral Unbridged 2-Arylindene Metallocences", Organometallics, vol. 16, pp. 3635-3639 (1997).

Licht, A. et al., "Synthesis of Novel Metallacyclic Zirconocene Complexes From w-Alkenyl-Functionalized Zirconocene Dichloride Complexes and Their Use in the a-Olefin Polymerization", J. Organometallic Chem., vol. 648 (2002) 134-1 38.

Licht, E. et al., "Phenylalkyl-substituted zirconocene dichloride complexes as Catalysts Precursors for Homogenous . . . ", J. Organometallic Chem., vol. 599, pp. 275-287 (2000).

Licht, E., "Metallacyclic Zirconocene Complexes as Catlaysts for Homogenous and Heterogeneous Olefin . . . ", Dissertation, Univ. of Bayreauth—Germany (May 14, 1998—updated).

Llinás, G. et al., "(CSMe5) SiMe3 as a Mild and Effective Reagent for Transfer of the CSMe5 Ring: an Improved Route . . . ". J. Organometallic Chem.. vol. 304. pp. 37-40 (1988).

Lund, E. et al., "Rapid and Efficient Procedures for the Synthesis of Monocyclopentadienyl Complexes of Hafnium and Zirconium", Organometallics. vol. 9, pp. 2426-2427 (1990).

Malmberg, A et al., "Long-Chain Branching in Metallocene-Catalyzed Polyethylenes Investigated by Low Oscillatory Shear . . . ", Macromolecules, vol. 35, pp. 1038-1048 (2002).

Martin, A. et al., "Molecular Structure of trichloro(n5-pentamethylcyclopentadienyl) zirconium (IV)", J. Organometallic Chem., vol. 480, pp. C10-C11 (1994).

Naga, N. et al., "Stereochemical Control in Propylene Polymerizatioin with Non-Bridged Metallocene Dichloride/Methylaluminoxane", Polymer, vol. 39, No. 13, pp. 2703-2708 (1998).

P. Renaut, et al., "Cyclopentadienylhafnium Trichloride, its Synthesis and Use to Prepare a Chiral Hafnium Compound", Journal of Organometallic Chemisty, 127 (1977) C35-C36.

Peifer, PhD., B., Self-Immobilizing Metallocene Catalysts for the Polymerization of Olefins, Dissertation, Univ. of Bayreuth—Germany (1995).

Podzimek, S., "A Review of the Analysis of Branched Polymers by SEC-MALS", American Laboratory, (Jan. 2002), pp. 38-45.

R. Poli, "Monocyclopentadienyl Halide Complexes of the D- and F-Block Elements", Chem. Rev. 1991, 91, 509-551.

Sandman, D. et al., "5,6:11,12-Bis(Ditelluro)Tetracene: Syntheses, Molecular, and Supramolecular Properties", Organometallics, vol. 1, pp. 739-742 (1982).

Shida. M, et al., "Correlation of Low Density Polyethylene Rhological Measurements . . . ", Polymer Engineering and Science, vol. 17. No. 11, pp. 769774 (Nov. 19, 1977).

Sitzmann, H. et al., "Titan-, Zirconium-Und Hafniumkomplexe Mit 1,2,4-Tri-Tert-Bytyl-Cyclopentadienyl . . . ", Chem. Ber., vol. 127, pp. 3-9 (1994).

Sukhadia, A.M., "The Complex Effects of Long Chain Branching on the Blown Film Performance of LLDPE Resins", Antec Annual Conference (May 5-9, 2002—California).

Villar, M.A. et al., "Rheological Characterization of Molten Ethylene-Alpha-Olefin Copolymers . . . ", Polymer, vol. 42. pp. 9269-9179 (2001).

Walter. P. et al., "Influence of Zirconocene Structure and Propene Content on Melt Rheology of Polyethene and EthenelPropene . . . " Polymer Bulletin, vol. 46, pp. 205-213 (2001).

Wengrovius, J. et al., "Attempts to Prepare Alkylidene Zirconium Complexes by Hydrogen Atom Abstraction", J. Organometallic Chem., vol. 205, pp. 319-327 (1981 ).

Winter, C. et al.. "Cyclopentadienylmetal Trichloride Formation versus Metallocene Dichloride Formaton in the Reactions . . . ", Organometallics, vol. 10, pp. 210-214 (1991).

Zenk, R., Dissertation, University of Bayreuth (Germany 1994).

Zhang et al., J. Polym. Sci: Part A, Polym. Chem., 2005, 43, 1261-1269.

Cotton et al., Advanced Inorganic Chemistry, $6^{th}$ Ed., Wiley-Interscience, 1999, 4 pages.

Hawley's Condensed Chemical Dictionary, $11^{th}$ Ed., John Wiley & Sons, 1995, 3 pages.

Pinnavaia, "Intercalated Clay Catalysts," Science, 1983, vol. 220, No. 4595, pp. 365-371.

Thomas, "Sheet Silicate Intercalates: New Agents for Unusual Chemical Conversions," Intercalation Chemistry, 1982, pp. 55-99.

Stone et al., "An Exceptionally Simple and Efficient Method for the Preparation of a Wide Variety of Fulvenes," J. Org. Chem., 1984, 49(11), pp. 1849-1853.

US 7,960,487 B2

DUAL METALLOCENE CATALYSTS FOR POLYMERIZATION OF BIMODAL POLYMERS

REFERENCE TO RELATED APPLICATIONS

This application is a divisional application of U.S. patent application Ser. No. 11/359,972, filed on Feb. 22, 2006, now U.S. Pat. No. 7,619,047, which is incorporated herein by reference in its entirety.

TECHNICAL FIELD OF THE INVENTION

This invention relates to the field of organometal compositions, olefin polymerization catalyst compositions, methods for the polymerization and copolymerization of olefins using a catalyst composition, and polyolefins.

BACKGROUND OF THE INVENTION

It is known that mono-1-olefins (α-olefins), including ethylene, can be polymerized with catalyst compositions employing titanium, zirconium, vanadium, chromium, or other metals, often combined with a solid oxide and in the presence of cocatalysts. These catalyst compositions can be useful for both homopolymerization of ethylene, as well as copolymerization of ethylene with comonomers such as propylene, 1-butene, 1-hexene, or other higher α-olefins. Therefore, there exists a constant search to develop new olefin polymerization catalysts, catalyst activation processes, and methods of making and using catalysts that will provide enhanced catalytic activities and polymeric materials tailored to specific end uses.

A variety of polyethylene (PE) resins can be used to produce high stiffness pipe used in water, gas, and other fluid transport applications. Polyethylene pipe classified as PE-100, MRS 10, or ASTM D3350 typical cell classification 345566C is desirable for use under conditions requiring higher pressure ratings. To obtain a PE-100 classification, PE-100 pipe is required to meet certain standards specifying stiffness, resistance to slow crack growth, resistance to chemical attack, and low-temperature toughness (expressed as rapid crack propagation). Further, such pipe must meet a deformation standard that is determined under pressure at elevated temperatures, and exhibit toughness for applications in which the pipe is buried underground or used to transport coarse or abrasive slurries.

Accordingly, there is also a need for a resin and a PE-100 pipe made therefrom that has improved physical properties and impact resistance properties. With conventional processes and resins formed using metallocene catalyst systems, there is a trade off between high stiffness and high environmental stress cracking resistance (ESCR). While either high stiffness or high ESCR items can be manufactured, conventional processes do not produce items having both relatively high stiffness and relatively high ESCR.

SUMMARY OF THE INVENTION

This invention encompasses catalyst compositions, methods for preparing catalyst compositions, methods for polymerizing olefins, and ethylene polymers and copolymers. In one aspect, the present invention generally relates to a catalyst composition including at least two different metallocene compounds, optionally at least one organoaluminum compound; and at least one activator. In one aspect, the activator can be an "activator-support", which is typically used in combination with at least one organoaluminum co-catalyst. The dual metallocene catalyst system according to this disclosure can produce a polyolefin having a bimodal or multimodal molecular weight distribution. The resulting polymers feature a good balance of stiffness and slow crack growth resistance. Additionally, the polymers produced according to the present invention have good impact strength. Thus, in accordance with the present invention, the two metallocene compounds can be selected such that the polymers produced therefrom have two distinctly different molecular weights.

In one aspect of the present invention, for example, it was found that certain metallocene-based catalyst systems could produce high molecular weight polyethylene with low levels of LCB, even under relatively high temperature conditions. Useful metallocenes in this aspect of the invention include, but are not limited to, tightly-bridged, ansa-metallocenes that comprise a pendant alkenyl (olefin-containing) group attached to at least one of the cyclopentadienyl-type moieties of the tightly-bridged ligand, and also comprises one or two aryl groups, particularly one or two phenyl groups, bonded to the bridging atom of the tightly-bridged ligand. These metallocene compounds generally are referred to herein as the "first" metallocenes.

In another aspect of this invention, for example, it was found that certain other metallocene-based catalyst systems were more responsive to hydrogen than the first metallocene, and generally produced a low molecular weight polyethylene resin. Useful metallocenes in this aspect of the invention include, but are not limited to, those metallocenes comprising unbridged $\eta^5$-cyclopentadienyl-type ligands selected from: 1) two optionally substituted cyclopentadienyl ligands; 2) two optionally substituted indenyl ligands; or 3) one substituted cyclopentadienyl and one optionally substituted indenyl ligand. These metallocene compounds generally are referred to herein as the "second" metallocenes. In a further aspect, tailoring of resin properties can be achieved using a catalyst composition that includes more than one first metallocene, more than one second metallocene, or both more than one first and more than one second metallocene.

Thus, in one aspect, the present invention encompasses a catalyst composition comprising the contact product of: at least one first metallocene, for example, tightly-bridged ansa-metallocene compounds containing a pendant olefin-containing moiety attached to at least one of the cyclopentadienyl-type ligands and one or two aryl groups bonded to the bridging atom of the bridging ligand; at least one second metallocene, for example, unbridged metallocenes comprising two optionally substituted cyclopentadienyl ligands, two optionally substituted indenyl ligands, or one substituted cyclopentadienyl and one optionally substituted indenyl ligand; optionally, at least one organoaluminum compound; and at least one activator. In one aspect, the at least one activator can be an activator-support, which can be selected from, or which can comprise, a solid oxide treated with an electron-withdrawing anion, a layered mineral, an ion-exchangeable activator-support, or any combination thereof. In another aspect, the at least one activator can be selected from, or can comprise, an organoaluminoxane compound, an organoboron compound, an organoborate compound, or any combination of any of these activators. Thus, in this aspect, this invention encompasses a composition of matter, a catalyst composition for polymerizing olefins, a method of preparing a catalyst composition, a method of polymerizing olefins, new polymers and copolymers of ethylene, and the like, in each case encompassing at least one first metallocene, at least one second metallocene, optionally at least one organoaluminum compound, and at least one activator, wherein each of these components is defined as herein.

In another aspect, this invention comprises the contact product of at least one first metallocene, for example, tightly-bridged ansa-metallocene compounds containing a pendant olefin-containing moiety attached to at least one of the cyclopentadienyl-type ligands and one or two aryl groups bonded to the bridging atom of the bridging ligand; at least one second metallocene, for example, an unbridged metallocene comprising two optionally substituted cyclopentadienyl ligands, two optionally substituted indenyl ligands, or one substituted cyclopentadienyl and one optionally substituted indenyl ligand; at least one activator-support; and at least one co-catalyst, for example, at least one organoaluminum compound.

Still another aspect of this invention provides a catalyst composition of this invention that can comprise the contact product of: 1) at least one first metallocene; 2) at least one second metallocene; 3) optionally, at least one organoaluminum compound; and 4) at least one activator, wherein:

a) the at least one first metallocene comprises an ansa-metallocene having the formula:

    (M1-A), wherein $M^1$ is titanium, zirconium, or hafnium;

($X^1$) and ($X^2$) are independently a substituted cyclopentadienyl, a substituted indenyl, or a substituted fluorenyl; one substituent on ($X^1$) and ($X^2$) is a bridging group having the formula $ER^1R^2$, wherein E is a carbon atom, a silicon atom, a germanium atom, or a tin atom, and E is bonded to both ($X^1$) and ($X^2$), and wherein $R^1$ and $R^2$ are independently an alkyl group or an aryl group, either of which having up to 12 carbon atoms, or hydrogen, wherein at least one of $R^1$ and $R^2$ is an aryl group;

at least one substituent on ($X^1$) or ($X^2$) is a substituted or an unsubstituted alkenyl group having up to 12 carbon atoms;

($X^3$) and ($X^4$) are independently: 1) F, Cl, Br, or I; 2) a hydrocarbyl group having up to 20 carbon atoms, H, or $BH_4$; 3) a hydrocarbyloxide group, a hydrocarbylamino group, or a trihydrocarbylsilyl group, any of which having up to 20 carbon atoms; or 4) $OBR^A_2$ or $SO_3R^A$, wherein $R^A$ is an alkyl group or an aryl group, any of which having up to 12 carbon atoms; and any additional substituent on the substituted cyclopentadienyl, substituted indenyl, substituted fluorenyl, or substituted alkenyl group is independently an aliphatic group, an aromatic group, a cyclic group, a combination of aliphatic and cyclic groups, an oxygen group, a sulfur group, a nitrogen group, a phosphorus group, an arsenic group, a carbon group, a silicon group, or a boron group, any of which having from 1 to 20 carbon atoms; a halide; or hydrogen;

b) the at least one second metallocene comprises an unbridged metallocene having the formula:

i) $(X^5)(X^6)(X^7)(X^8)M^2$    (M2-A), wherein $M^2$ is titanium, zirconium, or hafnium;

($X^5$) and ($X^6$) are independently a cyclopentadienyl, an indenyl, a substituted cyclopentadienyl, or a substituted indenyl;

($X^7$) and ($X^8$) are independently: 1) F, Cl, Br, or I; 2) a hydrocarbyl group having up to 20 carbon atoms, H, or $BH_4$; 3) a hydrocarbyloxide group, a hydrocarbylamino group, or a trihydrocarbylsilyl group, any of which having up to 20 carbon atoms; or 4) $OBR^B_2$ or $SO_3R^B$, wherein $R^B$ is an alkyl group or an aryl group, any of which having up to 12 carbon atoms; and any substituent on the substituted cyclopentadienyl or substituted indenyl is independently an aliphatic group, an aromatic group, a cyclic group, a combination of aliphatic and cyclic groups, an oxygen group, a sulfur group, a nitrogen group, a phosphorus group, an arsenic group, a carbon group, a silicon group, or a boron group, any of which having from 1 to 20 carbon atoms; a halide; or hydrogen;

ii) $(X^9)(X^{10})(X^{11})(X^{12})M^3$    (M3-A), wherein $M^3$ is titanium, zirconium, or hafnium;

($X^9$) is a substituted cyclopentadienyl group, wherein one substituent is an aliphatic group, an aromatic group, or a combination of aliphatic and cyclic groups, any of which having up to 20 carbon atoms;

($X^{10}$) is a substituted indenyl group, wherein one substituent is an aliphatic group, an aromatic group, or a combination of aliphatic and cyclic groups, any of which having up to 20 carbon atoms;

($X^{11}$) and ($X^{12}$) are independently: 1) F, Cl, Br, or I; 2) a hydrocarbyl group having up to 20 carbon atoms, H, or $BH_4$; 3) a hydrocarbyloxide group, a hydrocarbylamino group, or a trihydrocarbylsilyl group, any of which having up to 20 carbon atoms; or 4) $OBR^C_2$ or $SO_3R^C$, wherein $R^C$ is an alkyl group or an aryl group, any of which having up to 12 carbon atoms; and any additional substituent on the substituted cyclopentadienyl or substituted indenyl is independently an aliphatic group, an aromatic group, a cyclic group, a combination of aliphatic and cyclic groups, an oxygen group, a sulfur group, a nitrogen group, a phosphorus group, an arsenic group, a carbon group, a silicon group, or a boron group, any of which having from 1 to 20 carbon atoms; a halide; or hydrogen; or iii) any combination thereof;

c) the at least one organoaluminum compound comprises a compound having the formula:

wherein ($X^{13}$) is a hydrocarbyl having from 1 to 20 carbon atoms; ($X^{14}$) is an alkoxide or an aryloxide, any of which having from 1 to 20 carbon atoms, halide, or hydride; and n is a number from 1 to 3, inclusive; and d) the at least one activator is selected independently from:

i) an activator-support selected from a solid oxide treated with an electron-withdrawing anion, a layered mineral, an ion-exchangeable activator-support, or any combination thereof, ii) an organoaluminoxane compound;

iii) an organoboron compound or an organoborate compound; or iv) any combination thereof.

In one aspect of this invention, the at least one organoaluminum compound can be optional when at least one of the following conditions is met:

1) when: a) at least one of ($X^3$) and ($X^4$) is a hydrocarbyl group having up to 20 carbon atoms, H, or $BH_4$; b) at least one of ($X^7$) and ($X^8$) is a hydrocarbyl group having up to 20 carbon atoms, H, or $BH_4$; and c) at least one of ($X^{11}$) and ($X^{12}$) is a hydrocarbyl group having up to 20 carbon atoms, H, or $BH_4$;

2) when the at least one activator comprises at least one organoaluminoxane compound; or 3) when both conditions 1 and 2 are met.

Another aspect of this invention provides a composition that comprises the contact product of: 1) at least one first metallocene; 2) at least one second metallocene; and 3) at least one activator, wherein each of these components is as disclosed immediately above. In still another aspect of this composition, the contact product can further comprise: 4) at least one organoaluminum compound having the formula $Al(X^{13})_n(X^{14})_{3-n}$, as provide above. In another aspect of this composition, the contact product can further comprise: 5) an ionizing ionic compound, as disclosed herein.

Yet another aspect of this invention provides a catalyst composition that can comprise the contact product of: 1) at least one first metallocene; 2) at least one second metallocene; 3) optionally, at least one organoaluminum compound; and 4) at least one activator, wherein:

a) the at least one first metallocene comprises an ansa-metallocene having the formula (M1-A) provided herein;

b) the at least one second metallocene comprises an unbridged metallocene having the formula:

i) $(X^5)(X^6)(X^7)(X^8)M^2$ (M2-B), wherein

M2 is zirconium or hafnium;

$(X^5)$ and $(X^6)$ are independently a cyclopentadienyl, an indenyl, a substituted cyclopentadienyl, or a substituted indenyl;

$(X^7)$ and $(X^8)$ are independently a hydrocarbyl group having up to 12 carbon atoms, H, $BH_4$, or a halide; and any substituent on the substituted cyclopentadienyl or substituted indenyl is independently an aliphatic group, an aromatic group, a cyclic group, a combination of aliphatic and cyclic groups, any of which having up to 20 carbon atoms;

ii) $(X^9)(X^{10})(X^{11})(X^{12})M^3$ (M3-B), wherein $M^3$ is zirconium or hafnium;

$(X^9)$ is a substituted cyclopentadienyl group, wherein any substituent is independently a linear or branched alkyl group having up to 12 carbon atoms;

$(X^{10})$ is a substituted indenyl group, wherein any substituent is independently an aliphatic group, an aromatic group, or a combination of aliphatic and cyclic groups, any of which having up to 20 carbon atoms; and $(X^{11})$ and $(X^{12})$ are independently a hydrocarbyl group having up to 12 carbon atoms, H, $BH_4$, or a halide; or iii) any combination thereof, c) the at least one organoaluminum compound comprises a compound having the formula:

$Al(X^{13})_n(X^{14})_{3-n}$, wherein $(X^{13})$ is a hydrocarbyl having from 1 to 20 carbon atoms; $(X^{14})$ is an alkoxide or an aryloxide, any of which having from 1 to 20 carbon atoms, halide, or hydride; and n is a number from 1 to 3, inclusive; and d) the at least one activator is selected independently from:

i) an activator-support selected from a solid oxide treated with an electron-withdrawing anion, a layered mineral, an ion-exchangeable activator-support, or any combination thereof, ii) an organoaluminoxane compound;

iii) an organoboron compound or an organoborate compound; or iv) any combination thereof.

Also in this aspect of the invention, the at least one organoaluminum compound can be optional when at least one of the following condions is met:

1) when: a) at least one of $(X^3)$ and $(X^4)$ is a hydrocarbyl group having up to 20 carbon atoms, H, or $BH_4$; b) at least one of $(X^7)$ and $(X^8)$ is a hydrocarbyl group having up to 20 carbon atoms, H, or $BH_4$; and c) at least one of $(X^{11})$ and $(X^{12})$ is a hydrocarbyl group having up to 20 carbon atoms, H, or $BH_4$;

2) when the at least one activator comprises at least one organoaluminoxane compound; or 3) when both conditions 1 and 2 are met.

While not intending to be bound by theory, it will be recognized by one of ordinary skill that a metallocene-based composition that exhibits catalytic polymerization activity typically comprises the contact product of: 1) at least one metallocene component; 2) a co-catalyst component that provides an activatable ligand such as an alkyl or hydride ligand to the metallocene, when the metallocene compound or compounds do not already comprise such a ligand; and 3) an activator component. In some instances, one component can function as both the component that provides an activatable ligand and the activator component, for example, an organoaluminoxane can function in both ways. In other cases, these two functions can be provided by two separate components, such as an organoaluminum compound that can provide an activatable alkyl ligand to the metallocene, and a solid oxide treated with an electron-withdrawing anion that can provide the activator function. Further, in some instances, the metallocene compound can already comprise an activatable ligand such as an alkyl ligand, therefore, a component that provides an activatable ligand is not required, but can be an optional component of the contact product. Therefore, by designating the at least one organoaluminum compound as "optional" in the contact product, it is intended to reflect that the organoaluminum compound can be optional when it is not necessary to impart catalytic activity to the composition comprising the contact product, as understood by one of ordinary skill.

Thus, a further aspect of this invention provides a catalyst composition comprising the contact product of: 1) at least one first metallocene; 2) at least one second metallocene; and 3) at least one activator, wherein:

a) the at least one first metallocene comprises an ansa-metallocene having the formula:

$(X^1)(X^2)(X^3)(X^4)M^1$ (M1-B), wherein $M^1$ is titanium, zirconium, or hafnium;

$(X^1)$ and $(X^2)$ are independently a substituted cyclopentadienyl, a substituted indenyl, or a substituted fluorenyl;

one substituent on $(X^1)$ and $(X^2)$ is a bridging group having the formula $ER^1R^2$, wherein E is a carbon atom, a silicon atom, a germanium atom, or a tin atom, and E is bonded to both $(X^1)$ and $(X^2)$, and wherein $R^1$ and $R^2$ are independently an alkyl group or an aryl group, either of which having up to 12 carbon atoms, or hydrogen, wherein at least one of $R^1$ and $R^2$ is an aryl group;

at least one substituent on $(X^1)$ or $(X^2)$ is a substituted or an unsubstituted alkenyl group having up to 12 carbon atoms;

$(X^3)$ and $(X^4)$ are independently: 1) F, Cl, Br, or I; 2) a hydrocarbyl group having up to 20 carbon atoms, H, or $BH_4$; 3) a hydrocarbyloxide group, a hydrocarbylamino group, or a trihydrocarbylsilyl group, any of which having up to 20 carbon atoms; or 4) $OBR^4_2$ or $SO_3R^4$, wherein $R^4$ is an alkyl group or an aryl group, any of which having up to 12 carbon atoms; wherein at least one $(X^3)$ and $(X^4)$ is a hydrocarbyl group having up to 20 carbon atoms, H, or $BH_4$; and any additional substituent on the substituted cyclopentadienyl, substituted indenyl, substituted fluorenyl, or substituted alkenyl group is independently an aliphatic group, an aromatic group, a cyclic group, a combination of aliphatic and cyclic groups, an oxygen group, a sulfur group, a nitrogen group, a phosphorus group, an arsenic group, a carbon group, a silicon group, or a boron group, any of which having from 1 to 20 carbon atoms; a halide; or hydrogen;

b) the at least one second metallocene comprises an unbridged metallocene having the formula:

i) $(X^5)(X^6)(X^7)(X^8)M^2$ (M2-C), wherein $M^2$ is titanium, zirconium, or hafnium;

$(X^5)$ and $(X^6)$ are independently a cyclopentadienyl, an indenyl, a substituted cyclopentadienyl, or a substituted indenyl;

$(X^7)$ and $(X^8)$ are independently: 1) F, Cl, Br, or I; 2) a hydrocarbyl group having up to 20 carbon atoms, H, or $BH_4$; 3) a hydrocarbyloxide group, a hydrocarbylamino group, or a trihydrocarbylsilyl group, any of which having up to 20 carbon atoms; or 4) $OBR^A_2$ or $SO_3R^A$, wherein $R^A$ is an alkyl group or an aryl group, any of which having up to 12 carbon atoms; wherein at least one $(X^7)$ and $(X^7)$ is a hydrocarbyl group having up to 20 carbon atoms, H, or $BH_4$; and any substituent on the substituted cyclopentadienyl or substituted indenyl is independently an aliphatic group, an aromatic group, a cyclic group, a combination of aliphatic and cyclic groups, an oxygen group, a sulfur group, a nitrogen group, a phosphorus group, an arsenic group, a carbon group, a silicon group, or a boron group, any of which having from 1 to 20 carbon atoms; a halide; or hydrogen;

ii) $(X^9)(X^{10})(X^{11})(X^{12})M^3$ (M3-C), wherein $M^3$ is titanium, zirconium, or hafnium;

$(X^9)$ is a substituted cyclopentadienyl group, wherein one substituent is an aliphatic group, an aromatic group, or a combination of aliphatic and cyclic groups, any of which having up to 20 carbon atoms;

$(X^{10})$ is a substituted indenyl group, wherein one substituent is an aliphatic group, an aromatic group, or a combination of aliphatic and cyclic groups, any of which having up to 20 carbon atoms;

$(X^{11})$ and $(X^{12})$ are independently: 1) F, Cl, Br, or I; 2) a hydrocarbyl group having up to 20 carbon atoms, H, or $BH_4$; 3) a hydrocarbyloxide group, a hydrocarbylamino group, or a trihydrocarbylsilyl group, any of which having up to 20 carbon atoms; or 4) $OBR^A_2$ or $SO_3R^A$, wherein $R^A$ is an alkyl group or an aryl group, any of which having up to 12 carbon atoms; wherein at least one $(X^{11})$ and $(X^{12})$ is a hydrocarbyl group having up to 20 carbon atoms, H, or $BH_4$; and any additional substituent on the substituted cyclopentadienyl or substituted indenyl is independently an aliphatic group, an aromatic group, a cyclic group, a combination of aliphatic and cyclic groups, an oxygen group, a sulfur group, a nitrogen group, a phosphorus group, an arsenic group, a carbon group, a silicon group, or a boron group, any of which having from 1 to 20 carbon atoms; a halide; or hydrogen;

or iii) any combination thereof, and c) the at least one activator is selected independently from:
i) an activator-support selected from a solid oxide treated with an electron-withdrawing anion, a layered mineral, an ion-exchangeable activator-support, or any combination thereof, ii) an organoaluminoxane compound;
iii) an organoboron compound or an organoborate compound; or
iv) any combination thereof.

Still a further aspect of this invention provides a catalyst composition comprising the contact product of: 1) at least one first metallocene; 2) at least one second metallocene; and 3) at least one activator, wherein:

a) the at least one first metallocene comprises an ansa-metallocene having the formula (M1-B) as provided herein;
b) the at least one second metallocene comprises an unbridged metallocene having the formula:

i) $(X^5)(X^6)(X^7)(X^8)M^2$ (M2-D), wherein

M2 is zirconium or hafnium;

$(X^5)$ and $(X^6)$ are independently a cyclopentadienyl, an indenyl, a substituted cyclopentadienyl, or a substituted indenyl;

$(X^7)$ and $(X^8)$ are independently a hydrocarbyl group having up to 12 carbon atoms, H, $BH_4$, or a halide, wherein at least one of $(X^7)$ and $(X^8)$ is a hydrocarbyl group, H, or $BH_4$; and any substituent on the substituted cyclopentadienyl or substituted indenyl is independently an aliphatic group, an aromatic group, a cyclic group, a combination of aliphatic and cyclic groups, any of which having up to 20 carbon atoms;

ii) $(X^9)(X^{10})(X^{11})(X^{12})M^3$ (M3-D), wherein $M^3$ is zirconium or hafnium;

$(X^9)$ is a substituted cyclopentadienyl group, wherein any substituent is independently a linear or branched alkyl group having up to 12 carbon atoms;

$(X^{10})$ is a substituted indenyl group, wherein any substituent is independently an aliphatic group, an aromatic group, or a combination of aliphatic and cyclic groups, any of which having up to 20 carbon atoms; and $(X^{11})$ and $(X^{12})$ are independently a hydrocarbyl group having up to 12 carbon atoms, H, $BH_4$, or a halide, wherein at least one of $(X^7)$ and $(X^8)$ is a hydrocarbyl group, H, or $BH_4$; or iii) any combination thereof, and c) the at least one activator is selected independently from:
i) an activator-support selected from a solid oxide treated with an electron-withdrawing anion, a layered mineral, an ion-exchangeable activator-support, or any combination thereof,
ii) an organoaluminoxane compound;
iii) an organoboron compound or an organoborate compound; or
iv) any combination thereof.

In a further aspect of this invention, the activator-support can be, or can comprise, a solid oxide treated with an electron-withdrawing anion, wherein the solid oxide comprises silica, alumina, silica-alumina, aluminophosphate, aluminum phosphate, zinc aluminate, heteropolytungstates, titania, zirconia, magnesia, boria, zinc oxide, mixed oxides thereof, or mixtures thereof. In this aspect, the electron-withdrawing anion can comprise fluoride, chloride, bromide, iodide, phosphate, triflate, bisulfate, sulfate, fluoroborate, fluorosulfate, trifluoroacetate, phosphate, fluorophosphate, fluorozirconate, fluorosilicate, fluorotitanate, permanganate, substituted or unsubstituted alkanesulfonate, substituted or unsubstituted arenesulfonate, or any combination thereof. In addition, the activator-support can further comprise a metal or metal ion such as zinc, nickel, vanadium, tungsten, molybdenum, silver, tin, or any combination thereof. Also in this aspect, the electron-withdrawing anion can be fluoride, chloride, bromide, iodide, phosphate, triflate, bisulfate, sulfate, fluoroborate, fluorosulfate, trifluoroacetate, phosphate, fluorophosphate, fluorozirconate, fluorosilicate, fluorotitanate, permanganate, substituted or unsubstituted alkanesulfonate, substituted or unsubstituted arenesulfonate, and the like, including any combination thereof.

In yet another aspect of this invention, the activator-support can be, or can comprise, a layered mineral, an ion-exchangeable activator-support, or any combination of these activator-supports, including any combination of these activator-supports with a solid oxide treated with an electron-withdrawing anion. In this aspect, the activator-support can comprise a clay mineral, a pillared clay, an exfoliated clay, an exfoliated clay gelled into another oxide matrix, a layered silicate mineral, a non-layered silicate mineral, a layered aluminosilicate mineral, a non-layered aluminosilicate mineral, or any combination thereof.

In another aspect, this invention further provides a process for producing a polymerization catalyst composition comprising contacting at least one first metallocene, at least one second metallocene, optionally at least one organoaluminum compound, and at least one activator, to produce the catalyst composition, wherein the at least one first metallocene, the at least one second metallocene, the at least one organoaluminum compound, and the at least one activator are defined as herein. In still another aspect, this invention affords a method of polymerizing olefins, comprising contacting ethylene and an optional α-olefin comonomer with a catalyst composition as provided herein under polymerization conditions to form a polymer or copolymer. In yet further aspect, the present invention provides ethylene polymers and copolymers, and articles made therefrom, produced by contacting ethylene and an optional α-olefin comonomer with a catalyst composition under polymerization conditions to form a polymer or copolymer; wherein the catalyst composition is provided as disclosed herein.

In still another aspect of this disclosure, the activity of the catalyst compositions of this invention can be enhanced by precontacting some of the polymerization reaction components to form a first mixture, for a first period of time, before this mixture is then contacted with the remaining polymerization reaction components, forming a second mixture, for a second period of time. For example, the first metallocene compound, the second metallocene compound, or both the first and second metallocene compounds can be precontacted with various other polymerization reaction components, including but not limited to, for example, an α-olefin monomer and optionally an organoaluminum cocatalyst, for some period of time before this mixture is contacted with the remaining polymerization reaction components, including, but not limited to, an activator-support. In this aspect, the first mixture is typically termed the "precontacted" mixture and comprises precontacted components, and the second mixture is typically termed the "postcontacted" mixture and comprises postcontacted components.

For example, the mixture of at least one first metallocene, at least one second metallocene, olefin monomer, and organoaluminum cocatalyst compound, before it is contacted with the activator-support, is one type of "precontacted" mixture. Precontacting catalyst composition components can also occur in more than one step, giving rise to a first precontacted mixture, a second precontacted mixture, and the like. Once all catalyst composition components are in contact, this mixture is termed the "postcontacted" mixture. For example, once a mixture of first metallocene, second metallocene, monomer, organoaluminum cocatalyst, and activator-support has been formed from contacting any remaining catalyst components with the final precontacted mixture, this mixture is termed the "postcontacted" mixture. This terminology is used regardless of what type of reaction, if any, occurs between components of the mixtures. For example, according to this description, it is possible for the precontacted organoaluminum compound, once it is admixed with the metallocene or metallocenes and the olefin monomer, to have a different chemical formulation and structure from the distinct organoaluminum compound used to prepare the precontacted mixture.

This invention also comprises methods of making catalyst compositions that utilize at least one first metallocene, at least one second metallocene, at least one optional cocatalyst, such as an aluminoxane, and at least one activator, wherein each of these components is disclosed herein. The methods of this invention include precontacting any selected catalyst components, for example, the first or second metallocene or both the first and second metallocene, optionally with an organoaluminum cocatalyst and optionally with an olefin, typically but not necessarily, a monomer to be polymerized or copolymerized, prior to contacting this precontacted mixture with any remaining catalyst components, in this example, the activator, such as an activator-support.

The present invention further comprises new catalyst compositions, methods for preparing catalyst compositions, and methods for polymerizing olefins that result in improved productivity. In one aspect, these methods can be carried out without the need for using large excess concentrations of the expensive cocatalyst methyl aluminoxane (MAO), or the catalyst composition can be substantially free of MAO. That is, the catalyst compositions of this invention have polymerization activity in the substantial absence of aluminoxanes. However, this invention also provides a catalyst composition comprising the contact product of a first metallocene, a second metallocene, and an aluminoxane. In this aspect, the catalyst composition is not required to comprise an activator-support, wherein the activator-support comprises a chemically-treated solid oxide, and the catalyst composition is also not required to comprise an organoaluminum compound.

Additionally, this invention encompasses a process comprising contacting at least one monomer and the catalyst composition under polymerization conditions to produce the polymer. Thus, in one aspect, this invention provides methods for polymerizing olefins using the catalyst compositions prepared as described herein.

The present invention also encompasses new polyolefins.

This invention also provides an article that comprises the polymer produced with the catalyst composition of this invention.

These and other features, aspects, embodiments, and advantages of the present invention will become apparent after a review of the following detailed description of the disclosed features.

DETAILED DESCRIPTION OF THE INVENTION

Figure 1:
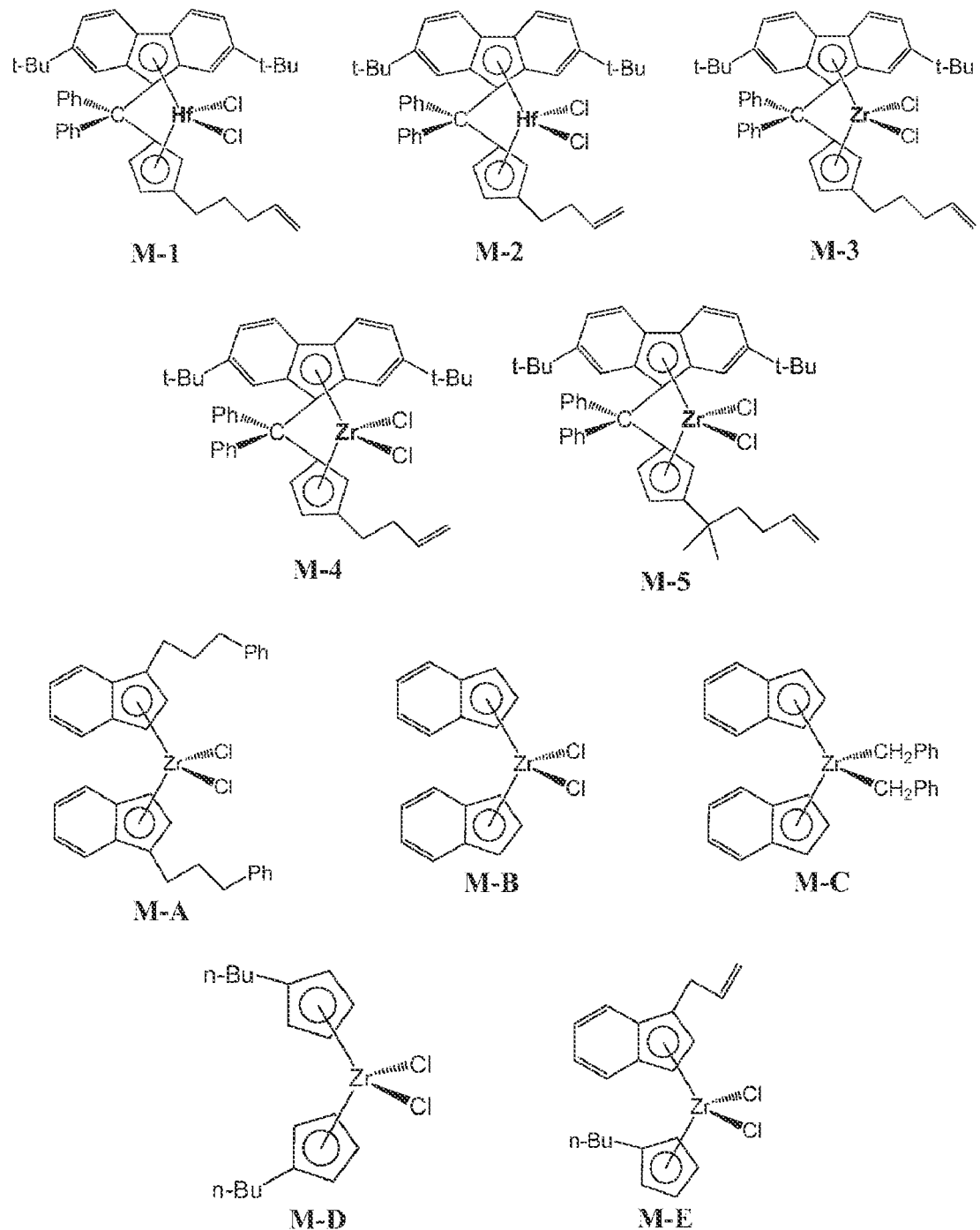
FIG. 1 illustrates the formulas of some specific metallocenes that can be used in this invention, as provided in the Examples.

The present invention provides new compositions, new catalyst compositions, methods for preparing catalyst compositions, methods for using the catalyst compositions to polymerize olefins, olefin polymers, and various articles prepared from olefin polymers. In one aspect, this invention encompasses a catalyst composition comprising: at least one first metallocene, for example, tightly-bridged ansa-metallocene compounds containing a pendant olefin-containing moiety attached to at least one of the cyclopentadienyl-type ligands and one or two aryl groups bonded to the bridging atom of the bridging ligand; at least one second metallocene, for example, an unbridged metallocene comprising two optionally substituted cyclopentadienyl ligands, two optionally substituted indenyl ligands, or one substituted cyclopentadienyl and one optionally substituted indenyl ligand; optionally, at least one organoaluminum cocatalyst; and at least one activator. In one aspect, the activator can comprise an activator-support that is used along with an organoaluminum cocatalyst. Also in this aspect, this invention encompasses a catalyst composition comprising the contact product of the catalyst components disclosed herein.

In one aspect, the present invention provides a catalyst composition comprising the contact product of: 1) at least one first metallocene; 2) at least one second metallocene; 3) optionally, at least one organoaluminum compound; and 4) at least one activator, wherein:

a) the at least one first metallocene comprises a compound having the formula:

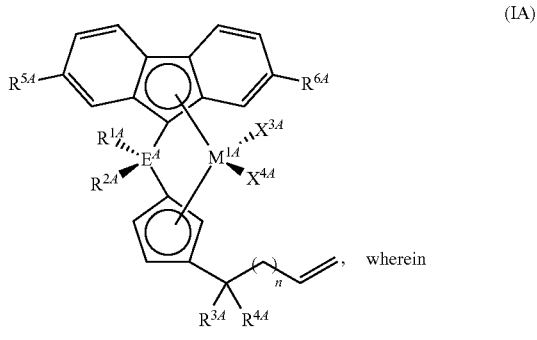

(IA)

$M^{1A}$ is zirconium or hafnium;

$X^{3A}$ and $X^{4A}$ are independently F, Cl, Br, I, benzyl, phenyl, or methyl;

$E^A$ is C or Si;

$R^{1A}$ and $R^{2A}$ are independently an alkyl group or an aryl group, either of which having up to 12 carbon atoms, or hydrogen, wherein at least one of $R^{1A}$ or $R^{2A}$ is an aryl group;

$R^{3A}$ and K are independently a hydrocarbyl group or a trihydrocarbylsilyl group, any of which having up to 20 carbon atoms; or hydrogen;

n is an integer from 0 to 10, inclusive; and $R^{5A}$ and $R^{6A}$ are independently a hydrocarbyl group having up to 12 carbon atoms, or hydrogen;

b) the at least one second metallocene comprises a compound having the formula:
i)

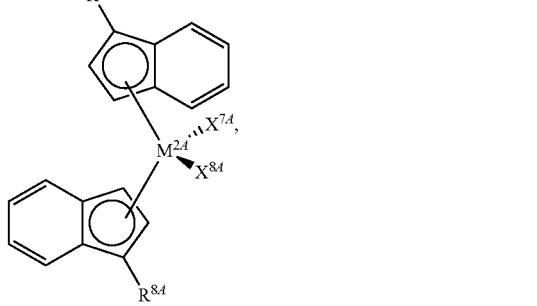

(IIA)

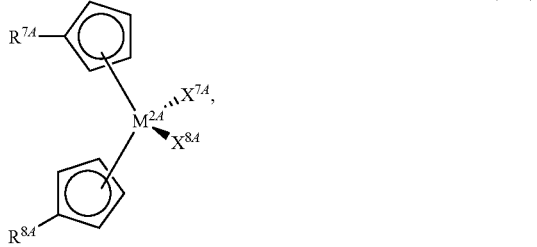

(IIIA)

or a combination thereof, wherein $M^{2A}$ is, independently, zirconium or hafnium;

$X^{7A}$ and $X^{8A}$, in each occurrence, are independently F, Cl, Br, I, benzyl, phenyl, or methyl; and $R^{7A}$ and $R^{8A}$, in each occurrence, are independently H, methyl, ethyl, n-propyl, n-butyl, n-pentyl, $CH_2CH_2CH_2Ph$, $CH_2CH=CH_2$, $CH_2CH_2CH=CH_2$, or $CH_2CH_2CH_2CH=CH_2$;

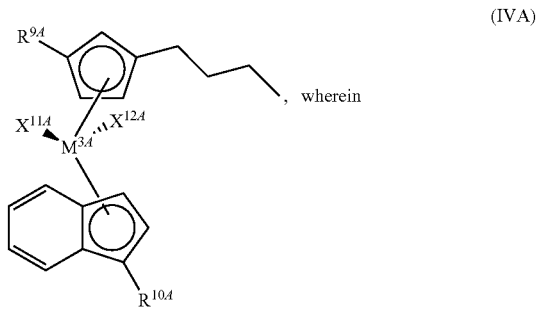

(IVA)
, wherein ii)
$M^{3A}$ is zirconium or hafnium;
$R^{9A}$ is H or $CH_3$;
$R^{10A}$ is H, $CH_2CH=CH_2$, $CH_2CH_2CH=CH_2$, $CH_2CH_2CH_2CH=CH_2$, $CH_2CH_2CH_2Ph$, or $CH_2CH_2CH_2CH_3$; and
$X^{11A}$ and $X^{12A}$ are independently F, Cl, Br, I, benzyl, phenyl, or methyl;

or
iii) any combination thereof, c) the at least one organoaluminum compound comprises trimethylaluminum, triethylaluminum, tripropylaluminum, tributylaluminum, triisobutylaluminum, trihexylaluminum, trioctylaluminum, diethylaluminum ethoxide, diisobutylaluminum hydride, diethylaluminum chloride, or any combination thereof, and d) the at least one activator is an activator-support comprising a solid oxide treated with an electron-withdrawing anion, wherein:
the solid oxide is silica, alumina, silica-alumina, aluminophosphate, aluminum phosphate, zinc aluminate, heteropolytungstates, titania, zirconia, magnesia, boria, zinc oxide, mixed oxides thereof, or any combination thereof, and
the electron-withdrawing anion is fluoride, chloride, bromide, iodide, phosphate, triflate, bisulfate, sulfate, fluoroborate, fluorosulfate, trifluoroacetate, phosphate, fluorophosphate, fluorozirconate, fluorosilicate, fluorotitanate, permanganate, substituted or unsubstituted alkanesulfonate, substituted or unsubstituted arenesulfonate, or any combination thereof.

Yet another aspect of this invention provides a catalyst composition comprising the contact product of: 1) at least one first metallocene; 2) at least one second metallocene; and 3) at least one activator, wherein:

a) the at least one first metallocene comprises a compound having the formula:

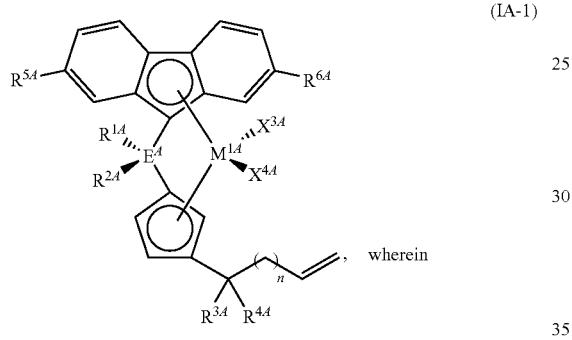

(IA-1)

wherein $M^{1A}$ is zirconium or hafnium;
$X^{3A}$ and $X^{4A}$ are independently F, Cl, Br, I, benzyl, phenyl, or methyl, wherein at least one of $X^{3A}$ and $X^{4A}$ is benzyl, phenyl, or methyl;
$E^{A}$ is C or Si;
$R^{1A}$ and $R^{2A}$ are independently an alkyl group or an aryl group, either of which having up to 12 carbon atoms, or hydrogen, wherein at least one of $R^{1A}$ or $R^{2A}$ is an aryl group;
$R^{3A}$ and $R^{4A}$ are independently a hydrocarbyl group or a trihydrocarbylsilyl group, any of which having up to 20 carbon atoms; or hydrogen;
n is an integer from 0 to 10, inclusive; and
$R^{5A}$ and $R^{6A}$ are independently a hydrocarbyl group having up to 12 carbon atoms, or hydrogen;

b) the at least one second metallocene comprises a compound having the formula:

i)

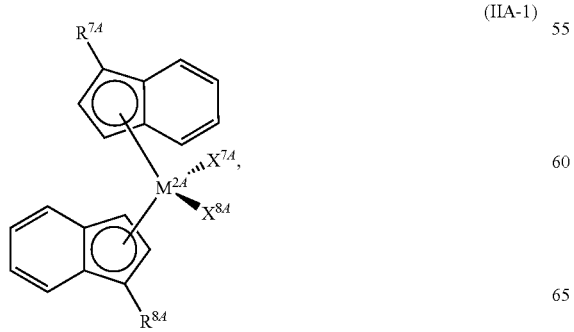

(IIA-1)

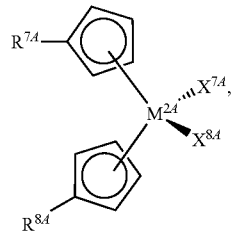

(IIIA-1)

or a combination thereof, wherein
$M^{2A}$ is, independently, zirconium or hafnium;
$X^{7A}$ and $X^{8A}$, in each occurrence, are independently F, Cl, Br, I, benzyl, phenyl, or methyl, wherein at least one of $X^{7A}$ and $X^{8A}$ is benzyl, phenyl, or methyl; and
$R^{7A}$ and $R^{8A}$ in each occurrence, are independently H, methyl, ethyl, n-propyl, n-butyl, n-pentyl, $CH_2CH_2CH_2Ph$, $CH_2CH=CH_2$, $CH_2CH_2CH=CH_2$, or $CH_2CH_2CH_2CH=CH_2$;

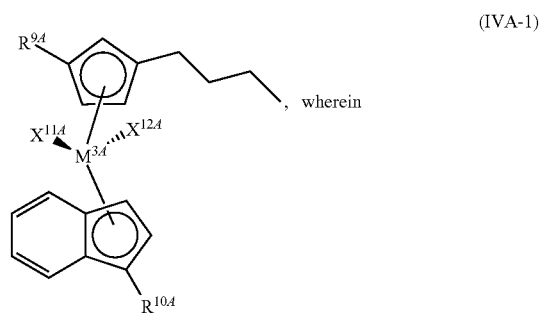

(IVA-1)

ii)
$M^{3A}$ is zirconium or hafnium;
$R^{9A}$ is H or $CH_3$;
$R^{10A}$ is H, $CH_2CH=CH_2$, $CH_2CH_2CH=CH_2$, $CH_2CH_2CH_2CH=CH_2$, $CH_2CH_2CH_2Ph$, or $CH_2CH_2CH_2CH_3$; and
$X^{11A}$ and $X^{12A}$ are independently F, Cl, Br, I, benzyl, phenyl, or methyl, wherein at least one of $X^{11A}$ and $X^{12A}$ is benzyl, phenyl, or methyl;
or
iii) any combination thereof, and c) the at least one activator is an activator-support comprising a solid oxide treated with an electron-withdrawing anion, wherein:
the solid oxide is silica, alumina, silica-alumina, aluminophosphate, aluminum phosphate, zinc aluminate, heteropolytungstates, titania, zirconia, magnesia, boria, zinc oxide, mixed oxides thereof, or any combination thereof, and
the electron-withdrawing anion is fluoride, chloride, bromide, iodide, phosphate, triflate, bisulfate, sulfate, fluoroborate, fluorosulfate, trifluoroacetate, phosphate, fluorophosphate, fluorozirconate, fluorosilicate, fluorotitanate, permanganate, substituted or unsubstituted alkanesulfonate, substituted or unsubstituted arenesulfonate, or any combination thereof.

Catalyst Composition and Components

The present invention provides, in one aspect, a catalyst composition comprising the contact product of at least one first metallocene, at least one second metallocene, at least one activator-support; and optionally, at least one co-catalyst. Each of these components is further described below.

The First Metallocene Compound

In one aspect, the first metallocene of the present invention is typically a tightly-bridged ansa-metallocene compound containing a pendant olefin-containing moiety attached to at least one of the cyclopentadienyl-type ligands, and also containing one or two aryl groups bonded to the bridging atom of the bridging ligand. As used herein, the term bridged or ansa-metallocene refers simply to a metallocene compound in which the two $\eta^5$-cycloalkadienyl-type ligands in the molecule are linked by a bridging moiety, and these term may be used interchangeably with the term first metallocene throughout. Useful ansa-metallocenes are typically "tightly-bridged", meaning that the two $\eta^5$-cycloalkadienyl-type ligands are connected by a bridging group wherein the shortest link of the bridging moiety between the $\eta^5$ cycloalkadienyl-type ligands is a single atom. Thus, the length of the bridge or the chain between the two $\eta^5$-cycloalkadienyl-type ligands is one atom, although this bridging atom is substituted. Therefore, the first metallocene of this invention typically comprises bridged bis($\eta^5$-cycloalkadienyl)-type compounds, wherein the $\eta^5$-cycloalkadienyl portions include substituted cyclopentadienyl ligands, substituted indenyl ligands, substituted fluorenyl ligands, and the like, wherein one substituent on these cyclopentadienyl-type ligands is a bridging group having the formula $ER^1R^2$, wherein E is a carbon atom, a silicon atom, a germanium atom, or a tin atom, and wherein E is bonded to both cyclopentadienyl-type ligands. In this aspect, $R^1$ and $R^2$ can be selected independently from an alkyl group or an aryl group, either of which having up to 12 carbon atoms, or hydrogen, wherein at least one of $R^1$ and $R^2$ is an aryl group.

In this aspect, one substituent on the metallocene's cyclopentadienyl-type ligands can be a bridging group having the formula $>CR^1R^2$, $>SiR^1R^2$, $>GeR^1R^2$, or $>SnR^1R^2$, wherein $R^1$ and $R^2$ can be independently selected from an alkyl group or an aryl group, either of which having up to 12 carbon atoms, or hydrogen, wherein at least one of $R^1$ and $R^2$ is an aryl group. Examples of bridging $ER^1R^2$ groups include, but are not limited to, $>CPh_2$, $>SiPh_2$, $>GePh_2$, $>SnPh_2$, $>C(tolyl)_2$, $>Si(tolyl)_2$, $>Ge(tolyl)_2$, $>Sn(tolyl)_2$, $>CMePh$, $>SiMePh$, $>GeMePh$, $>SnMePh$, $>CEtPh$, $>CPrPh$, $>CBuPh$, $>CMe(tolyl)$, $>SiMe(tolyl)$, $>GeMe(tolyl)$, $>SnMe(tolyl)$, $>CHPh$, $>CH(tolyl)$, and the like.

Further, at least one substituent on at least one of the $\eta^5$-cycloalkadienyl-type ligands is a substituted or an unsubstituted olefin-containing hydrocarbyl group, having up to 12 carbon atoms, which is referred to herein as an "alkenyl group," regardless of the regiochemistry of the alkene functionality. In this aspect, this olefin-containing hydrocarbyl group is bonded to one of the $\eta^5$-cycloalkadienyl-type ligands of the bridging ligand, wherein the olefinic bond is distal from the $\eta^5$-cycloalkadienyl-type ligand, and therefore can be described as a pendant alkenyl group. Thus, one substituent on a substituted cyclopentadienyl, a substituted indenyl, or a substituted fluorenyl of the metallocene comprises an alkenyl group, in which case the ansa-metallocenes can be described as containing a hydrocarbyl chain attached to one of the cyclopentadienyl-type ligands which comprises an olefinic portion.

Thus, in one aspect, the at least one first metallocene comprises an ansa-metallocene having the formula:

$$(X^1)(X^2)(X^3)(X^4)M^1 \qquad (M1\text{-}A), \text{wherein}$$

$M^1$ is titanium, zirconium, or hafnium;

$(X^1)$ and $(X^2)$ are independently a substituted cyclopentadienyl, a substituted indenyl, or a substituted fluorenyl;

one substituent on $(X^1)$ and $(X^2)$ is a bridging group having the formula $ER^1R^2$, wherein E is a carbon atom, a silicon atom, a germanium atom, or a tin atom, and E is bonded to both $(X^1)$ and $(X^2)$, and wherein $R^1$ and $R^2$ are independently an alkyl group or an aryl group, either of which having up to 12 carbon atoms, or hydrogen, wherein at least one of $R^1$ and $R^2$ is an aryl group;

at least one substituent on $(X^1)$ or $(X^2)$ is a substituted or an unsubstituted alkenyl group having up to 12 carbon atoms;

$(X^3)$ and $(X^4)$ are independently: 1) F, Cl, Br, or I; 2) a hydrocarbyl group having up to 20 carbon atoms, H, or $BH_4$; 3) a hydrocarbyloxide group, a hydrocarbylamino group, or a trihydrocarbylsilyl group, any of which having up to 20 carbon atoms; or 4) $OBR^A_2$ or $SO_3R^A$, wherein $R^A$ is an alkyl group or an aryl group, any of which having up to 12 carbon atoms; and any additional substituent on the substituted cyclopentadienyl, substituted indenyl, substituted fluorenyl, or substituted alkenyl group is independently an aliphatic group, an aromatic group, a cyclic group, a combination of aliphatic and cyclic groups, an oxygen group, a sulfur group, a nitrogen group, a phosphorus group, an arsenic group, a carbon group, a silicon group, or a boron group, any of which having from 1 to 20 carbon atoms; a halide; or hydrogen.

In another aspect, the at least one first metallocene comprises an ansa-metallocene having the formula:

$$(X^1)(X^2)(X^3)(X^4)M^1 \qquad (M1\text{-}B), \text{wherein}$$

$M^1$ is titanium, zirconium, or hafnium;

$(X^1)$ and $(X^2)$ are independently a substituted cyclopentadienyl, a substituted indenyl, or a substituted fluorenyl;

one substituent on $(X^1)$ and $(X^2)$ is a bridging group having the formula $ER^1R^2$, wherein E is a carbon atom, a silicon atom, a germanium atom, or a tin atom, and E is bonded to both $(X^1)$ and $(X^2)$, and wherein $R^1$ and $R^2$ are independently an alkyl group or an aryl group, either of which having up to 12 carbon atoms, or hydrogen, wherein at least one of $R^1$ and $R^2$ is an aryl group;

at least one substituent on $(X^1)$ or $(X^2)$ is a substituted or an unsubstituted alkenyl group having up to 12 carbon atoms;

$(X^3)$ and $(X^4)$ are independently: 1) F, Cl, Br, or I; 2) a hydrocarbyl group having up to 20 carbon atoms, H, or $BH_4$; 3) a hydrocarbyloxide group, a hydrocarbylamino group, or a trihydrocarbylsilyl group, any of which having up to 20 carbon atoms; or 4) $OBR^A_2$ or $SO_3R^A$, wherein $R^A$ is an alkyl group or an aryl group, any of which having up to 12 carbon atoms; wherein at least one $(X^3)$ and $(X^4)$ is a hydrocarbyl group having up to 20 carbon atoms, H, or $BH_4$; and any additional substituent on the substituted cyclopentadienyl, substituted indenyl, substituted fluorenyl, or substituted alkenyl group is independently an aliphatic group, an aromatic group, a cyclic group, a combination of aliphatic and cyclic groups, an oxygen group, a sulfur group, a nitrogen group, a phosphorus group, an arsenic group, a carbon group, a silicon group, or a boron group, any of which having from 1 to 20 carbon atoms; a halide; or hydrogen.

Further to this aspect, the at least one first metallocene can also comprise any combination of metallocenes having the formula $(X^1)(X^2)(X^3)(X^4)M^1$, wherein the substituents and the metals are defined above. That is, the at least one first metallocene can comprise any of combination of (M1-A) and (M2-B).

In another aspect of the present invention, that alkenyl group, that is, the olefin-containing hydrocarbyl group is bonded to one of the $\eta^5$-cycloalkadienyl-type ligands of the first metallocene's bridging ligand, can have up to about 20 carbon atoms. In another aspect, the alkenyl group can have up to about 12 carbon atoms, up to about 8 carbon atoms, or up to about 6 carbon atoms. Examples of alkenyl groups include, but are not limited to, butenyl, pentenyl, hexenyl, heptenyl, or octenyl. In another aspect, the alkenyl group is 3-butenyl or 4-pentenyl. Thus, in one aspect, the pendant unsaturated group can contain the carbon-carbon double bond from about 3 to about 7 carbon atoms removed from the cyclopentadienyl-type ligand itself, and in another aspect, from 3 to about 4 carbon atoms removed from the cyclopentadienyl-type ligand itself.

In still another aspect, the olefin-containing hydrocarbyl group, that is the alkenyl group, can be substituted or unsubstituted. For example, any substituent on the alkenyl group, when present, can be selected independently from an aliphatic group, an aromatic group, a cyclic group, a combination of aliphatic and cyclic groups, an oxygen group, a sulfur group, a nitrogen group, a phosphorus group, an arsenic group, a carbon group, a silicon group, a germanium group, a tin group, a lead group, a boron group, an aluminum group, an inorganic group, an organometallic group, or a substituted derivative thereof, any of which having from 1 to about 20 carbon atoms; a halide; or hydrogen. Hydrogen is listed as a possible substituent on the alkenyl group in the context that hydrogen can add to an unsaturated moiety within the alkenyl group, as long as it does not destroy the alkenyl group. Thus, hydrogen is a possible substituent on any unsaturated moiety within the alkenyl group so long as it does not add across the very olefin moiety necessary for this group to be considered an alkenyl group. Further, this description of other substituents on the alkenyl group atom can include substituted, unsubstituted, branched, linear, or heteroatom-substituted analogs of these moieties.

Examples of olefinic hydrocarbyl groups, specifically alkenyl groups, that can be bonded to at least one cyclopentadienyl-type moiety include, but are not limited to, 3-butenyl ($—CH_2CH_2CH=CH_2$), 4-pentenyl ($—CH_2CH_2CH_2CH=CH_2$), 5-hexenyl ($—CH_2CH_2CH_2CH_2CH=CH_2$), 6-heptenyl ($—CH_2CH_2CH_2CH_2CH_2CH=CH_2$), 7-octenyl ($—CH_2CH_2CH_2CH_2CH_2CH_2CH=CH_2$), 3-methyl-3-butenyl [$—CH_2CH_2C(CH_3)=CH_2$], 4-methyl-3-pentenyl [$—CH_2CH_2CH=C(CH_3)_2$], 1,1-dimethyl-3-butenyl [$—C(CH_3)_2CH_2CH=CH_2$], 1,1-dimethyl-4-pentenyl [$—C(CH_3)_2 CH_2CH_2CH=CH_2$], and the like, or any substituted analog thereof. In one aspect, the unsaturated group bonded to the bridging group can be 3-butenyl ($—CH_2CH_2CH=CH_2$), 4-pentenyl ($—CH_2CH_2CH_2CH=CH_2$), or a substituted analog thereof.

In addition to containing a bridging group having the formula $ER^1R^2$ and at least one an alkenyl group as disclosed herein, the cyclopentadienyl-type ligands of the first metallocene can also have other substituents. For example, these substituents can be selected from the same chemical groups or moieties that can serve as the $(X^3)$ and $(X^4)$ ligands of the first metallocene. Thus, any additional substituent on the cyclopentadienyl-type ligands; and any substituent on the substituted alkenyl group; and $(X^3)$ and $(X^4)$ can be independently selected from an aliphatic group, an aromatic group, a cyclic group, a combination of aliphatic and cyclic groups, an oxygen group, a sulfur group, a nitrogen group, a phosphorus group, an arsenic group, a carbon group, a silicon group, a germanium group, a tin group, a lead group, a boron group, an aluminum group, an inorganic group, an organometallic group, or a substituted derivative thereof, any of which having from 1 to about 20 carbon atoms; a halide; or hydrogen; as long as these groups do not terminate the activity of the catalyst composition. Further, this list includes substituents that can be characterized in more than one of these categories such as benzyl. This list also includes hydrogen, therefore the notion of a substituted indenyl and substituted fluorenyl includes partially saturated indenyls and fluorenyls including, but not limited to, tetrahydroindenyl groups, tetrahydrofluorenyl groups, and octahydrofluorenyl groups.

Examples of each of these substituent groups include, but are not limited to, the following groups. In each example presented below in which R is used in a generic fashion, unless otherwise specified, R is independently selected from: an aliphatic group; an aromatic group; a cyclic group; any combination thereof, any substituted derivative thereof, including but not limited to, a halide-, an alkoxide-, or an amide-substituted analog or derivative thereof, any of which has from 1 to about 20 carbon atoms; or hydrogen. Also included in these groups are any unsubstituted, branched, or linear analogs thereof.

Examples of aliphatic groups, in each occurrence, include, but are not limited to, an alkyl group, a cycloalkyl group, an alkenyl group, a cycloalkenyl group, an alkynyl group, an alkadienyl group, a cyclic group, and the like, and includes all substituted, unsubstituted, branched, and linear analogs or derivatives thereof, in each occurrence having from one to about 20 carbon atoms. Thus, aliphatic groups include, but are not limited to, hydrocarbyls such as paraffins and alkenyls. For example, aliphatic groups as used herein include methyl, ethyl, propyl, n-butyl, tert-butyl, sec-butyl, isobutyl, amyl, isoamyl, hexyl, cyclohexyl, heptyl, octyl, nonyl, decyl, dodecyl, 2-ethylhexyl, pentenyl, butenyl, and the like.

Examples of aromatic groups, in each occurrence, include, but are not limited to, phenyl, naphthyl, anthracenyl, and the like, including substituted derivatives thereof, in each occurrence having from 6 to about 25 carbons. Substituted derivatives of aromatic compounds include, but are not limited to, tolyl, xylyl, mesityl, and the like, including any heteroatom substituted derivative thereof.

Examples of cyclic groups, in each occurrence, include, but are not limited to, cycloparaffins, cycloolefins, cycloacetylenes, arenes such as phenyl, bicyclic groups and the like, including substituted derivatives thereof, in each occurrence having from about 3 to about 20 carbon atoms. Thus heteroatom-substituted cyclic groups such as furanyl are included herein.

In each occurrence, aliphatic and cyclic groups are groups comprising an aliphatic portion and a cyclic portion, examples of which include, but are not limited to, groups such as: $—(CH_2)_mC_6H_qR_{5-q}$ wherein m is an integer from 1 to about 10, and q is an integer from 1 to 5, inclusive; $—(CH_2)_m C_6H_qR_{11-q}$ wherein m is an integer from 1 to about 10, and q is an integer from 1 to 11, inclusive; or $—(CH_2)_mC_5H_qR_{9-q}$ wherein m is an integer from 1 to about 10, and q is an integer from 1 to 9, inclusive. In each occurrence and as defined above, R is independently selected from: an aliphatic group; an aromatic group; a cyclic group; any combination thereof, any substituted derivative thereof, including but not limited to, a halide-, an alkoxide, or an amide-substituted derivative or analog thereof, any of which has from 1 to about 20 carbon atoms; or hydrogen. In one aspect, aliphatic and cyclic groups include, but are not limited to: —CH$_2$C$_6$H$_5$; —CH$_2$C$_6$H$_4$F; —CH$_2$C$_6$H$_4$Cl; —CH$_2$C$_6$H$_4$Br; —CH$_2$C$_6$H$_4$I; —CH$_2$C$_6$H$_4$OMe; —CH$_2$C$_6$H$_4$OEt; —CH$_2$C$_6$H$_4$NH$_2$; —CH$_2$C$_6$H$_4$NMe$_2$; —CH$_2$C$_6$H$_4$NEt$_2$; —CH$_2$CH$_2$C$_6$H$_5$; —CH$_2$CH$_2$C$_6$H$_4$F; —CH$_2$CH$_2$C$_6$H$_4$Cl; —CH$_2$CH$_2$C$_6$H$_4$Br; —CH$_2$CH$_2$C$_6$H$_4$I; —CH$_2$CH$_2$C$_6$H$_4$OMe; —CH$_2$CH$_2$C$_6$H$_4$OEt; —CH$_2$CH$_2$C$_6$H$_4$NH$_2$; —CH$_2$CH$_2$C$_6$H$_4$NMe$_2$; —CH$_2$CH$_2$C$_6$H$_4$NEt$_2$; any regioisomer thereof, and any substituted derivative thereof.

Examples of halides, in each occurrence, include fluoride, chloride, bromide, and iodide.

In each occurrence, oxygen groups are oxygen-containing groups, examples of which include, but are not limited to, alkoxy or aryloxy groups (—OR) and the like, including substituted derivatives thereof, wherein R is alkyl, cycloalkyl, aryl, aralkyl, substituted alkyl, substituted aryl, or substituted aralkyl having from 1 to about 20 carbon atoms. Examples of alkoxy or aryloxy groups (—OR) groups include, but are not limited to, methoxy, ethoxy, propoxy, butoxy, phenoxy, substituted phenoxy, and the like.

In each occurrence, sulfur groups are sulfur-containing groups, examples of which include, but are not limited to, —SR and the like, including substituted derivatives thereof, wherein R in each occurrence is alkyl, cycloalkyl, aryl, aralkyl, substituted alkyl, substituted aryl, or substituted aralkyl having from 1 to about 20 carbon atoms.

In each occurrence, nitrogen groups are nitrogen-containing groups, which include, but are not limited to, —NR$_2$ or pyridyl groups, and the like, including substituted derivatives thereof, wherein R in each occurrence is alkyl, cycloalkyl, aryl, aralkyl, substituted alkyl, substituted aryl, or substituted aralkyl having from 1 to about 20 carbon atoms.

In each occurrence, phosphorus groups are phosphorus-containing groups, which include, but are not limited to, —PR$_2$, and the like, including substituted derivatives thereof, wherein R in each occurrence is alkyl, cycloalkyl, aryl, aralkyl, substituted alkyl, substituted aryl, or substituted aralkyl having from 1 to about 20 carbon atoms.

In each occurrence, arsenic groups are arsenic-containing groups, which include, but are not limited to, —AsR$_2$, and the like, including substituted derivatives thereof, wherein R in each occurrence is alkyl, cycloalkyl, aryl, aralkyl, substituted alkyl, substituted aryl, or substituted aralkyl having from 1 to about 20 carbon atoms.

In each occurrence, carbon groups are carbon-containing groups, which include, but are not limited to, alkyl halide groups that comprise halide-substituted alkyl groups with 1 to about 20 carbon atoms, alkenyl or alkenyl halide groups with 1 to about 20 carbon atoms, aralkyl or aralkyl halide groups with 1 to about 20 carbon atoms, and the like, including substituted derivatives thereof.

In each occurrence, silicon groups are silicon-containing groups, which include, but are not limited to, silyl groups such alkylsilyl groups, arylsilyl groups, arylalkylsilyl groups, siloxy groups, and the like, which in each occurrence have from 1 to about 20 carbon atoms. For example, silicon groups include trimethylsilyl and phenyloctylsilyl groups.

In each occurrence, boron groups are boron-containing groups, which include, but are not limited to, —BR$_2$, —BX$_2$, —BRX, wherein X is a monoanionic group such as halide, hydride, alkoxide, alkyl thiolate, and the like, and wherein R in each occurrence is alkyl, cycloalkyl, aryl, aralkyl, substituted alkyl, substituted aryl, or substituted aralkyl having from 1 to about 20 carbon atoms.

In another aspect of this invention, (X$^3$) and (X$^4$) are independently selected from an aliphatic group, a cyclic group, a combination of an aliphatic group and a cyclic group, an amido group, a phosphido group, an alkyloxide group, an aryloxide group, an alkanesulfonate, an arenesulfonate, or a trialkylsilyl, or a substituted derivative thereof, any of which having from 1 to about 20 carbon atoms; or a halide. In yet another aspect, (X$^3$) and (X$^4$) are independently: 1) F, Cl, Br, or I; 2) a hydrocarbyl group having up to 20 carbon atoms, H, or BH$_4$; 3) a hydrocarbyloxide group, a hydrocarbylamino group, or a trihydrocarbylsilyl group, any of which having up to 20 carbon atoms; or 4) OBR$^A$$_2$ or SO$_3$R$^A$, wherein R$^A$ is an alkyl group or an aryl group, any of which having up to 12 carbon atoms. In still another aspect, (X$^3$) and (X$^4$) are independently selected from a hydrocarbyl having from 1 to about 10 carbon atoms, or a halide. In another aspect, (X$^3$) and (X$^4$) are independently selected from fluoride, chloride, bromide, or iodide. In yet another aspect, (X$^3$) and (X$^4$) are chloride. In still another aspect, (X$^3$) and (X$^4$) are independently a hydrocarbyl group having up to 20 carbon atoms, H, or BH$_4$.

In yet another aspect, the at least one first metallocene comprises a compound having the formula:

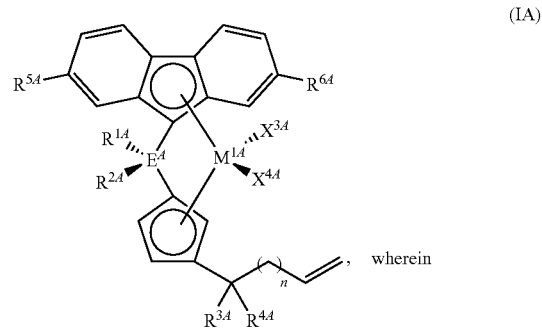

(IA)

wherein $M^{1A}$ is zirconium or hafnium;
$X^{3A}$ and $X^{4A}$ are independently F, Cl, Br, I, benzyl, phenyl, or methyl;
$E^A$ is C or Si;
$R^{1A}$ and $R^{2A}$ are independently an alkyl group or an aryl group, either of which having up to 12 carbon atoms, or hydrogen, wherein at least one of $R^{1A}$ or $R^{2A}$ is an aryl group;
$R^{3A}$ and $R^{4A}$ are independently a hydrocarbyl group or a trihydrocarbylsilyl group, any of which having up to 20 carbon atoms; or hydrogen;
n is an integer from 0 to 10, inclusive; and
$R^{5A}$ and $R^{6A}$ are independently a hydrocarbyl group having up to 12 carbon atoms, or hydrogen.

In still another aspect, the at least one first metallocene comprises a compound having the formula:

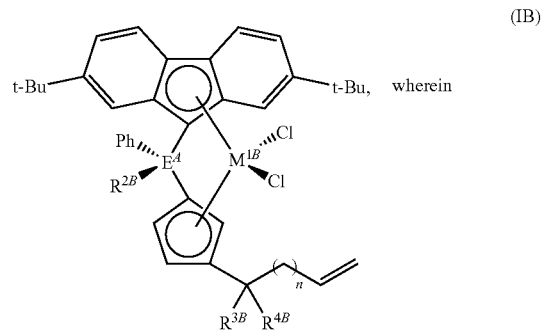

(IB)

wherein $M^{1B}$ is zirconium or hafnium;

$R^{2B}$ is methyl or phenyl;

$R^{3B}$ and $R^{4B}$ are independently H or $CH_3$; and n is an integer from 0 to 5, inclusive.

In a further aspect, the at least one first metallocene of this invention comprises a compound having the formula:

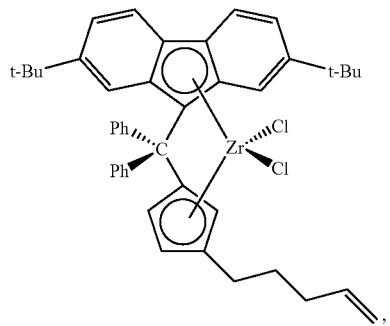

,

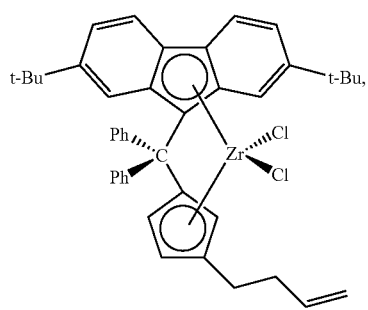

,

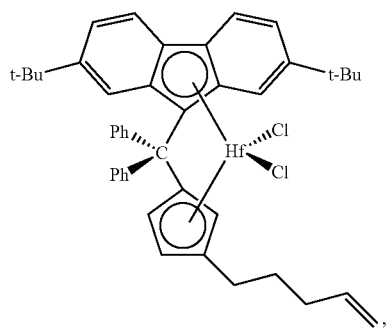

,

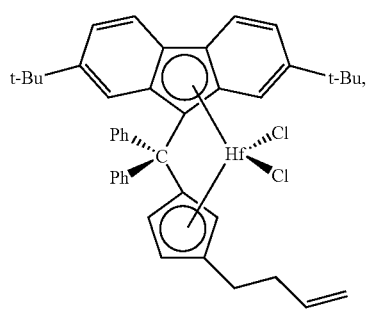

,

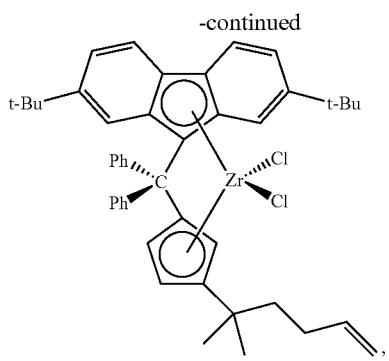

,

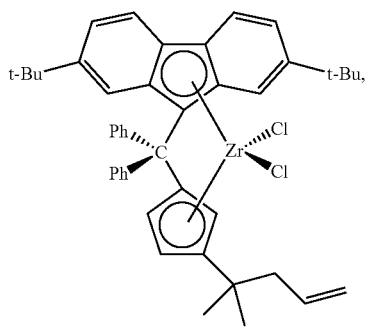

,

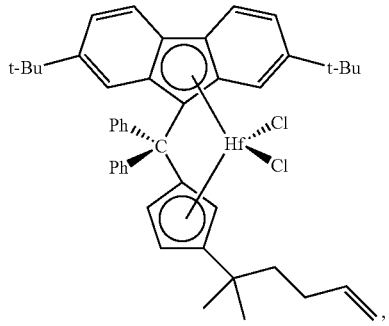

,

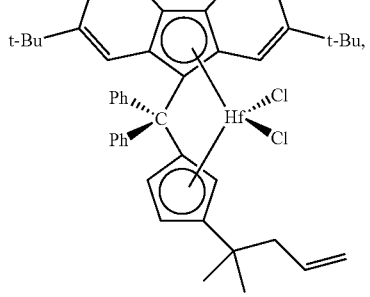

, or any combination thereof.

In still another aspect, the at least one first metallocene of this invention can comprise, or can be selected from, any subset of the first metallocene formulas illustrated above. For example, the at least one first metallocene can comprise, or can be selected from,

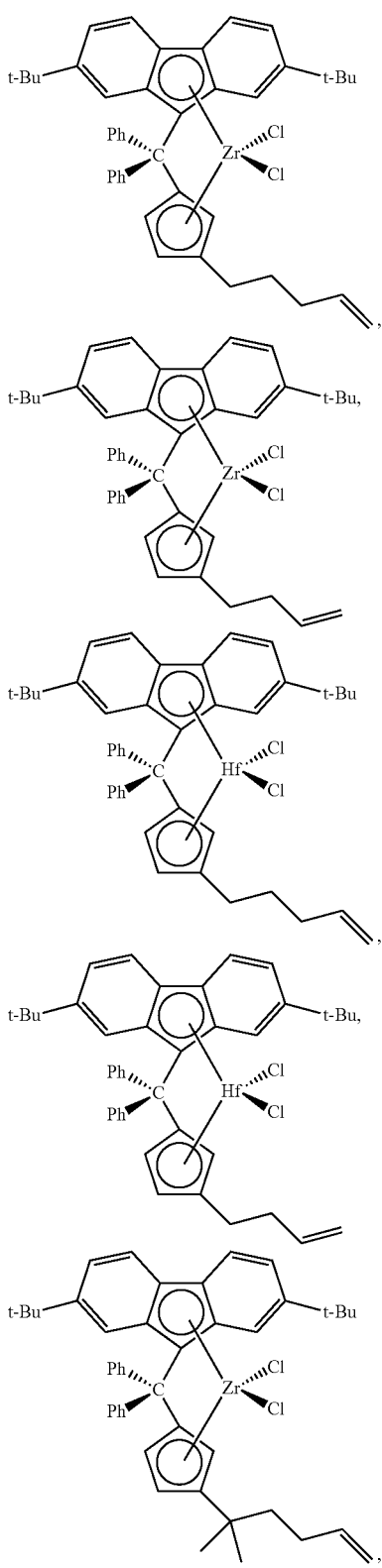

or any combination thereof.

Numerous processes to prepare metallocene compounds that can be employed in this invention have been reported. For example, U.S. Pat. Nos. 4,939,217, 5,191,132, 5,210,352, 5,347,026, 5,399,636, 5,401,817, 5,420,320, 5,436,305, 5,451,649, 5,496,781, 5,498,581, 5,541,272, 5,554,795, 5,563,284, 5,565,592, 5,571,880, 5,594,078, 5,631,203, 5,631,335, 5,654,454, 5,668,230, 5,705,578, 5,705,579, 6,187,880, and 6,509,427 describe such methods. Other processes to prepare metallocene compounds that can be employed in this invention have been reported in references such as: Köppl, A. Alt, H. G. J. Mol. Catal. A. 2001, 165, 23; Kajigaeshi, S.; Kadowaki, T.; Nishida, A.; Fujisaki, S. The Chemical Society of Japan, 1986, 59, 97; Alt, H. G.; Jung, M.; Kehr, G. J. Organomet. Chem. 1998, 562, 153-181; Alt, H. G.; Jung, M. J. Organomet. Chem. 1998, 568, 87-112; Jung, M., Doctoral Dissertation, University of Bayreuth, Bayreuth, Germany, 1997; Peifer, B., Doctoral Dissertation, University of Bayreuth, Bayreuth, Germany, 1995; and Zenk, R., Doctoral Dissertation, University of Bayreuth, Bayreuth, Germany, 1994. The following treatises also describe such methods: Wailes, P. C.; Coutts, R. S. P.; Weigold, H. in Organometallic Chemistry of Titanium, Zirconium, and Hafnium, Academic; New York, 1974.; Cardin, D. J.; Lappert, M. F.; and Raston, C. L.; Chemistry of Organo-Zirconium and -Hafnium Compounds; Halstead Press; New York, 1986.

The Second Metallocene Compound

According to one aspect of the present invention, the second metallocene used to prepare the catalyst composition comprises unbridged $\eta^5$-cyclopentadienyl-type ligands selected from: 1) two independently selected, optionally substituted cyclopentadienyl ligands; 2) two independently selected, optionally substituted indenyl ligands; 3) one substituted cyclopentadienyl and one optionally substituted indenyl ligand; or 4) any combination thereof, as follows.

Thus, in one aspect of this invention, the at least one second metallocene comprises unbridged $\eta^5$-cyclopentadienyl-type ligands selected from two optionally substituted cyclopentadienyl ligands, two optionally substituted indenyl ligands, or a combination thereof. In this aspect, the at least one second metallocene comprises an unbridged metallocene having the formula:

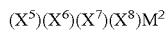
$(X^5)(X^6)(X^7)(X^8)M^2$        (M2-A), wherein $M^2$ is zirconium or hafnium;

$(X^5)$ and $(X^6)$ are independently a cyclopentadienyl, an indenyl, a substituted cyclopentadienyl, or a substituted indenyl;

$(X^7)$ and $(X^8)$ are independently: 1) F, Cl, Br, or I; 2) a hydrocarbyl group having up to 20 carbon atoms, H, or BH$_4$; 3) a hydrocarbyloxide group, a hydrocarbylamino group, or a trihydrocarbylsilyl group, any of which having up to 20 carbon atoms; or 4) OBR$^B_2$ or SO$_3$R$^B$, wherein R$^B$ is an alkyl group or an aryl group, any of which having up to 12 carbon atoms; and any substituent on the substituted cyclopentadienyl or substituted indenyl is independently an aliphatic group, an aromatic group, a cyclic group, a combination of aliphatic and cyclic groups, an oxygen group, a sulfur group, a nitrogen group, a phosphorus group, an arsenic group, a carbon group, a silicon group, or a boron group, any of which having from 1 to 20 carbon atoms; a halide; or hydrogen.

In another aspect, the at least one second metallocene can comprise an unbridged metallocene having the formula:

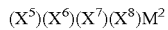
$(X^5)(X^6)(X^7)(X^8)M^2$        (M2-B), wherein $M^2$ is zirconium or hafnium;

$(X^5)$ and $(X^6)$ are independently a cyclopentadienyl, an indenyl, a substituted cyclopentadienyl, or a substituted indenyl;

$(X^7)$ and $(X^8)$ are independently a hydrocarbyl group having up to 12 carbon atoms, H, BH$_4$, or a halide; and any substituent on the substituted cyclopentadienyl or substituted indenyl is independently an aliphatic group, an aromatic group, a cyclic group, a combination of aliphatic and cyclic groups, any of which having up to 20 carbon atoms;

In still another aspect, the at least one second metallocene can comprise an unbridged metallocene having the formula:

$(X^5)(X^6)(X^7)(X^8)M^2$ (M2-C), wherein $M^2$ is zirconium or hafnium;

$(X^5)$ and $(X^6)$ are independently a cyclopentadienyl, an indenyl, a substituted cyclopentadienyl, or a substituted indenyl;

$(X^7)$ and $(X^8)$ are independently: 1) F, Cl, Br, or I; 2) a hydrocarbyl group having up to 20 carbon atoms, H, or $BH_4$; 3) a hydrocarbyloxide group, a hydrocarbylamino group, or a trihydrocarbylsilyl group, any of which having up to 20 carbon atoms; or 4) $OBR^A{}_2$ or $SO_3R^A$, wherein $R^A$ is an alkyl group or an aryl group, any of which having up to 12 carbon atoms; wherein at least one $(X^7)$ and $(X^7)$ is a hydrocarbyl group having up to 20 carbon atoms, H, or $BH_4$; and any substituent on the substituted cyclopentadienyl or substituted indenyl is independently an aliphatic group, an aromatic group, a cyclic group, a combination of aliphatic and cyclic groups, an oxygen group, a sulfur group, a nitrogen group, a phosphorus group, an arsenic group, a carbon group, a silicon group, or a boron group, any of which having from 1 to 20 carbon atoms; a halide; or hydrogen.

In yet another aspect, the at least one second metallocene can comprise an unbridged metallocene having the formula:

$(X^5)(X^6)(X^7)(X^8)M^2$ (M2-D), wherein $M^2$ is zirconium or hafnium;

$(X^5)$ and $(X^6)$ are independently a cyclopentadienyl, an indenyl, a substituted cyclopentadienyl, or a substituted indenyl;

$(X^7)$ and $(X^8)$ are independently a hydrocarbyl group having up to 12 carbon atoms, H, $BH_4$, or a halide, wherein at least one of $(X^7)$ and $(X^8)$ is a hydrocarbyl group, H, or $BH_4$; and any substituent on the substituted cyclopentadienyl or substituted indenyl is independently an aliphatic group, an aromatic group, a cyclic group, a combination of aliphatic and cyclic groups, any of which having up to 20 carbon atoms.

Also in this aspect, the at least one second metallocene can also comprise an unbridged metallocene having the formula:

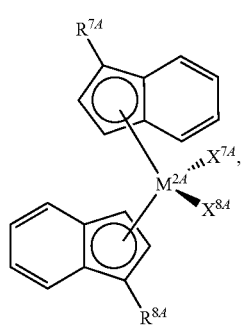

(IIA)

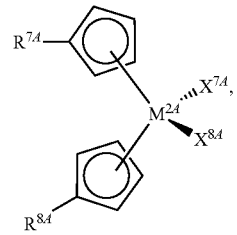

(IIIA)

or a combination thereof, wherein $M^{2A}$ is, independently, zirconium or hafnium;

$X^{7A}$ and $X^{8A}$, in each occurrence, are independently F, Cl, Br, I, benzyl, phenyl, methyl; and $R^{7A}$ and $R^{8A}$, in each occurrence, are independently H, methyl, ethyl, n-propyl, n-butyl, n-pentyl, $CH_2CH_2CH_2Ph$, $CH_2CH{=}CH_2$, $CH_2CH_2CH{=}CH_2$, or $CH_2CH_2CH_2CH{=}CH_2$.

In another aspect, the at least one second metallocene can also comprise an unbridged metallocene having the formula:

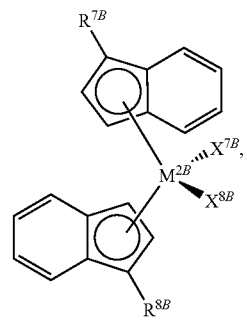

(IIB)

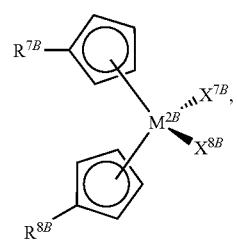

(IIIB)

or any combination thereof, wherein $M^{2B}$ is zirconium or hafnium;

$X^{7B}$ and $X^{8B}$ are independently benzyl, Cl, or methyl; and $R^{7B}$ and $R^{8B}$ are independently H, methyl, ethyl, n-propyl, n-butyl, $CH_2CH_2CH_2Ph$, $CH_2CH{=}CH_2$, $CH_2CH_2CH{=}CH_2$, or $CH_2CH_2CH_2CH{=}CH_2$.

Further, according to this aspect of the present invention, the at least one second metallocene can comprise a compound having the formula:

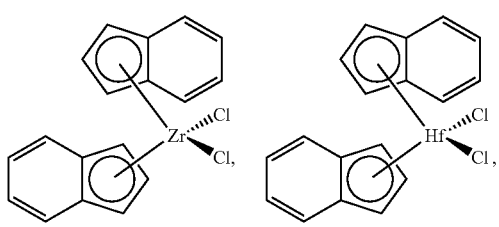
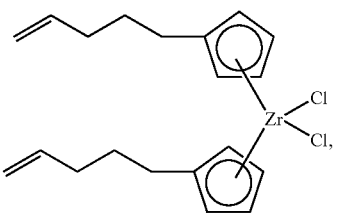
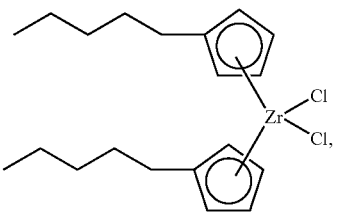
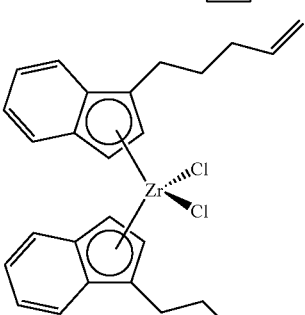
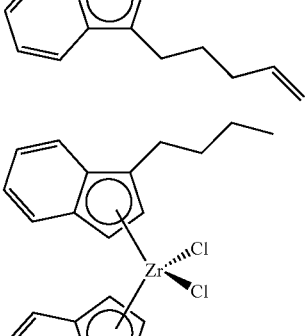
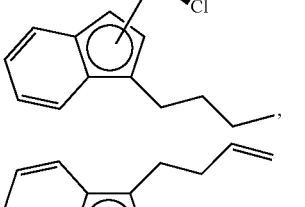
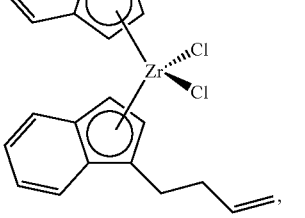
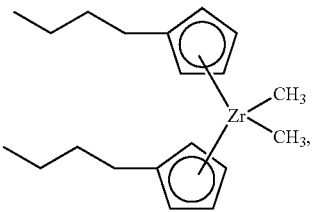

-continued

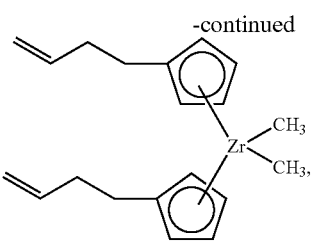

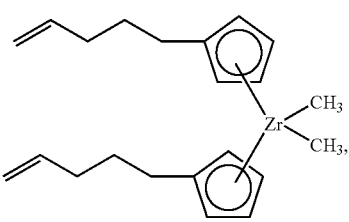

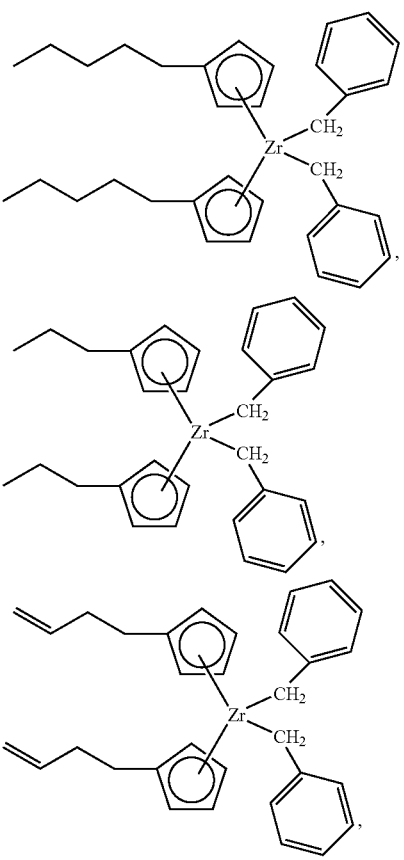

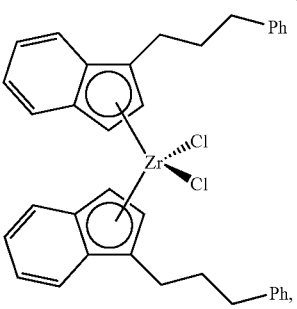

or any combination thereof.

In yet another aspect, the at least one second metallocene can comprise a compound having the formula:

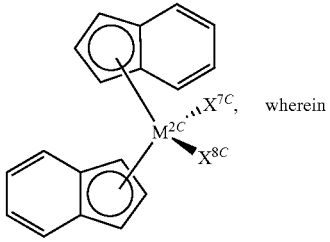

(IIC)

wherein $M^{2C}$ is zirconium or hafnium; and
$X^{7C}$ and $X^{8C}$ are independently benzyl, Cl, or methyl.

In still another aspect, the at least one second metallocene can be selected from

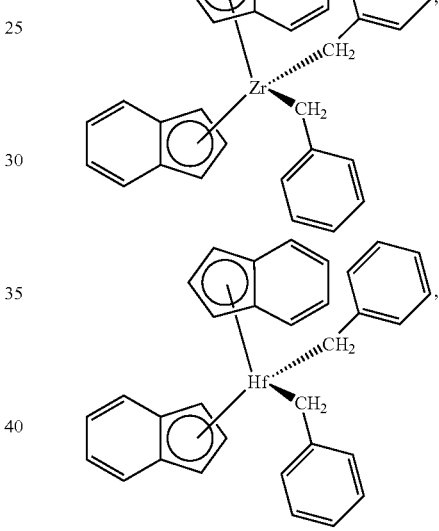

or a combination thereof.

In yet a further aspect of this invention, the at least one second metallocene can comprise unbridged $\eta^5$-cyclopentadienyl-type ligands selected from one substituted cyclopentadienyl and one optionally substituted indenyl ligand. In this aspect, the at least one second metallocene comprises an unbridged metallocene having the formula:

$$(X^9)(X^{10})(X^{11})(X^{12})M^3 \qquad \text{(M3-A), wherein}$$

$M^3$ is zirconium or hafnium;

($X^9$) is a substituted cyclopentadienyl group, wherein one substituent is an aliphatic group, an aromatic group, or a combination of aliphatic and cyclic groups, any of which having up to 20 carbon atoms; ($X^{10}$) is a substituted indenyl group, wherein one substituent is an aliphatic group, an aromatic group, or a combination of aliphatic and cyclic groups, any of which having up to 20 carbon atoms;

($X^{11}$) and ($X^{12}$) are independently: 1) F, Cl, Br, or I; 2) a hydrocarbyl group having up to 20 carbon atoms, H, or BH$_4$; 3) a hydrocarbyloxide group, a hydrocarbylamino group, or a trihydrocarbylsilyl group, any of which having up to 20 carbon atoms; or 4) OBR$^C_2$ or SO$_3$R$^C$, wherein R$^C$ is an alkyl group or an aryl group, any of which having up to 12 carbon atoms; and any additional substituent on the substituted cyclopentadienyl or substituted indenyl is independently an aliphatic group, an aromatic group, a cyclic group, a combination of aliphatic and cyclic groups, an oxygen group, a sulfur group, a nitrogen group, a phosphorus group, an arsenic group, a carbon group, a silicon group, or a boron group, any of which having from 1 to 20 carbon atoms; a halide; or hydrogen.

In another aspect, the at least one second metallocene can comprise an unbridged metallocene having the formula:

$(X^9)(X^{10})(X^{11})(X^{12})M^3$     (M3-B), wherein

M$^3$ is zirconium or hafnium;

(X$^9$) is a substituted cyclopentadienyl group, wherein any substituent is independently a linear or branched alkyl group having up to 12 carbon atoms;

(X$^{10}$) is a substituted indenyl group, wherein any substituent is independently an aliphatic group, an aromatic group, or a combination of aliphatic and cyclic groups, any of which having up to 20 carbon atoms; and (X$^{11}$) and (X$^{12}$) are independently a hydrocarbyl group having up to 12 carbon atoms, H, BH$_4$, or a halide.

In still another aspect, the at least one second metallocene can comprise an unbridged metallocene having the formula:

$(X^9)(X^{10})(X^{11})(X^{12})M^3$     (M3-C), wherein

M$^3$ is zirconium or hafnium;

(X$^9$) is a substituted cyclopentadienyl group, wherein one substituent is an aliphatic group, an aromatic group, or a combination of aliphatic and cyclic groups, any of which having up to 20 carbon atoms;

(X$^{10}$) is a substituted indenyl group, wherein one substituent is an aliphatic group, an aromatic group, or a combination of aliphatic and cyclic groups, any of which having up to 20 carbon atoms;

(X$^{11}$) and (X$^{12}$) are independently: 1) F, Cl, Br, or I; 2) a hydrocarbyl group having up to 20 carbon atoms, H, or BH$_4$; 3) a hydrocarbyloxide group, a hydrocarbylamino group, or a trihydrocarbylsilyl group, any of which having up to 20 carbon atoms; or 4) OBR$^A_2$ or SO$_3$R$^A$, wherein R$^A$ is an alkyl group or an aryl group, any of which having up to 12 carbon atoms; wherein at least one (X$^{11}$) and (X$^{12}$) is a hydrocarbyl group having up to 20 carbon atoms, H, or BH$_4$; and any additional substituent on the substituted cyclopentadienyl or substituted indenyl is independently an aliphatic group, an aromatic group, a cyclic group, a combination of aliphatic and cyclic groups, an oxygen group, a sulfur group, a nitrogen group, a phosphorus group, an arsenic group, a carbon group, a silicon group, or a boron group, any of which having from 1 to 20 carbon atoms; a halide; or hydrogen.

In yet another aspect, the at least one second metallocene can comprise an unbridged metallocene having the formula:

$(X^9)(X^{10})(X^{11})(X^{12})M^3$     (M3-D), wherein

M$^3$ is zirconium or hafnium;

(X$^9$) is a substituted cyclopentadienyl group, wherein any substituent is independently a linear or branched alkyl group having up to 12 carbon atoms;

(X$^{10}$) is a substituted indenyl group, wherein any substituent is independently an aliphatic group, an aromatic group, or a combination of aliphatic and cyclic groups, any of which having up to 20 carbon atoms; and (X$^{11}$) and (X$^{12}$) are independently a hydrocarbyl group having up to 12 carbon atoms, H, BH$_4$, or a halide, wherein at least one of (X$^7$) and (X$^8$) is a hydrocarbyl group, H, or BH$_4$.

Further to this aspect, the at least one second metallocene can also comprise any combination of metallocenes having the formulas (X$^5$)(X$^6$)(X$^7$)(X$^8$)M$^2$ and (X$^9$)(X$^{10}$)(X$^{11}$)(X$^{12}$)M$^3$, wherein the substituents and the metals are defined above. That is, the at least one second metallocene can comprise any combination of (M2-A), (M2-B), (M2-C), (M2-D), (M3-A), (M3-B), (M3-C), (M3-D), or any combination thereof.

Also in this aspect, the at least one second metallocene can also comprise an unbridged metallocene having the formula:

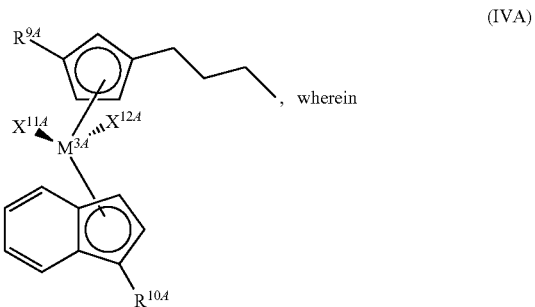

(IVA)

, wherein

M$^{3A}$ is zirconium or hafnium;

R$^{9A}$ is H or CH$_3$;

R$^{10A}$ is H, CH$_2$CH=CH$_2$, CH$_2$CH$_2$CH=CH$_2$, CH$_2$CH$_2$CH$_2$CH=CH$_2$, CH$_2$CH$_2$CH$_2$Ph, or CH$_2$CH$_2$CH$_2$CH$_3$; and X$^{11A}$ and X$^{12A}$ are independently F, Cl, Br, I, benzyl, phenyl, or methyl.

In a further aspect of the invention, the at least one second metallocene can comprise a compound having the formula:

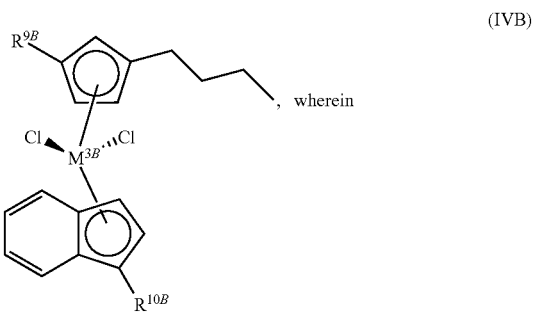

(IVB)

, wherein

M$^{3B}$ is zirconium or hafnium;

R$^{9B}$ is H or CH$_3$; and

R$^{10B}$ is H, CH$_2$CH=CH$_2$, CH$_2$CH$_2$CH=CH$_2$, CH$_2$CH$_2$CH$_2$Ph, or CH$_2$CH$_2$CH$_2$CH$_3$.

In still another aspect, the at least one second metallocene can be selected from
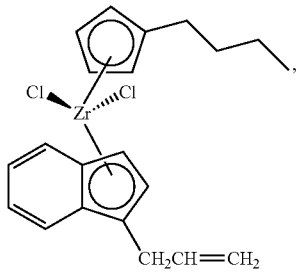
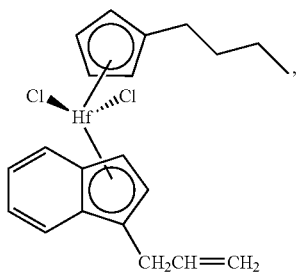
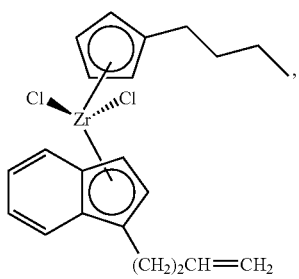
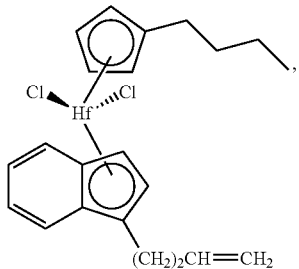
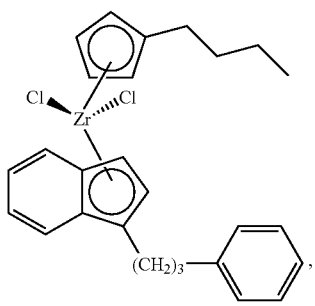
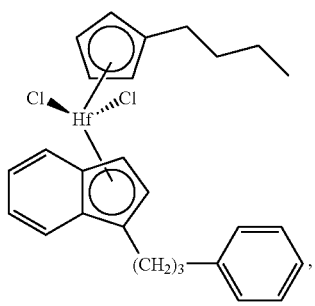
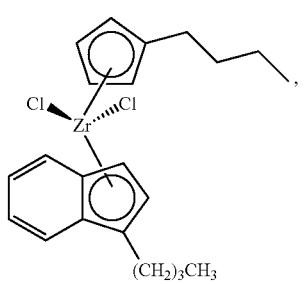
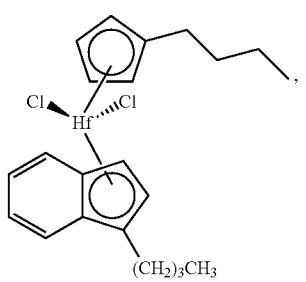
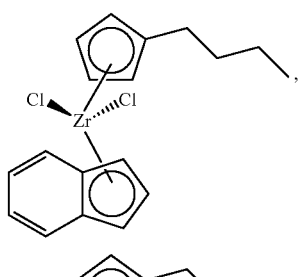
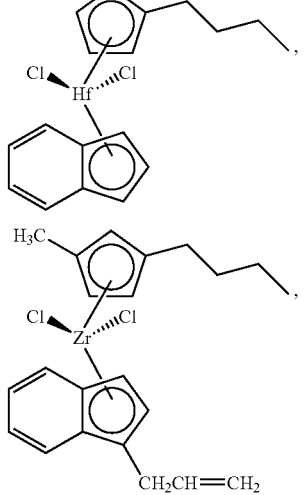

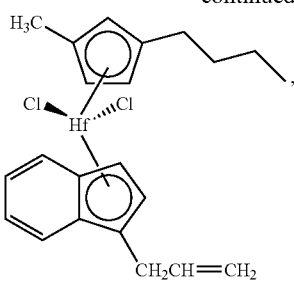

or any combination thereof.

In still another aspect, the at least one second metallocene of this invention can comprise, or can be selected from, any subset of the second metallocene formulas illustrated above. For example, the at least one second metallocene can comprise, or can be selected from,

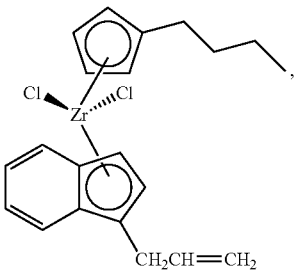

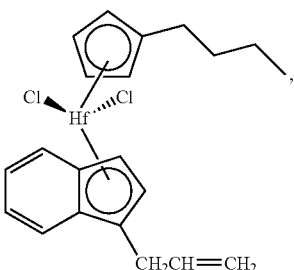

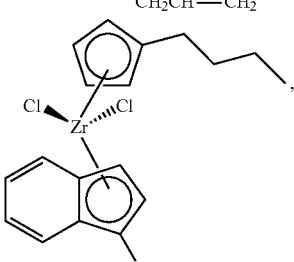

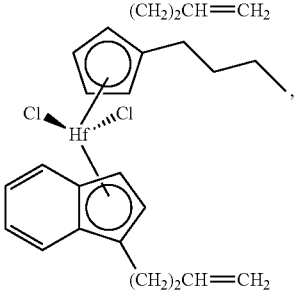

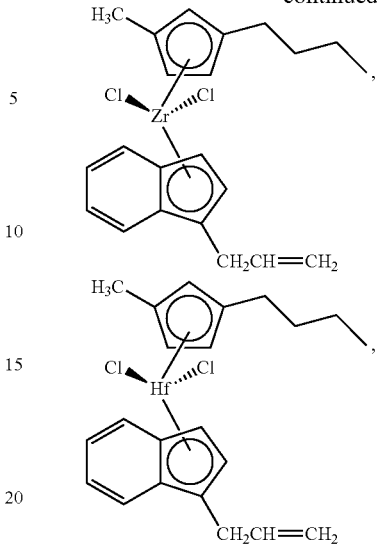

or any combination thereof.

In a further aspect, the metallocene component of this invention, that is, the at least one first metallocene and the at least one second metallocene, can comprises any first metallocene or combination of first metallocenes having the formula $(X^1)(X^2)(X^3)(X^4)M^1$, combined with any second metallocene or combination of second metallocenes having the formulas $(X^5)(X^6)(X^7)(X^8)M^2$ or $(X^9)(X^{10})(X^{11})(X^{12})M^3$, wherein the substituents and the metals are defined herein. That is, the metallocene component can comprise any first metallocene or combination of first metallocenes having the formulas (M1-A), (M2-B), or any combination thereof, combined with any second metallocene or combination of metallocenes having the formula (M2-A), (M2-B), (M2-C), (M2-D), (M3-A), (M3-B), (M3-C), (M3-D), or any combination thereof. FIG. 1 illustrates the formulas of some metallocenes that were used as disclosed in the Examples.

The Organoaluminum Compound

In one aspect, the present invention provides a catalyst composition comprising at least one first (ansa) metallocene compound, at least one second metallocene compound, at least one activator, and optionally at least one co-catalyst such as an organoaluminum compound. Organoaluminum compounds that can be used in this invention include, but are not limited to compound with the formula:

$$Al(X^{13})_n(X^{14})_{3-n},$$

wherein $(X^{13})$ is a hydrocarbyl having from 1 to 20 carbon atoms; $(X^{14})$ is an alkoxide or an aryloxide, any of which having from 1 to 20 carbon atoms, halide, or hydride; and n is a number from 1 to 3, inclusive. In one aspect, $(X^{13})$ is an alkyl having from 1 to about 10 carbon atoms. Examples of $(X^{13})$ moieties include, but are not limited to, methyl, ethyl, propyl, butyl, hexyl, heptyl, octyl, and the like. In another aspect, examples of $(X^{13})$ moieties include, but are not limited to, methyl, ethyl, isopropyl, n-propyl, n-butyl, sec-butyl, isobutyl, 1-hexyl, 2-hexyl, 3-hexyl, isohexyl, heptyl, octyl, and the like. In another aspect, $(X^{14})$ can be independently selected from fluoride, chloride, bromide, methoxide, ethoxide, or hydride. In yet another aspect, $(X^{14})$ can be chloride.

In the formula $Al(X^{13})_n(X^{14})_{3-n}$, n is a number from 1 to 3 inclusive, and typically, n is 3. The value of n is not restricted to be an integer, therefore this formula includes sesquihalide compounds, other organoaluminum cluster compounds, and the like.

Generally, examples of organoaluminum compounds that can be used in this invention include, but are not limited to, trialkylaluminum compounds, dialkylaluminium halide compounds, dialkylaluminum alkoxide compounds, dialkylaluminum hydride compounds, and combinations thereof. Examples of organoaluminum compounds that are useful in this invention include, but are not limited to trimethylaluminum, triethylaluminum, tripropylaluminum, tributylaluminum, tri-n-butylaluminum (TNBA), triisobutylaluminum (TIBA), trihexylaluminum, triisohexylaluminum, trioctylaluminum, diethylaluminum ethoxide, diisobutylaluminum hydride, diethylaluminum chloride, or any combination thereof. If the particular alkyl isomer is not specified, the compound is intended to encompass all isomers that can arise from a particular specified alkyl group. Thus, in another aspect, examples of organoaluminum compounds that can be used in this invention include, but are not limited to, trimethylaluminum, triethylaluminum, tripropylaluminum, tributylaluminum, triisobutylaluminum, trihexylaluminum, triisohexylaluminum, trioctylaluminum, diethylaluminum ethoxide, diisobutylaluminum hydride, diethylaluminum chloride, or any combination thereof.

In one aspect, the present invention encompasses precontacting the at least one first metallocene, precontacting the at least one second metallocene, or precontacting both the at least one first and the at least one second metallocenes, and optionally an olefin monomer, and optionally at least one organoaluminum co-catalyst, to form a precontacted mixture, prior to contact this precontacted mixture with any activator, such as an activator-support, to form the active catalyst. When the catalyst composition is prepared in this manner, typically, though not necessarily, a portion of the organoaluminum co-catalyst compound can be added to the precontacted mixture and another portion of the organoaluminum compound can be added to the postcontacted mixture prepared when the precontacted mixture is contacted with the activator. However, all of the organoaluminum compound can be used to prepare the catalyst in either the precontacting or postcontacting step. Alternatively, the catalyst components can be contacted in any order in multiple steps, or all the catalyst components can be contacted at substantially the same time in a single step.

Further, more than one organoaluminum compounds can be used, in either the precontacting or the postcontacting step, or in any procedure in which the catalyst components are contacted. When an organoaluminum compound is added in multiple steps, the amounts of organoaluminum compound disclosed herein include the total amount of organoaluminum compound used in both the precontacted and postcontacted mixtures, and any additional organoaluminum compound added to the polymerization reactor. Therefore, total amounts of organoaluminum compounds are disclosed, regardless of whether a single organoaluminum compound is used, or more than one organoaluminum compound. In another aspect, typical organoaluminum compounds used in this invention include, but are not limited to, triethylaluminum (TEA), tri-n-butylaluminum, triisobutylaluminum, or any combination thereof.

The Activator

In one aspect, the present invention encompasses a catalyst composition comprising at least one first metallocene compound as disclosed herein; at least one second metallocene as disclosed herein; optionally, at least one organoaluminum compound; and at least one activator. In another aspect, the at least one activator can be an activator-support, selected from a solid oxide treated with an electron-withdrawing anion, a layered mineral, an ion-exchangeable activator-support, or any combination thereof, an organoaluminoxane compound; an organoboron compound; an organoborate compound; or any combination of any of these activators; each of which is provided herein.

Chemically-Treated Solid Oxide Activator-Supports

In one aspect, the present invention encompasses catalyst compositions comprising an activator-support, which can be, or can comprise, a chemically-treated solid oxide, and which is typically used in combination with an organoaluminum compound. In another aspect, the activator-support comprises at least one solid oxide treated with at least one electron-withdrawing anion; wherein the solid oxide can be silica, alumina, silica-alumina, aluminophosphate, aluminum phosphate, zinc aluminate, heteropolytungstates, titania, zirconia, magnesia, boria, zinc oxide, mixed oxides thereof, and the like, or any mixture or combination thereof, and wherein the electron-withdrawing anion can be fluoride, chloride, bromide, phosphate, triflate, bisulfate, sulfate, fluoroborate, fluorosulfate, trifluoroacetate, fluorophosphates, fluorozirconate, fluorosilicate, fluorotitanate, permanganate, substituted or unsubstituted alkanesulfonate, substituted or unsubstituted arenesulfonate, and the like, or any combination thereof.

The activator-support includes the contact product of at least one solid oxide compound and at least one electron-withdrawing anion source. In one aspect, the solid oxide compound comprises an inorganic oxide. The solid oxide can be optionally calcined prior to contacting the electron-withdrawing anion source. The contact product can also be calcined either during or after the solid oxide compound is contacted with the electron-withdrawing anion source. In this aspect, the solid oxide compound can be calcined or uncalcined. In another aspect, the activator-support can comprise the contact product of at least one calcined solid oxide compound and at least one electron-withdrawing anion source.

In one aspect, the activator-support typically exhibits enhanced activity as compared to the corresponding untreated solid oxide compound. Thus, the activator-support can function as a catalyst activator as compared to the corresponding untreated solid oxide. While not intending to be bound by theory, it is believed that the activator-support can function as solid oxide supporting compound with an additional ionizing, polarizing, or bond weakening function, collectively termed an "activating" function, by weakening the metal-ligand bond between an anionic ligand and the metal in the metallocene. Thus, the activator-support is considered to exhibit an "activating" function, regardless of whether it is ionizes the metallocene, abstracts an anionic ligand to form an ion pair, weakens the metal-ligand bond in the metallocene, simply coordinates to an anionic ligand when it contacts the activator-support, or any other mechanisms by which ionizing, polarizing, or bond weakening might occur. In preparing the metallocene-based catalyst composition of this invention, the activator-support is typically used along with a component that provides an activatable ligand such as an alkyl or hydride ligand to the metallocene, including but not limited to at least one organoaluminum compound, when the metallocene compound does not already comprise such a ligand.

In still another aspect, the activator-support of this invention comprises a solid inorganic oxide material, a mixed oxide material, or a combination of inorganic oxide materials, that is chemically-treated with an electron-withdrawing component, and optionally treated with at least one other metal ion.

Thus, the solid oxide of this invention encompasses oxide materials such as alumina, "mixed oxide" compounds such as silica-alumina or silica-zirconia or silica-titania, and combinations and mixtures thereof. The mixed metal oxide compounds such as silica-alumina, with more than one metal combined with oxygen to form a solid oxide compound, can be made by co-gellation, impregnation or chemical deposition, and are encompassed by this invention.

In yet another aspect of this invention, the activator-support further comprises a metal or metal ion such as zinc, nickel, vanadium, silver, copper, gallium, tin, tungsten, molybdenum, or any combination thereof. Examples of activator-supports that further comprise a metal or metal ion include, but are not limited to, zinc-impregnated chlorided alumina, zinc-impregnated fluorided alumina, zinc-impregnated chlorided silica-alumina, zinc-impregnated fluorided silica-alumina, zinc-impregnated sulfated alumina, or any combination thereof.

In another aspect, the activator-support of this invention comprises a solid oxide of relatively high porosity, which exhibits Lewis acidic or Brønsted acidic behavior. The solid oxide is chemically-treated with an electron-withdrawing component, typically an electron-withdrawing anion, to form a activator-support. While not intending to be bound by the following statement, it is believed that treatment of the inorganic oxide with an electron-withdrawing component augments or enhances the acidity of the oxide. Thus, the activator-support exhibits Lewis or Brønsted acidity which is typically greater than the Lewis or Brønsted acidity of the untreated solid oxide. One method to quantify the acidity of the chemically-treated and untreated solid oxide materials is by comparing the polymerization activities of the treated and untreated oxides under acid catalyzed reactions.

In one aspect, the chemically-treated solid oxide comprises a solid inorganic oxide comprising oxygen and at least one element selected from Group 2, 3, 4, 5, 6, 7, 8, 9, 10, 11, 12, 13, 14, or 15 of the periodic table, or comprising oxygen and at least one element selected from the lanthanide or actinide elements. (See: *Hawley's Condensed Chemical Dictionary*, 11$^{th}$ Ed., John Wiley & Sons; 1995; Cotton, F. A.; Wilkinson, G.; Murillo; C. A.; and Bochmann; M. *Advanced Inorganic Chemistry*, 6$^{th}$ Ed., Wiley-Interscience, 1999.) Usually, the inorganic oxide comprises oxygen and at least one element selected from Al, B, Be, Bi, Cd, Co, Cr, Cu, Fe, Ga, La, Mn, Mo, Ni, Sb, Si, Sn, Sr, Th, Ti, V, W, P, Y, Zn or Zr.

Suitable examples of solid oxide materials or compounds that can be used in the chemically-treated solid oxide of the present invention include, but are not limited to, $Al_2O_3$, $B_2O_3$, $BeO$, $Bi_2O_3$, $CdO$, $Co_3O_4$, $Cr_2O_3$, $CuO$, $Fe_2O_3$, $Ga_2O_3$, $La_2O_3$, $Mn_2O_3$, $MoO_3$, $NiO$, $P_2O_5$, $Sb_2O_5$, $SiO_2$, $SnO_2$, $SrO$, $ThO_2$, $TiO_2$, $V_2O_5$, $WO_3$, $Y_2O_3$, $ZnO$, $ZrO_2$, and the like, including mixed oxides thereof, and combinations thereof. Examples of mixed oxides that can be used in the activator-support of the present invention include, but are not limited to, mixed oxides of any combination of Al, B, Be, Bi, Cd, Co, Cr, Cu, Fe, Ga, La, Mn, Mo, Ni, P, Sb, Si, Sn, Sr, Th, Ti, V, W, Y, Zn, Zr, and the like. Examples of mixed oxides that can be used in the activator-support of the present invention also include, but are not limited to, silica-alumina, silica-titania, silica-zirconia, zeolites, many clay minerals, pillared clays, alumina-titania, alumina-zirconia, aluminophosphate, and the like.

In a further aspect of this invention, the solid oxide material is chemically-treated by contacting it with at least one electron-withdrawing component, typically an electron-withdrawing anion source. Further, the solid oxide material is optionally chemically-treated with at least one other metal ion, that can be the same as or different from any metal element that constitutes the solid oxide material, then calcining to form a metal-containing or metal-impregnated chemically-treated solid oxide. Alternatively, a solid oxide material and an electron-withdrawing anion source are contacted and calcined simultaneously. The method by which the oxide is contacted with an electron-withdrawing component, typically a salt or an acid of an electron-withdrawing anion, includes, but is not limited to, gelling, co-gelling, impregnation of one compound onto another, and the like. Typically, following any contacting method, the contacted mixture of oxide compound, electron-withdrawing anion, and optionally the metal ion is calcined.

The electron-withdrawing component used to treat the oxide can be any component that increases the Lewis or Brønsted acidity of the solid oxide upon treatment. In one aspect, the electron-withdrawing component is typically an electron-withdrawing anion derived from a salt, an acid, or other compound such as a volatile organic compound that can serve as a source or precursor for that anion. Examples of electron-withdrawing anions include, but are not limited to, fluoride, chloride, bromide, iodide, phosphate, triflate, bisulfate, sulfate, fluoroborate, fluorosulfate, trifluoroacetate, phosphate, fluorophosphate, fluorozirconate, fluorosilicate, fluorotitanate, permanganate, substituted or unsubstituted alkanesulfonate, substituted or unsubstituted arenesulfonate, and the like, including any mixtures and combinations thereof. In addition, other ionic or non-ionic compounds that serve as sources for these electron-withdrawing anions can also be employed in the present invention. In one aspect, the chemically-treated solid oxide comprises a sulfated solid oxide, and in another aspect, the chemically-treated oxide comprises sulfated alumina.

As used herein, the term alkanesulfonate refers to anions having the general formula $[R^BSO_2O]^-$, wherein $R^B$ is a linear or branched alkyl group having up to 20 carbon atoms, that is optionally substituted with at least one group selected independently from F, Cl, Br, I, OH, OMe, OEt, $OCF_3$, Ph, xylyl, mesityl, or OPh. Thus, the alkanesulfonate may be referred to as a substituted or an unsubstituted alkanesulfonate. In one aspect, the alkyl group of the alkanesulfonate can have up to 12 carbon atoms. In another aspect, the alkyl group of the alkanesulfonate can have up to 8 carbon atoms, or up to 6 carbon atoms. In yet another aspect, examples of alkanesulfonates include, but are not limited to, methanesulfonate, ethanesulfonate, 1-propanesulfonate, 2-propanesulfonate, 3-methylbutanesulfonate, trifluoromethane-sulfonate, trichloromethanesulfonate, chloromethanesulfonate, 1-hydroxy-ethanesulfonate, 2-hydroxy-2-propanesulfonate, 1-methoxy-2-propanesulfonate, and the like.

Also as used herein, the term arenesulfonate refers to anions having the general formula $[Ar^4SO_2O]^-$, wherein $Ar^4$ is an aryl group having up to 14 carbon atoms, that is optionally substituted with at least one group selected independently from F, Cl, Br, I, Me, Et, Pr, Bu, OH, OMe, OEt, OPr, OBu, $OCF_3$, Ph, or OPh. Thus, the arenesulfonate may be referred to as a substituted or an unsubstituted arenesulfonate. In one aspect, the aryl group of the arenesulfonate can have up to 10 carbon atoms. In another aspect, the aryl group of the arenesulfonate can have 6 carbon atoms. In yet another aspect, examples of arenesulfonates include, but are not limited to, benzenesulfonate, naphthalenesulfonate, p-toluenesulfonate, m-toluenesulfonate, 3,5-xylenesulfonate, trifluoromethoxybenzenesulfonate, trichloromethoxybenzenesulfonate, trifluoromethylbenzenesulfonate, trichloromethyl-benzenesulfonate, fluorobenzenesulfonate, chlorobenzenesulfonate, 1-hydroxy-ethanebenzenesulfonate, 3-fluoro-4-methoxy-benzenesulfonate, and the like.

When the electron-withdrawing component comprises a salt of an electron-withdrawing anion, the counterion or cation of that salt can be any cation that allows the salt to revert or decompose back to the acid during calcining. Factors that dictate the suitability of the particular salt to serve as a source for the electron-withdrawing anion include, but are not limited to, the solubility of the salt in the desired solvent, the lack of adverse reactivity of the cation, ion-pairing effects between the cation and anion, hygroscopic properties imparted to the salt by the cation, and the like, and thermal stability of the anion. Examples of suitable cations in the salt of the electron-withdrawing anion include, but are not limited to, ammonium, trialkyl ammonium, tetraalkyl ammonium, tetraalkyl phosphonium, $H^+$, $[H(OEt_2)_2]^+$, and the like.

Further, combinations of one or more different electron withdrawing anions, in varying proportions, can be used to tailor the specific acidity of the activator-support to the desired level. Combinations of electron withdrawing components can be contacted with the oxide material simultaneously or individually, and any order that affords the desired activator-support acidity. For example, one aspect of this invention is employing two or more electron-withdrawing anion source compounds in two or more separate contacting steps. Thus, one example of such a process by which an activator-support is prepared is as follows. A selected solid oxide compound, or combination of oxide compounds, is contacted with a first electron-withdrawing anion source compound to form a first mixture, this first mixture is then calcined, the calcined first mixture is then contacted with a second electron-withdrawing anion source compound to form a second mixture, followed by calcining said second mixture to form a treated solid oxide compound. In such a process, the first and second electron-withdrawing anion source compounds are typically different compounds, although they can be the same compound.

In one aspect of the invention, the solid oxide activator-support is produced by a process comprising:

1) contacting a solid oxide compound with at least one electron-withdrawing anion source compound to form a first mixture; and 2) calcining the first mixture to form the solid oxide activator-support.

In another aspect of this invention, the solid oxide activator-support is produced by a process comprising:

1) contacting at least one solid oxide compound with a first electron-withdrawing anion source compound to form a first mixture; and 2) calcining the first mixture to produce a calcined first mixture;

3) contacting the calcined first mixture with a second electron-withdrawing anion source compound to form a second mixture; and 4) calcining the second mixture to form the solid oxide activator-support. Thus, the solid oxide activator-support is sometimes referred to simply as a treated solid oxide compound.

Another aspect of this invention producing or forming the solid oxide activator-support by contacting at least one solid oxide with at least one electron-withdrawing anion source compound, wherein the at least one solid oxide compound is calcined before, during or after contacting the electron-withdrawing anion source, and wherein there is a substantial absence of aluminoxanes and organoborates.

In one aspect of this invention, once the solid oxide has been treated and dried, can be subsequently calcined. Calcining of the treated solid oxide is generally conducted in an ambient or inert atmosphere, typically in a dry ambient atmosphere, at a temperature from about 200° C. to about 900° C., and for a time of about 1 minute to about 100 hours. In another aspect, calcining is conducted at a temperature from about 300° C. to about 800° C. and in another aspect, calcining is conducted at a temperature from about 400° C. to about 700° C. In yet another aspect, calcining is conducted from about 1 hour to about 50 hours, and in another aspect calcining is conducted, from about 3 hours to about 20 hours. In still another aspect, calcining can be carried out from about 1 to about 10 hours at a temperature from about 350° C. to about 550° C.

Further, any type of suitable ambient can be used during calcining. Generally, calcining is conducted in an oxidizing atmosphere, such as air. Alternatively, an inert atmosphere, such as nitrogen or argon, or a reducing atmosphere such as hydrogen or carbon monoxide, can be used.

In another aspect of the invention, the solid oxide component used to prepare the chemically-treated solid oxide has a pore volume greater than about 0.1 cc/g. In another aspect, the solid oxide component has a pore volume greater than about 0.5 cc/g, and in yet another aspect, greater than about 1.0 cc/g. In still another aspect, the solid oxide component has a surface area from about 100 to about 1000 m²/g. In another aspect, solid oxide component has a surface area from about 200 to about 800 m²/g, and in still another aspect, from about 250 to about 600 m²/g.

The solid oxide material can be treated with a source of halide ion or sulfate ion, or a combination of anions, and optionally treated with at least one metal ion, then calcined to provide the activator-support in the form of a particulate solid. In one aspect, the solid oxide material is treated with a source of sulfate, termed a sulfating agent, a source of chloride ion, termed a chloriding agent, a source of fluoride ion, termed a fluoriding agent, or a combination thereof, and calcined to provide the solid oxide activator. In another aspect, useful acidic activator-supports include, but are not limited to: bromided alumina; chlorided alumina; fluorided alumina; sulfated alumina; bromided silica-alumina, chlorided silica-alumina; fluorided silica-alumina; sulfated silica-alumina; bromided silica-zirconia, chlorided silica-zirconia; fluorided silica-zirconia; sulfated silica-zirconia; chlorided zinc-alumina, triflate treated silica-alumina, a pillared clay such as a pillared montmorillonite, optionally treated with fluoride, chloride, or sulfate; phosphated alumina, or other aluminophosphates, optionally treated with sulfate, fluoride, or chloride; or any combination thereof. Further, any of the activator-supports can optionally be treated with at least one other metal ion, typically from a metal salt or compound, wherein the metal ion can be the same as or different from any metal that makes up the solid oxide material.

In one aspect of this invention, the treated oxide activator-support comprises a fluorided solid oxide in the form of a particulate solid, thus a source of fluoride ion is added to the oxide by treatment with a fluoriding agent. In still another aspect, fluoride ion can be added to the oxide by forming a slurry of the oxide in a suitable solvent such as alcohol or water, including, but are not limited to, the one to three carbon alcohols because of their volatility and low surface tension. Examples of fluoriding agents that can be used in this invention include, but are not limited to, hydrofluoric acid (HF), ammonium fluoride ($NH_4F$), ammonium bifluoride ($NH_4HF_2$), ammonium tetrafluoroborate ($NH_4BF_4$), ammonium silicofluoride (hexafluorosilicate) (($NH_4)_2SiF_6$), ammonium hexafluorophosphate ($NH_4PF_6$), tetrafluoroboric acid ($HBF_4$), ammonium hexafluorotitanate ($(NH_4)_2TiF_6$, ammonium hexafluorozirconate $(NH_4)_2ZrF_6$, analogs thereof, and combinations thereof. For example, ammonium bifluoride $NH_4HF_2$ can be used as the fluoriding agent, due to its ease of use and ready availability.

In another aspect of the present invention, the solid oxide can be treated with a fluoriding agent during the calcining step. Any fluoriding agent capable of thoroughly contacting the solid oxide during the calcining step can be used. For example, in addition to those fluoriding agents described previously, volatile organic fluoriding agents can be used. Examples of volatile organic fluoriding agents useful in this aspect of the invention include, but are not limited to, freons, perfluorohexane, perfluorobenzene, fluoromethane, trifluoroethanol, and combinations thereof. Gaseous hydrogen fluoride or fluorine itself can also be used with the solid oxide is fluorided during calcining. One convenient method of contacting the solid oxide with the fluoriding agent is to vaporize a fluoriding agent into a gas stream used to fluidize the solid oxide during calcination.

Similarly, in another aspect of this invention, the chemically-treated solid oxide comprises a chlorided solid oxide in the form of a particulate solid, thus a source of chloride ion is added to the oxide by treatment with a chloriding agent. The chloride ion can be added to the oxide by forming a slurry of the oxide in a suitable solvent. In another aspect of the present invention, the solid oxide can be treated with a chloriding agent during the calcining step. Any chloriding agent capable of serving as a source of chloride and thoroughly contacting the oxide during the calcining step can be used. For example, volatile organic chloriding agents can be used. Examples of volatile organic chloriding agents useful in this aspect of the invention include, but are not limited to, certain freons, perchlorobenzene, chloromethane, dichloromethane, chloroform, carbon tetrachloride, trichloroethanol, or any combination thereof. Gaseous hydrogen chloride or chlorine itself can also be used with the solid oxide during calcining. One convenient method of contacting the oxide with the chloriding agent is to vaporize a chloriding agent into a gas stream used to fluidize the solid oxide during calcination.

When the activator-support comprises a chemically-treated solid oxide comprising a solid oxide treated with an electron-withdrawing anion, the electron withdrawing anion can be typically added to the solid oxide in an amount greater than about 1% by weight of the solid oxide. In another aspect the electron withdrawing anion can be added to the solid oxide in an amount greater than about 2% by weight of the solid oxide, greater than about 3% by weight of the solid oxide, greater than about 5% by weight of the solid oxide, or greater than about 7% by weight of the solid oxide.

In one aspect, the amount of electron-withdrawing ion, for example fluoride or chloride ion, present before calcining the solid oxide is generally from about 2 to about 50% by weight, where the weight percents are based on the weight of the solid oxide, for example silica-alumina, before calcining. In another aspect, the amount of electron-withdrawing ion, for example fluoride or chloride ion, present before calcining the solid oxide is from about 3 to about 25% by weight, and in another aspect, from about 4 to about 20% by weight. When halide ion is used as the electron-withdrawing anion, it is used in an amount sufficient to deposit, after calcining, from about 0.1% to about 50% by weight halide ion relative to the weight of the solid oxide. In another aspect, halide is used in an amount sufficient to deposit, after calcining, from about 0.5% to about 40% by weight halide ion relative to the weight of the solid oxide, or from about 1% to about 30% by weight halide ion relative to the weight of the solid oxide. If the fluoride or chloride ion is added during calcining, such as when calcined in the presence of $CCl_4$, there is typically no, or only trace levels, of fluoride or chloride ion in the solid oxide before calcining. Once impregnated with halide, the halided oxide can be dried by any method known in the art including, but not limited to, suction filtration followed by evaporation, drying under vacuum, spray drying, and the like, although it is also possible to initiate the calcining step immediately without drying the impregnated solid oxide.

The silica-alumina used to prepare the treated silica-alumina can have a pore volume greater than about 0.5 cc/g. In one aspect, the pore volume can be greater than about 0.8 cc/g, and in another aspect, the pore volume can be greater than about 1.0 cc/g. Further, the silica-alumina can have a surface area greater than about 100 $m^2/g$. In one aspect, the surface area is greater than about 250 $m^2/g$, and in another aspect, the surface area can be greater than about 350 $m^2/g$. Generally, the silica-alumina of this invention has an alumina content from about 5 to about 95%. In one aspect, the alumina content of the silica-alumina can be from about 5 to about 50%, and in another aspect, the alumina content of the silica-alumina can be from about 8% to about 30% alumina by weight.

The sulfated solid oxide comprises sulfate and a solid oxide component such as alumina or silica-alumina, in the form of a particulate solid. Optionally, the sulfated oxide is further treated with a metal ion such that the calcined sulfated oxide comprises a metal. In one aspect, the sulfated solid oxide comprises sulfate and alumina. In one aspect of this invention, the sulfated alumina is formed by a process wherein the alumina is treated with a sulfate source, including for example, but not limited to, sulfuric acid or a sulfate salt such as ammonium sulfate, zinc sulfate, aluminum sulfate, nickel sulfate or copper sulfate. In one aspect, this process can be performed by forming a slurry of the alumina in a suitable solvent such as alcohol or water, in which the desired concentration of the sulfating agent has been added. Suitable organic solvents include, but are not limited to, the one to three carbon alcohols because of their volatility and low surface tension.

In this aspect, the amount of sulfate ion present before calcining is generally from about 1% to about 50% by weight, from about 2% to about 30% by weight, of from about 5% to about 25% by weight, where the weight percents are based on the weight of the solid oxide before calcining. Once impregnated with sulfate, the sulfated oxide can be dried by any method known in the art including, but not limited to, suction filtration followed by evaporation, drying under vacuum, spray drying, and the like, although it is also possible to initiate the calcining step immediately.

In addition to being treated with an electron-withdrawing component such as halide or sulfate ion, the solid inorganic oxide of this invention can optionally be treated with a metal source, including metal salts or metal-containing compounds. In one aspect of the invention, these compounds can be added to or impregnated onto the solid oxide in solution form, and subsequently converted into the supported metal upon calcining. Accordingly, the solid inorganic oxide can further comprise a metal selected from zinc, nickel, vanadium, silver, copper, gallium, tin, tungsten, molybdenum, or a combination thereof. For example, zinc can be used to impregnate the solid oxide because it provides good catalyst activity and low cost. The solid oxide can be treated with metal salts or metal-containing compounds before, after, or at the same time that the solid oxide is treated with the electron-withdrawing anion.

Further, any method of impregnating the solid oxide material with a metal can be used. The method by which the oxide is contacted with a metal source, typically a salt or metal-containing compound, includes, but is not limited to, gelling, co-gelling, impregnation of one compound onto another, and the like. Following any contacting method, the contacted mixture of oxide compound, electron-withdrawing anion, and the metal ion is typically calcined. Alternatively, a solid oxide material, an electron-withdrawing anion source, and the metal salt or metal-containing compound are contacted and calcined simultaneously.

In another aspect, the ansa-metallocene compound can be contacted with an olefin monomer and an organoaluminum cocatalyst for a first period of time prior to contacting this mixture with the acidic activator-support. Once the precontacted mixture of metallocene, monomer, and component that provides an activatable ligand to the metallocene, including but not limited to an organoaluminum cocatalyst, is contacted with the acidic activator-support, the composition further comprising the acidic activator-support is termed the "postcontacted" mixture. The postcontacted mixture can be allowed to remain in further contact for a second period of time prior to being charged into the reactor in which the polymerization process will be carried out.

Various processes to prepare solid oxide activator-supports that can be employed in this invention have been reported. For example, U.S. Pat. Nos. 6,107,230, 6,165,929, 6,294,494, 6,300,271, 6,316,553, 6,355,594, 6,376,415, 6,391,816, 6,395,666, 6,524,987, and 6,548,441, describe such methods, each of which is incorporated by reference herein, in its entirety.

Ion-Exchangeable Activator-Supports and Layered Mineral Activator-Supports

In one aspect of this invention, the activator-support used in preparing the catalyst compositions of this invention can be, or can comprise, an ion-exchangeable activator-support, including but not limited to silicate and aluminosilicate compounds or minerals, either with layered or non-layered structures, and any combination thereof. In another aspect of this invention, ion-exchangeable, layered aluminosilicates such as pillared clays can be used as activator-supports. When the activator-support comprises an ion-exchangeable activator-support, it can optionally be treated with at least one electron-withdrawing anion such as those disclosed herein, though typically the ion-exchangeable activator-support is not treated with an electron-withdrawing anion.

In another aspect, the activator-support of this invention can be, or can comprise, clay minerals having exchangeable cations and layers capable of expanding. Typical clay mineral activator-supports include, but are not limited to, ion-exchangeable, layered aluminosilicates such as pillared clays. Although the term "support" is used, it is not meant to be construed as an inert component of the catalyst composition, but rather is to be considered an active part of the catalyst composition, because of its intimate association with the ansa-metallocene and the component that provides an activatable ligand to the metallocene, such as an organoaluminum. While not intending to be bound by theory, it is believed that the ion exchangeable activator-support serves as an insoluble reactant that reacts with the ansa-metallocene and organoaluminum components to form a catalyst composition used to produce polymer.

In one aspect, the clay materials of this invention encompass materials either in their natural state or that have been treated with various ions by wetting, ion exchange, or pillaring. Typically, the clay material activator-support of this invention comprises clays that have been ion exchanged with large cations, including polynuclear, highly charged metal complex cations. However, the clay material activator-supports of this invention also encompass clays that have been ion exchanged with simple salts, including, but not limited to, salts of Al(III), Fe(II), Fe(III) and Zn(II) with ligands such as halide, acetate, sulfate, nitrate, or nitrite.

In one aspect, the clay activator-support of this invention comprises pillared clays. The term pillared clays is used to refer to clay materials that have been ion exchanged with large, typically polynuclear, highly charged metal complex cations. Examples of such ions include, but are not limited to, Keggin ions which can have charges such as 7+, various polyoxometallates, and other large ions. Thus, the term pillaring refers to a simple exchange reaction in which the exchangeable cations of a clay material are replaced with large, highly charged ions, such as Keggin ions. These polymeric cations are then immobilized within the interlayers of the clay and when calcined are converted to metal oxide "pillars," effectively supporting the clay layers as column-like structures. Thus, once the clay is dried and calcined to produce the supporting pillars between clay layers, the expanded lattice structure is maintained and the porosity is enhanced. The resulting pores can vary in shape and size as a function of the pillaring material and the parent clay material used. Examples of pillaring and pillared clays are found in: T. J. Pinnavaia, *Science* 220 (4595), 365-371 (1983); J. M. Thomas, Intercalation Chemistry, (S. Whittington and A. Jacobson, eds.) Ch. 3, pp. 55-99, Academic Press, Inc., (1972); U.S. Pat. No. 4,452,910; U.S. Pat. No. 5,376,611; and U.S. Pat. No. 4,060,480; each of which is incorporated herein in its entirety.

The pillaring process utilizes clay minerals having exchangeable cations and layers capable of expanding. Any pillared clay that can enhance the polymerization of olefins in the catalyst composition of the present invention can be used. Therefore, suitable clay minerals for pillaring include, but are not limited to: allophanes; smectites, both dioctahedral (Al) and tri-octahedral (Mg) and derivatives thereof such as montmorillonites (bentonites), nontronites, hectorites, or laponites; halloysites; vermiculites; micas; fluoromicas; chlorites; mixed-layer clays; the fibrous clays including but not limited to sepiolites, attapulgites, and palygorskites; a serpentine clay; illite; laponite; saponite; or any combination thereof. In one aspect, the pillared clay activator-support comprises bentonite or montmorillonite, noting that the principal component of bentonite is montmorillonite.

The pillared clay can be pretreated in the present invention. For example, in one embodiment, a pillared bentonite was pretreated by drying at about 300° C. under an inert atmosphere, typically dry nitrogen, for about 3 hours, before being added to the polymerization reactor. This example of a pretreatment is not limiting, because preheating steps such as this many be carried out at many other temperatures and times, including a combination of temperature and time steps, all of which are encompassed by this invention.

The ion-exchangeable activator-supports such as pillared clays used to prepare the catalyst compositions of this invention can be combined with other inorganic support materials, including, but not limited to, zeolites, inorganic oxides, phosphated inorganic oxides, and the like. In one aspect, typical support materials that can be used in this regard include, but are not limited to, silica, silica-alumina, alumina, titania, zirconia, magnesia, boria, fluorided alumina, silated alumina, thoria, aluminophosphate, aluminum phosphate, zinc aluminate, phosphated silica, phosphated alumina, silica-titania, coprecipitated silica/titania, fluorided/silated alumina, and any combination or mixture thereof.

The amount of ansa-metallocene compound in relation to the ion-exchangeable activator-support used to prepare the catalyst composition of this invention is typically from about 0.1 wt % to about 15 wt % ansa-metallocene complex, based on the weight of the activator-support component (not based on the final metallocene-clay mixture). It was also found that from about 1 wt % to about 10 wt % ansa-metallocene works well to afford a catalyst that operates at desired activities.

The mixture of ansa-metallocene and clay activator-support can be contacted and mixed for any length of time to allow thorough contact between the ansa-metallocene and activator-support. Sufficient deposition of the metallocene component on the clay can be achieved without heating a mixture of clay and metallocene complex. For example, the ansa-metallocene compound and the clay material are simply mixed from about room temperature to about 200° F. in order to achieve the deposition of the ansa-metallocene on the clay activator-support. In another aspect, the ansa-metallocene compound and the clay material are mixed from about 100° F. to about 180° F. in order to achieve the deposition of the ansa-metallocene on the clay activator-support.

In another aspect, the present invention encompasses catalyst compositions comprising an acidic activator-support, which can comprise a layered mineral. The term "layered mineral" is used herein to describe materials such as clay minerals, pillared clays, ion-exchanged clays, exfoliated clays, exfoliated clays gelled into another oxide matrix, layered minerals mixed or diluted with other materials, and the like, or any combination thereof. When the acidic activator-support comprises a layered mineral, it can optionally be treated with at least one electron-withdrawing anion such as those disclosed herein, though typically the layered mineral is not treated with an electron-withdrawing anion. For example, at least one clay mineral can be used as the activator-support.

Clay minerals generally include the large group of finely-crystalline, sheet-like layered minerals that are found in nature in fine-grained sediments, sedimentary rocks, and the like, and which constitute a class of hydrous silicate and aluminosilicate minerals with sheet-like structures and very high surface areas. This term is also used to describe hydrous magnesium silicates with a phyllosilicate structure. Examples of clay minerals that can be used in this invention include, but are not limited to, allophanes; smectites, both dioctahedral (Al) and tri-octahedral (Mg) and derivatives thereof such as montmorillonites (bentonites), nontronites, hectorites, or laponites; halloysites; vermiculites; micas; fluoromicas; chlorites; mixed-layer clays; the fibrous clays including but not limited to sepiolites, attapulgites, and palygorskites; a serpentine clay; illite; laponite; saponite; or any combination thereof. Many common clay minerals belong to the kaolinite, montmorillonite, or illite groups of clays. Pillared clays can also be used as the activator-support of this invention, as disclosed herein. Pillared clays comprise clay minerals, typically of the of the smectite group and other phyllosilicates in addition to sepiolites and palygorskites, that have been ion exchanged with large, typically polynuclear, highly charged metal complex cations.

In one aspect of this invention, when layered minerals are used as activator-supports or metallocene activators, the layered minerals are typically calcined prior to their use as activators. Typical calcination temperatures can range from about 100° C. to about 700° C., from about 150° C. to about 500° C., or from about 200° C. to about 400° C.

Organoaluminoxane Activators

In one aspect, the present invention provides a catalyst composition comprising, or a catalyst composition comprising the contact product of, at least one first metallocene; at least one second metallocene; optionally, at least one orga-noaluminum compound; and at least one activator, wherein the activator can be selected independently from:
 i) an activator-support selected from a solid oxide treated with an electron-withdrawing anion, a layered mineral, an ion-exchangeable activator-support, or any combination thereof,
 ii) at least one organoaluminoxane compound;
 iii) at least one organoboron or organoborate compound; or
 iv) any combination thereof.

In another aspect, the present invention provides a catalyst composition comprising the contact product of at least one first metallocene; at least one second metallocene; at least one organoaluminum compound; at least one activator-support comprising a solid oxide treated with an electron-withdrawing anion; and optionally, an aluminoxane cocatalyst. In still another aspect, the present invention provides a catalyst composition comprising a first metallocene compound, a second metallocene compound, an aluminoxane cocatalyst, an optional activator-support, and an optional organoaluminum compound. However, in one aspect, the catalyst composition of this invention is substantially free of aluminoxanes, and in another aspect, the catalyst composition of this invention has polymerization activity in the substantial absence of aluminoxanes.

In another aspect, the present invention provides a catalyst composition comprising at least one first metallocene compound, at least one second metallocene compound, and an aluminoxane. In this aspect, the catalyst composition is not required to comprise an activator-support and the catalyst composition is also not required to comprise an organoaluminum compound. Thus, any combination of first and second metallocene compounds as disclosed herein can be combined with any of the aluminoxanes (poly(hydrocarbyl aluminum oxides)) disclosed herein, or any combination of aluminoxanes disclosed herein, to form a catalyst composition of this invention. Further, any combination of first and second metallocene compounds disclosed herein can be combined with any aluminoxane or combination of aluminoxanes, and optionally, a solid oxide treated with an electron-withdrawing anion; optionally, a layered mineral; optionally, an ion-exchangeable activator-support; optionally, at least one organoboron compound; and optionally, at least one organoborate compound, to form a catalyst composition of this invention.

Aluminoxanes are also referred to as poly(hydrocarbyl aluminum oxides) or organoaluminoxanes. The other catalyst components are typically contacted with the aluminoxane in a saturated hydrocarbon compound solvent, though any solvent which is substantially inert to the reactants, intermediates, and products of the activation step can be used. The catalyst composition formed in this manner can be collected by methods known to those of skill in the art, including but not limited to filtration, or the catalyst composition can be introduced into the polymerization reactor without being isolated.

In one aspect, the aluminoxane compound of this invention is an oligomeric aluminum compound, wherein the aluminoxane compound can comprise linear structures, cyclic, or cage structures, or typically mixtures of all three. Cyclic aluminoxane compounds having the formula:

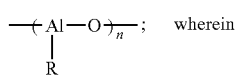; wherein

R is a linear or branched alkyl having from 1 to 10 carbon atoms, and n is an integer from 3 to about 10 are encompassed by this invention. The (AlRO)$_n$ moiety shown here also constitutes the repeating unit in a linear aluminoxane. Thus, linear aluminoxanes having the formula:

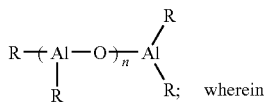

R is a linear or branched alkyl having from 1 to 10 carbon atoms, and n is an integer from 1 to about 50, are also encompassed by this invention.

Further, aluminoxanes can also have cage structures of the formula $R^t_{5m+\alpha}R^b_{m-\alpha}Al_{4m}O_{3m}$, wherein m is 3 or 4 and α is = $n_{Al(3)} - n_{O(2)+nO(4)}$; wherein $n_{Al(3)}$ is the number of three coordinate aluminum atoms, $n_{O(2)}$ is the number of two coordinate oxygen atoms, $n_{O(4)}$ is the number of 4 coordinate oxygen atoms, $R^t$ represents a terminal alkyl group, and $R^b$ represents a bridging alkyl group; wherein R is a linear or branched alkyl having from 1 to 10 carbon atoms.

Thus, aluminoxanes can be represented generally by formulas such as (R—Al—O)$_n$, R(R—Al—O)$_n$AlR$_2$, and the like, wherein the R group is typically a linear or branched C$_1$-C$_6$ alkyl such as methyl, ethyl, propyl, butyl, pentyl, or hexyl wherein n typically represents an integer from 1 to about 50. In one embodiment, the aluminoxane compounds of this invention include, but are not limited to, methylaluminoxane, ethylaluminoxane, n-propylaluminoxane, iso-propyl-aluminoxane, n-butylaluminoxane, t-butylaluminoxane, sec-butylaluminoxane, iso-butylaluminoxane, 1-pentylaluminoxane, 2-pentylaluminoxane, 3-pentylaluminoxane, iso-pentylaluminoxane, neopentylaluminoxane, or combinations thereof.

While organoaluminoxanes with different types of R groups are encompassed by the present invention, methyl aluminoxane (MAO), ethyl aluminoxane, or isobutyl aluminoxane are typical optional cocatalysts used in the catalyst compositions of this invention. These aluminoxanes are prepared from trimethylaluminum, triethylaluminum, or tri-isobutylaluminum, respectively, and are sometimes referred to as poly(methyl aluminum oxide), poly(ethyl aluminum oxide), and poly(isobutyl aluminum oxide), respectively. It is also within the scope of the invention to use an aluminoxane in combination with a trialkylaluminum, such as disclosed in U.S. Pat. No. 4,794,096.

The present invention contemplates many values of n in the aluminoxane formulas (R—Al—O)$_n$, and R(R—Al—O)$_n$AlR$_2$, and typically n is at least about 3. However, depending upon how the organoaluminoxane is prepared, stored, and used, the value of n can be variable within a single sample of aluminoxane, and such a combination of organoaluminoxanes are comprised in the methods and compositions of the present invention.

In preparing the catalyst composition of this invention comprising an optional aluminoxane, the molar ratio of the aluminum in the aluminoxane to the metallocene in the composition is usually from about 1:10 to about 100,000:1. In one another aspect, the molar ratio of the aluminum in the aluminoxane to the metallocene in the composition is usually from about 5:1 to about 15,000:1. The amount of optional aluminoxane added to a polymerization zone is an amount within a range of about 0.01 mg/L to about 1000 mg/L, from about 0.1 mg/L to about 100 mg/L, or from about 1 mg/L to about 50 mg/L.

Organoaluminoxanes can be prepared by various procedures which are well known in the art. Examples of organoaluminoxane preparations are disclosed in U.S. Pat. Nos. 3,242,099 and 4,808,561. One example of how an aluminoxane can be prepared is as follows. Water, which is dissolved in an inert organic solvent, can be reacted with an aluminum alkyl compound such as AlR$_3$ to form the desired organoaluminoxane compound. While not intending to be bound by this statement, it is believed that this synthetic method can afford a mixture of both linear and cyclic (R—Al—O)$_n$, aluminoxane species, both of which are encompassed by this invention. Alternatively, organoaluminoxanes can be prepared by reacting an aluminum alkyl compound such as AlR$_3$ with a hydrated salt, such as hydrated copper sulfate, in an inert organic solvent.

Organoboron and Organoborate Activators

As provided herein, in one aspect, the present invention provides a catalyst composition comprising, or a catalyst composition comprising the contact product of, at least one first metallocene; at least one second metallocene; optionally, at least one organoaluminum compound; and at least one activator. The activator can be selected independently from: at least one activator-support as provided herein; at least one organoaluminoxane compound; at least one organoboron or organoborate compound; or any combination thereof. Accordingly, in one aspect of the present invention the at least one activator can be selected from at least one organoboron compound, at least one organoborate compound, or a combination thereof.

In a further aspect, the present invention provides a catalyst composition comprising the contact product of at least one first metallocene; at least one second metallocene; at least one organoaluminum compound; at least one activator-support comprising a solid oxide treated with an electron-withdrawing anion; and optionally, an organoboron or organoborate cocatalyst. In another aspect, the present invention provides a catalyst composition comprising the contact product of: at least one first metallocene compound; at least one second metallocene; an organoboron or organoborate cocatalyst; an organoaluminum compound; and optionally, an activator-support. In this aspect, the catalyst composition is not required to comprise an activator-support. Any ansa-metallocene compound disclosed herein can be combined with any of the organoboron or organoborate cocatalysts disclosed herein, or any combination of organoboron or organoborate cocatalysts disclosed herein, along with a component that provides an activatable ligand such as an alkyl or hydride ligand to the metallocene, when the metallocene compounds do not already comprise such a ligand, such as an organoaluminum compound; to form a catalyst composition. Further, any combination of first and second metallocene compounds disclosed herein can be combined with any an organoboron or organoborate cocatalyst; an organoaluminum compound; optionally, at least one aluminoxane; and optionally, an activator-support; to form a catalyst composition of this invention. However, in one aspect, the catalyst composition of this invention is substantially free of organoboron or organoborate compounds, and in another aspect, the catalyst composition of this invention have polymerization activity in the substantial absence of organoboron or organoborate compounds.

In one aspect, as provided herein, the term "organoboron" compound can be used to refer to neutral boron compounds, borate salts, or combinations thereof. For example, the organoboron compounds of this invention can comprise a fluoroorgano boron compound, a fluoroorgano borate compound, or a combination thereof. Any fluoroorgano boron or fluoroorgano borate compound known in the art can be utilized. The term fluoroorgano boron compounds has its usual meaning to refer to neutral compounds of the form $BY_3$. The term fluoroorgano borate compound also has its usual meaning to refer to the monoanionic salts of a fluoroorgano boron compound of the form $[cation]^+[BY_4]^-$, where Y represents a fluorinated organic group. For convenience, fluoroorgano boron and fluoroorgano borate compounds are typically referred to collectively by organoboron compounds, or by either name, as the context requires.

Examples of fluoroorgano borate compounds that can be used as cocatalysts in the present invention include, but are not limited to, fluorinated aryl borates such as, N,N-dimethylanilinium tetrakis(pentafluorophenyl)borate, triphenylcarbenium tetrakis(pentafluorophenyl)borate, lithium tetrakis (pentafluorophenyl)borate, N,N-dimethylanilinium tetrakis [3,5-bis(trifluoromethyl)phenyl]borate, triphenylcarbenium tetrakis[3,5-bis(trifluoromethyl)phenyl]borate, and the like, including mixtures thereof. Examples of fluoroorgano boron compounds that can be used as cocatalysts in the present invention include, but are not limited to, tris(pentafluorophenyl)boron, tris[3,5-bis(trifluoromethyl)phenyl]boron, and the like, including mixtures thereof.

Although not intending to be bound by the following theory, these examples of fluoroorgano borate and fluoroorgano boron compounds, and related compounds, are thought to form "weakly-coordinating" anions when combined with organometal compounds, as disclosed in U.S. Pat. No. 5,919,983.

Generally, any amount of organoboron compound can be utilized in this invention. In one aspect, the molar ratio of the organoboron compound to the metallocene compound in the composition is from about 0.1:1 to about 10:1. Typically, the amount of the fluoroorgano boron or fluoroorgano borate compound used as a cocatalyst for the metallocene is in a range of from about 0.5 mole to about 10 moles of boron compound per mole of metallocene compound. In one aspect, the amount of fluoroorgano boron or fluoroorgano borate compound used as a cocatalyst for the metallocene is in a range of from about 0.8 mole to about 5 moles of boron compound per mole of metallocene compound.

Non-Limiting Examples of the Catalyst Composition

Examples of the catalyst composition of this invention include, but are not limited to the following. In one aspect or non-limiting example, the catalyst composition can comprise, or the catalyst composition can comprise the contact product of, at least one first metallocene, at least one second metallocene, at least one organoaluminum compound, and at least one activator-support, wherein:

a) the at least one first metallocene comprises

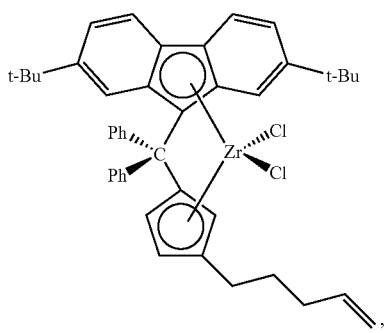

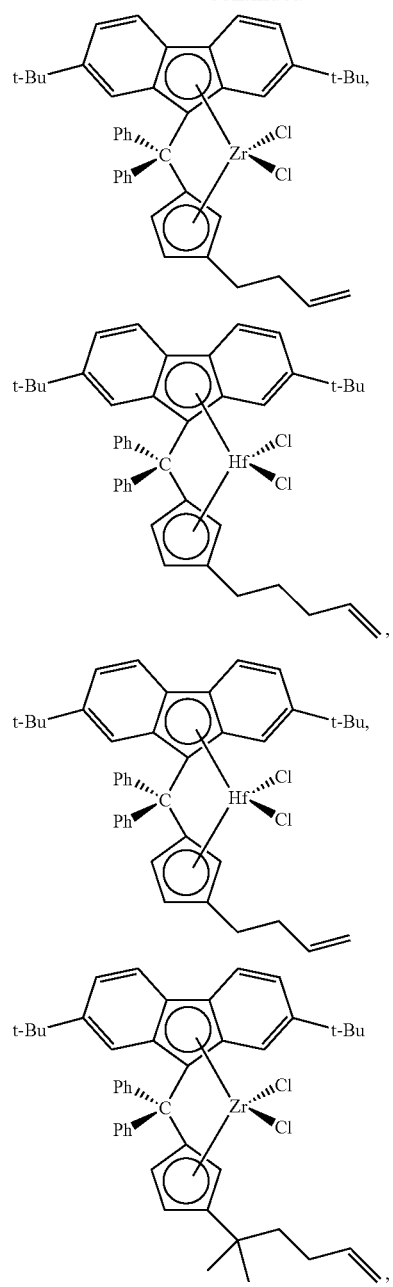

or any combination thereof, b) the at least one second metallocene comprises

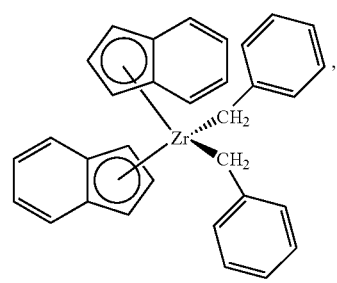

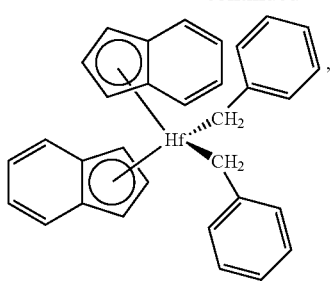

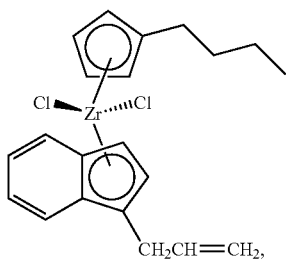

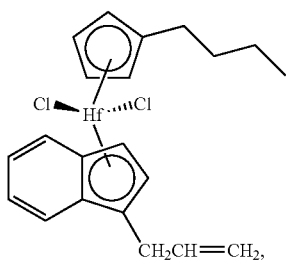

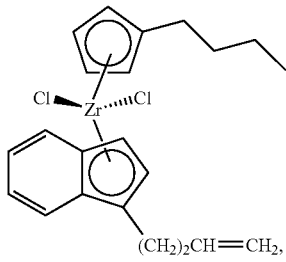

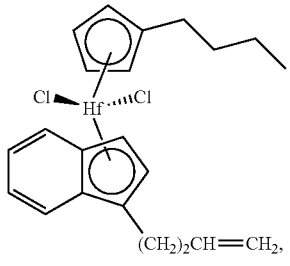

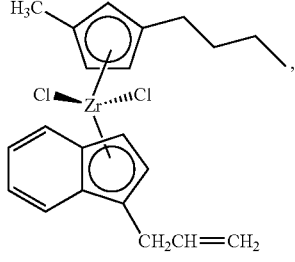

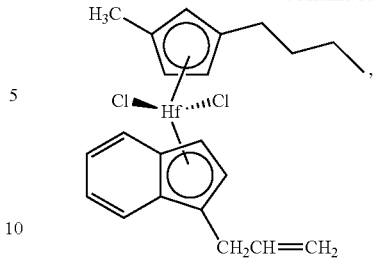

or any combination thereof, c) the at least one organoaluminum compound comprises triethylaluminum, tri-n-butylaluminum, triisobutylaluminum, or any combination thereof, and d) the at least one activator-support comprises a sulfated solid oxide.

In another aspect or non-limiting example, the catalyst composition can comprise, or the catalyst composition can comprise the contact product of, at least one first metallocene, at least one second metallocene, at least one organoaluminum compound, and at least one activator-support, wherein:

a) the at least one first metallocene is selected from

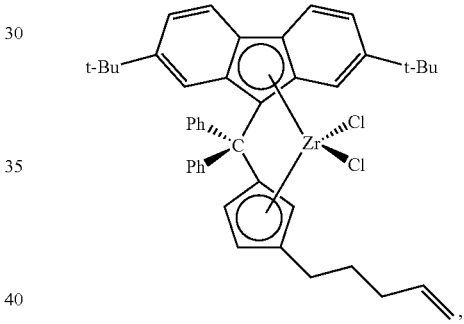

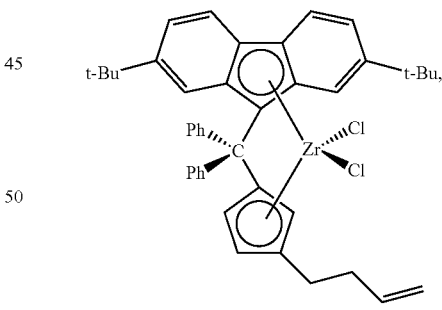

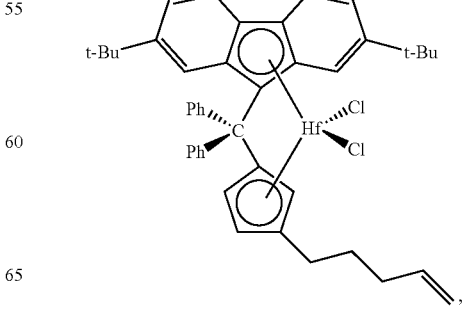

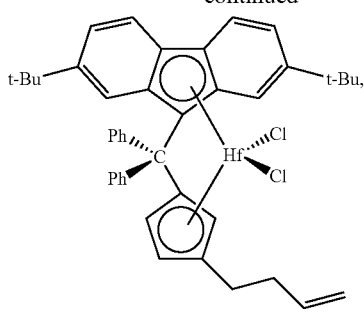

or any combination thereof, b) the at least one second metallocene is selected from

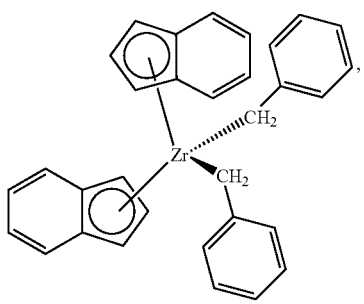

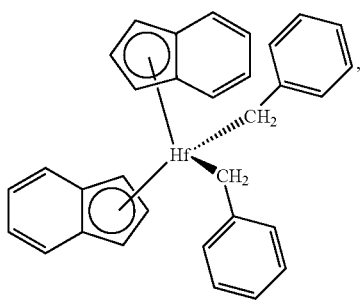

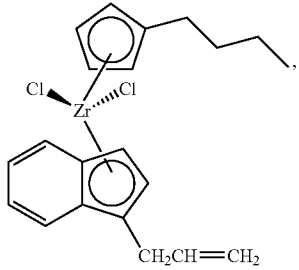

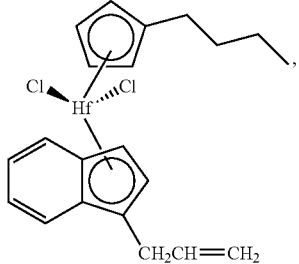

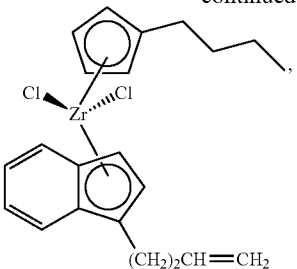

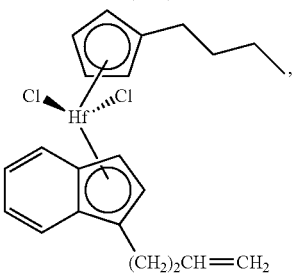

or any combination thereof, c) the at least one organoaluminum compound comprises triethylaluminum, tri-n-butylaluminum, triisobutylaluminum, or any combination thereof, and d) the at least one activator-support comprises a sulfated alumina.

In still another aspect or non-limiting example, the catalyst composition can comprise, or the catalyst composition can comprise the contact product of, at least one precontacted first metallocene, at least one precontacted second metallocene, at least one precontacted organoaluminum compound, at least one precontacted olefin, and at least one postcontacted activator-support, wherein each of the first metallocene, the second metallocene, the organoaluminum compound, the olefin, and the activator-support are as disclosed herein.

The Optional Ionizing Ionic Compound Cocatalyst

In one aspect, the present invention provides a catalyst composition comprising, or a catalyst composition comprising the contact product of: 1) at least one first metallocene; 2) at least one second metallocene; 3) optionally, at least one organoaluminum compound; and 4) at least one activator, as disclosed herein. In another aspect, the present invention provides a catalyst composition as disclosed herein, comprising an optional ionizing ionic compound cocatalyst in addition to these other components. However, in one aspect, the catalyst composition of this invention is substantially free of ionizing ionic compounds, and in another aspect, the catalyst composition of this invention have polymerization activity in the substantial absence of ionizing ionic compounds. In still another aspect, the present invention provides a catalyst composition comprising at least one ansa-metallocene compound as disclosed herein, at least one ionizing ionic compound cocatalyst, optionally at least one activator-support, and optionally at least one organoaluminum compound. Examples of ionizing ionic compound are disclosed in U.S. Pat. Nos. 5,576,259 and 5,807,938.

An ionizing ionic compound is an ionic compound which can function to enhance the activity of the catalyst composition. While not bound by theory, it is believed that the ionizing ionic compound can be capable of reacting with the metallocene compound and converting the metallocene into a cationic metallocene compound. Again, while not intending to be bound by theory, it is believed that the ionizing ionic compound can function as an ionizing compound by completely or partially extracting an anionic ligand, possibly a non-$\eta^5$-alkadienyl ligand such as ($X^3$), ($X^4$), ($X^7$), ($X^8$), ($X^{11}$), or ($X^{12}$) from the first and/or second metallocenes. However, no aspect of the present invention depends on any theory of action, regardless of whether the ionizing ionic compound ionizes the metallocene; abstracts an ($X^3$), ($X^4$), ($X^7$), ($X^8$), ($X^{11}$), or ($X^{12}$) ligand in a fashion as to form an ion pair; weakens at least one metal-($X^3$), metal-($X^4$), metal-($X^7$), metal-($X^8$), metal-($X^{11}$), and/or metal-($X^{12}$) bond in at least one first and/or second metallocene; simply coordinates to at least one ($X^3$), ($X^4$), ($X^7$), ($X^8$), ($X^{11}$), or ($X^{12}$) ligand; or any other mechanisms or combination of mechanisms by which activation can occur. Further, it is not necessary that the ionizing ionic compound activate the metallocene only. The activation function of the ionizing ionic compound is evident in the enhanced activity of catalyst composition as a whole, as compared to a catalyst composition containing catalyst composition that does not comprise any ionizing ionic compound.

Examples of ionizing ionic compounds include, but are not limited to, the following compounds: tri(n-butyl)ammonium tetrakis(p-tolyl)borate, tri(n-butyl)-ammonium tetrakis(m-tolyl)borate, tri(n-butyl)ammonium tetrakis(2,4-dimethylphenyl)borate, tri(n-butyl)ammonium tetrakis(3,5-dimethylphenyl)borate, tri(n-butyl)ammonium tetrakis[3,5-bis(trifluoromethyl)phenyl]borate, tri(n-butyl)ammonium tetrakis(pentafluorophenyl)borate, N,N-dimethylanilinium tetrakis(p-tolyl)borate, N,N-dimethylanilinium tetrakis(m-tolyl)borate, N,N-dimethylanilinium tetrakis(2,4-dimethylphenyl)borate, N,N-dimethylanilinium tetrakis(3,5-dimethylphenyl)borate, N,N-dimethylanilinium tetrakis[3,5-bis(trifluoro-methyl)phenyl]borate, N,N-dimethylanilinium tetrakis(pentafluorophenyl)borate, triphenylcarbenium tetrakis(p-tolyl)borate, triphenylcarbenium tetrakis(m-tolyl)borate, triphenylcarbenium tetrakis(2,4-dimethylphenyl)borate, triphenylcarbenium tetrakis(3,5-dimethylphenyl)borate, triphenylcarbenium tetrakis[3,5-bis(trifluoromethyl)phenyl]borate, triphenylcarbenium tetrakis(pentafluorophenyl)borate, tropylium tetrakis(p-tolyl)borate, tropylium tetrakis(m-tolyl)borate, tropylium tetrakis(2,4-dimethylphenyl)borate, tropylium tetrakis(3,5-dimethylphenyl)borate, tropylium tetrakis[3,5-bis(trifluoro-methyl)phenyl]borate, tropylium tetrakis(pentafluorophenyl)borate, lithium tetrakis(pentafluorophenyl)borate, lithium tetrakis(phenyl)borate, lithium tetrakis(p-tolyl)borate, lithium tetrakis(m-tolyl)borate, lithium tetrakis(2,4-dimethylphenyl)borate, lithium tetrakis(3,5-dimethylphenyl)borate, lithium tetrafluoroborate, sodium tetrakis(pentafluorophenyl)borate, sodium tetrakis(phenyl) borate, sodium tetrakis(p-tolyl)borate, sodium tetrakis(m-tolyl)borate, sodium tetrakis(2,4-dimethylphenyl)borate, sodium tetrakis(3,5-dimethylphenyl)borate, sodium tetrafluoroborate, potassium tetrakis(pentafluorophenyl)borate, potassium tetrakis(phenyl)borate, potassium tetrakis(p-tolyl)borate, potassium tetrakis(m-tolyl)borate, potassium tetrakis(2,4-dimethylphenyl)borate, potassium tetrakis(3,5-dimethylphenyl)borate, potassium tetrafluoroborate, triphenylcarbenium tetrakis(p-tolyl)aluminate, triphenylcarbenium tetrakis(m-tolyl)aluminate, triphenylcarbenium tetrakis(2,4-dimethylphenyl)aluminate, triphenylcarbenium tetrakis(3,5-dimethylphenyl)aluminate, triphenylcarbenium tetrakis(pentafluorophenyl) aluminate, tropylium tetrakis(p-tolyl)aluminate, tropylium tetrakis(m-tolyl)aluminate, tropylium tetrakis(2,4-dimethylphenyl)aluminate, tropylium tetrakis(3,5-dimethylphenyl) aluminate, tropylium tetrakis(pentafluorophenyl)aluminate, lithium tetrakis(pentafluorophenyl)aluminate, lithium tetrakis(phenyl)aluminate, lithium tetrakis(p-tolyl)aluminate, lithium tetrakis(m-tolyl)aluminate, lithium tetrakis(2,4-dimethylphenyl)aluminate, lithium tetrakis(3,5-dimethylphenyl) aluminate, lithium tetrafluoroaluminate, sodium tetrakis (pentafluorophenyl)aluminate, sodium tetrakis(phenyl) aluminate, sodium tetrakis(p-tolyl)aluminate, sodium tetrakis(m-tolyl)aluminate, sodium tetrakis(2,4-dimethylphenyl)aluminate, sodium tetrakis(3,5-dimethylphenyl) aluminate, sodium tetrafluoroaluminate, potassium tetrakis (pentafluorophenyl)aluminate, potassium tetrakis(phenyl) aluminate, potassium tetrakis(p-tolyl)aluminate, potassium tetrakis(m-tolyl)aluminate, potassium tetrakis(2,4-dimethylphenyl)aluminate, potassium tetrakis (3,5-dimethylphenyl)aluminate, potassium tetrafluoroaluminate, triphenylcarbenium tris(2,2',2"-nonafluorobiphenyl)fluoroaluminate, silver tetrakis(1,1,1,3,3,3-hexafluoroisopropanolato)aluminate, or silver tetrakis(perfluoro-t-butoxy)aluminate, or any combination thereof. However, these ionizing ionic compound are exemplary, and the ionizing ionic compound is not limited thereto in the present invention.

The Olefin Monomer

In one aspect, the present invention encompasses a polymerization catalyst composition comprising, or a polymerization catalyst composition comprising the contact product of, at least one first metallocene, at least one second metallocene, at least one activator, and optionally at least one co-catalyst, as disclosed herein. Unsaturated reactants that are useful in the polymerization processes with catalyst compositions and processes of this invention include olefin compounds having from 2 to about 30 carbon atoms per molecule and having at least one olefinic double bond. This invention encompasses homopolymerization processes using a single olefin such as ethylene or propylene, as well as copolymerization reactions with at least one different olefinic compound. In one aspect of a copolymerization reaction of ethylene, copolymers of ethylene comprise a major amount of ethylene (>50 mole percent) and a minor amount of comonomer <50 mole percent), though this is not a requirement. The comonomers that can be copolymerized with ethylene should have from three to about 20 carbon atoms in their molecular chain.

Acyclic, cyclic, polycyclic, terminal ($\alpha$), internal, linear, branched, substituted, unsubstituted, functionalized, and non-functionalized olefins can be employed in this invention. For example, typical unsaturated compounds that can be polymerized with the catalysts of this invention include, but are not limited to, propylene, 1-butene, 2-butene, 3-methyl-1-butene, isobutylene, 1-pentene, 2-pentene, 3-methyl-1-pentene, 4-methyl-1-pentene, 1-hexene, 2-hexene, 3-hexene, 3-ethyl-1-hexene, 1-heptene, 2-heptene, 3-heptene, the four normal octenes, the four normal nonenes, the five normal decenes, and mixtures of any two or more thereof. Cyclic and bicyclic olefins, including but not limited to, cyclopentene, cyclohexene, norbornylene, norbornadiene, and the like, can also be polymerized as described above.

In one aspect, when a copolymer is desired, the monomer ethylene can be copolymerized with a comonomer. In another aspect, examples of the comonomer include, but are not limited to, propylene, 1-butene, 2-butene, 3-methyl-1-butene, isobutylene, 1-pentene, 2-pentene, 3-methyl-1-pentene, 4-methyl-1-pentene, 1-hexene, 2-hexene, 3-hexene, 3-ethyl-1-hexene, 1-heptene, 2-heptene, 3-heptene, the four normal octenes, the four normal nonenes, or the five normal decenes. In another aspect, the comonomer can be 1-butene, 1-pentene, 1-hexene, 1-octene, 1-decene, or styrene.

In one aspect, the amount of comonomer introduced into a reactor zone to produce the copolymer is generally from about 0.01 to about 10 weight percent comonomer based on the total weight of the monomer and comonomer. In another aspect, the amount of comonomer introduced into a reactor zone is from about 0.01 to about 5 weight percent comonomer, and in still another aspect, from about 0.1 to about 4 weight percent comonomer based on the total weight of the monomer and comonomer. Alternatively, an amount sufficient to give the above described concentrations by weight, in the copolymer produced can be used.

While not intending to be bound by this theory, in the event that branched, substituted, or functionalized olefins are used as reactants, it is believed that steric hindrance can impede and/or slow the polymerization process. Thus, branched and/or cyclic portion(s) of the olefin removed somewhat from the carbon-carbon double bond would not be expected to hinder the reaction in the way that the same olefin substituents situated more proximate to the carbon-carbon double bond might. In one aspect, at least one reactant for the catalyst compositions of this invention is ethylene, so the polymerizations are either homopolymerizations or copolymerizations with a different acyclic, cyclic, terminal, internal, linear, branched, substituted, or unsubstituted olefin. In addition, the catalyst compositions of this invention can be used in polymerization of diolefin compounds, including but are not limited to, 1,3-butadiene, isoprene, 1,4-pentadiene, and 1,5-hexadiene.

Preparation of the Catalyst Composition

In another aspect, this invention encompasses a catalyst composition and a method comprising contacting at least one first metallocene, at least one second metallocene, at least one activator, and optionally at least one co-catalyst, as disclosed herein. In one aspect of this invention, the at least one first metallocene, at least one second metallocene, or a combination of both first and second metallocene can be precontacted with any other catalyst component, including, but not limited to, an olefinic monomer. In this aspect, the olefin monomer used in any precontacting steps is not necessarily the same olefin monomer to be polymerized. Precontacting steps can include precontacting at least one first metallocene, at least one second metallocene, or a combination thereof, with optionally at least one olefinic monomer, optionally at least one organoaluminum cocatalyst, and optionally at least one activator such as a treated solid oxide activator-support for a first period of time, prior to contacting the precontacted mixture with any remaining catalyst composition components not employed in the precontacting step. For example, the first period of time for contact, the precontact time, between a first metallocene, a second metallocene, an olefinic monomer, and an organoaluminum cocatalyst can typically range from time about 1 minute to about 24 hours, and from about 0.1 to about 1 hour is typical. Precontact times from about 10 minutes to about 30 minutes are also typical.

In this aspect and example, once the precontacted mixture or more than one precontacted mixture is contacted with the remaining catalyst composition components, this composition is termed the postcontacted mixture. For example, a precontacted mixture of first and second metallocenes, olefin monomer, and organoaluminum cocatalyst can constitute a precontacted mixture, which can subsequently be contacted with a solid oxide activator, to form a postcontacted mixture. Typically, the postcontacted mixture can be allowed to remain in contact for a second period of time, the postcontact time, prior to being initiating the polymerization process. In one aspect, postcontact times between the treated solid oxide activator-support and the precontacted mixture typically range from time about 1 minute to about 24 hours, and from 0.1 to about 1 hour is typical. Postcontact times from about 10 minutes to about 30 minutes are also typical.

In another aspect of this invention, any combination of various catalyst components can be contacted in the polymerization reactor simultaneously while the polymerization reaction is proceeding. Alternatively, any two or more of these catalyst components can be "precontacted" in a vessel or tube prior to their entering the reaction zone. This precontacting step can be a continuous process, in which the precontacted product is fed continuously to the reactor, or it can be a stepwise or batchwise process in which a batch of precontacted product can be added to make a catalyst composition. This precontacting step can be carried out over a time period that can range from a few seconds to as much as several days, or longer. In this aspect, the continuous precontacting step can last typically from about 1 second to about 1 hour. Also in this aspect, the continuous precontacting step can last typically from about 10 seconds to about 45 minutes, or from about 1 minute to about 30 minutes.

Alternatively the precontacting process can be carried out in multiple steps, rather than a single step, in which multiple mixtures are prepared, each comprising a different set of catalyst components. For example, at least two catalyst components can be contacted forming a first mixture, followed by contacting the first mixture with at least one other catalyst component forming a second mixture, and so forth.

Multiple precontacting steps can be carried out in a single vessel or in multiple vessels. Further, multiple precontacting steps can be carried out in series (sequentially), in parallel, or a combination thereof. For example, a first mixture of two catalyst components can be formed in a first vessel, a second mixture comprising the first mixture plus one additional catalyst component can be formed in the first vessel or in a second vessel, which is typically placed downstream of the first vessel.

In another aspect, one or more of the catalyst components can be split and used in different precontacting treatments. For example, part of a catalyst component can be fed into a first precontacting vessel for precontacting with at least one other catalyst component, while the remainder of that same catalyst component can be fed into a second precontacting vessel for precontacting with at least one other catalyst component, or can be fed directly into the reactor, or a combination thereof. The precontacting can be carried out in any suitable equipment, such as tanks, stirred mix tanks, various static mixing devices, a tube, a flask, a vessel of any type, or any combination thereof.

In one aspect, for example, a catalyst composition of this invention can be prepared by contacting 1-hexene, triisobutylaluminum or tri-n-butylaluminum, and a first metallocene and a second metallocene for at least about 30 minutes, followed by contacting this precontacted mixture with a sulfated alumina activator-support for at least about 10 minutes up to one hour to form the active catalyst.

The precontacting step typically increases the productivity of the polymer as compared to the same catalyst composition that is prepared without this precontacting step. The enhanced activity catalyst composition of this invention can be used for homopolymerization of an α-olefin monomer such as ethylene or copolymerization of an α-olefin and a comonomer. However, neither a precontacting step nor a postcontacting step is required for this invention.

The postcontacted mixture can be heated at a temperature and for a duration sufficient to allow adsorption, impregnation, or interaction of precontacted mixture and the treated solid oxide activator-support, such that a portion of the components of the precontacted mixture is immobilized, adsorbed, or deposited thereon. For example, the postcontacted mixture can be heated from between about 0° F. to about 150° F. Temperatures between about 40° F. to about 95° F. are typical if the mixture is heated at all.

In one aspect, the molar ratio of the combination of first and second metallocene compounds to the organoaluminum compound can be from about 1:1 to about 1:10,000. In another aspect, the molar ratio of the combination of first and second metallocene compounds to the organoaluminum compound can be from about 1:1 to about 1:1,000, and in another aspect, from about 1:1 to about 1:100. These molar ratios reflect the ratio of the combined first and second metallocene compounds to the total amount of organoaluminum compound in both the precontacted mixture and the postcontacted mixture combined.

When a precontacting step is used, generally, the molar ratio of olefin monomer to the combined first and second metallocene compounds in the precontacted mixture can be from about 1:10 to about 100,000:1, or from about 10:1 to about 1,000:1.

In another aspect of this invention, the weight ratio of the solid oxide activator to the organoaluminum compound can range from about 1:5 to about 1,000:1. In another aspect, the weight ratio of the solid oxide activator to the organoaluminum compound can be from about 1:3 to about 100:1, and in yet another aspect, from about 1:1 to about 50:1.

In a further aspect of this invention, the weight ratio of the combination of first and second metallocenes to treated solid oxide activator-support can be from about 1:1 to about 1:1,000,000. Yet another aspect of this invention is the weight ratio of the combined first and second metallocenes to treated solid oxide activator-support which can be from about 1:10 to about 1:100,000, and in another aspect, from about 1:20 to about 1:1000.

One aspect of this invention is that aluminoxane is not required to form the catalyst composition disclosed herein, a feature that allows lower polymer production costs. Accordingly, in one aspect, the present invention can use $AlR_3$-type organoaluminum compounds and a treated solid oxide activator-support in the absence of aluminoxanes. Additionally, no expensive borate compounds or $MgCl_2$ are required to form the catalyst composition of this invention, although aluminoxane, borate compounds, $MgCl_2$, or any combination thereof can optionally be used in the catalyst composition of this invention. Further, in one aspect, cocatalysts such as aluminoxanes, organoboron compounds, ionizing ionic compounds, or any combination thereof can be used as cocatalysts with a first metallocene, a second metallocene, an activator-support, and an organoaluminum compound. However, the catalyst compositions of the present invention are active in the substantial absence of cocatalysts such as aluminoxanes, organoboron compounds, ionizing ionic compounds, or any combination thereof.

Thus, in one aspect, this invention provides a process to produce a catalyst composition, comprising contacting at least one first metallocene, at least one second metallocene, and at least one co-catalyst, wherein the at least one first metallocene, at least one second metallocene, and at least one co-catalyst are disclosed herein. In this aspect, the at least one cocatalyst can comprise at least one organoaluminum compound and at least one activator-support, as described herein.

According to another aspect, the present invention provides a process to produce a catalyst composition, comprising
    contacting at least one first metallocene, at least one second metallocene, optionally, at least one olefin, and at least one organoaluminum compound for a first period of time to form a precontacted mixture comprising at least one precontacted first metallocene, at least one precontacted second metallocene, at least one precontacted organoaluminum compound, and optionally, at least one precontacted olefin; and
    contacting the precontacted mixture with at least one activator-support and optionally additional organoaluminum compound for a second period of time to form a postcontacted mixture comprising at least one postcontacted first metallocene, at least one postcontacted second metallocene, at least one postcontacted organoaluminum compound, optionally, at least one postcontacted olefin, and at least one postcontacted activator-support.

In one aspect, the catalytic activity of the catalyst of this invention is typically greater than or equal to about 100 grams polyethylene per gram of chemically treated solid oxide per hour (abbreviated gP/(gCTSO·hr)). In another aspect, the catalyst of this invention can be characterized by an activity of greater than or equal to about 250 gP/(gCTSO·hr), and in another aspect, an activity of greater than or equal to about 500 gP/(gCTSO·hr). In still another aspect, the catalyst of this invention can be characterized by an activity of greater than or equal to about 1000 gP/(gCTSO·hr), and in another aspect, an activity of greater than or equal to about 2000 gP/(gCTSO·hr). This activity is measured under slurry polymerization conditions, using isobutane as the diluent, and with a polymerization temperature from about 75° C. to about 100° C., and an ethylene concentration from about 5 mole % to about 20 mol %. In one aspect, this activity is measured under slurry polymerization conditions, using isobutane as the diluent, and with a polymerization temperature of about 90° C., and an ethylene pressure of about 550 psig. The reactor should have substantially no indication of any wall scale, coating or other forms of fouling upon making these measurements.

Utility of the Catalyst Composition in Polymerization Processes

The catalysts of the present invention are intended for any olefin polymerization method known in the art, using various types of polymerization reactors. As used herein, "polymerization reactor" includes any polymerization reactor capable of polymerizing olefin monomers to produce homopolymers or copolymers. Such homopolymers and copolymers are referred to as resins or polymers. The various types of reactors include those that may be referred to as batch, slurry, gas-phase, solution, high pressure, tubular or autoclave reactors. Gas phase reactors may comprise fluidized bed reactors or staged horizontal reactors. Slurry reactors may comprise vertical or horizontal loops. High pressure reactors may comprise autoclave or tubular reactors. Reactor types can include batch or continuous processes. Continuous processes could use intermittent or continuous product discharge. Processes may also include partial or full direct recycle of un-reacted monomer, un-reacted comonomer, and/or diluent.

Polymerization reactor systems of the present invention may comprise one type of reactor in a system or multiple reactors of the same or different type. Production of polymers in multiple reactors may include several stages in at least two separate polymerization reactors interconnected by a transfer device making it possible to transfer the polymers resulting from the first polymerization reactor into the second reactor. The desired polymerization conditions in one of the reactors may be different from the operating conditions of the other reactors. Alternatively, polymerization in multiple reactors may include the manual transfer of polymer from one reactor to subsequent reactors for continued polymerization. Multiple reactor systems may include any combination including, but not limited to, multiple loop reactors, multiple gas reactors, a combination of loop and gas reactors, multiple high pressure reactors or a combination of high pressure with loop and/or gas reactors. The multiple reactors may be operated in series or in parallel.

According to one aspect of the invention, the polymerization reactor system may comprise at least one loop slurry reactor. Such reactors are known in the art and may comprise vertical or horizontal loops. Monomer, diluent, catalyst and optionally any comonomer may be continuously fed to a loop reactor where polymerization occurs. Generally, continuous processes may comprise the continuous introduction of a monomer, a catalyst, and a diluent into a polymerization reactor and the continuous removal from this reactor of a suspension comprising polymer particles and the diluent. Reactor effluent may be flashed to remove the solid polymer from the liquids that comprise the diluent, monomer and/or comonomer. Various technologies may be used for this separation step including but not limited to, flashing that may include any combination of heat addition and pressure reduction; separation by cyclonic action in either a cyclone or hydrocyclone; or separation by centrifugation.

A typical slurry polymerization process (also known as the particle form process), which is well known in the art is disclosed, for example, in U.S. Pat. Nos. 3,248,179, 4,501,885, 5,565,175, 5,575,979, 6,239,235, 6,262,191 and 6,833,415, each of which is incorporated by reference in its entirety herein.

Suitable diluents used in slurry polymerization are well known in the art and include, but are not limited to, the monomer being polymerized and hydrocarbons that are liquids under reaction conditions. Examples of suitable diluents include, but are not limited to, hydrocarbons such as propane, cyclohexane, isobutane, n-butane, n-pentane, isopentane, neopentane, and n-hexane. Some loop polymerization reactions can occur under bulk conditions where no diluent is used. An example is polymerization of propylene monomer as disclosed in U.S. Pat. Nos. 5,455,314, which is incorporated by reference herein in its entirety.

According to yet another aspect of this invention, the polymerization reactor may comprise at least one gas phase reactor. Such systems are known in the art and may employ a continuous recycle stream containing one or more monomers continuously cycled through a fluidized bed in the presence of the catalyst under polymerization conditions. A recycle stream may be withdrawn from the fluidized bed and recycled back into the reactor. Simultaneously, polymer product may be withdrawn from the reactor and new or fresh monomer may be added to replace the polymerized monomer. Such gas phase reactors may comprise a process for multi-step gas-phase polymerization of olefins, in which olefins are polymerized in the gaseous phase in at least two independent gas-phase polymerization zones while feeding a catalyst-containing polymer formed in a first polymerization zone to a second polymerization zone. One type of gas phase reactor is disclosed in U.S. Pat. Nos. 5,352,749, 4,588,790 and 5,436,304, each of which is incorporated by reference in its entirety herein.

According to still another aspect of the invention, a high pressure polymerization reactor may comprise a tubular reactor or an autoclave reactor, both of which are known in the art. Tubular reactors may have several zones where fresh monomer, initiators, or catalysts are added. Monomer may be entrained in an inert gaseous stream and introduced at one zone of the reactor. Initiators, catalysts, and/or catalyst components may be entrained in a gaseous stream and introduced at another zone of the reactor. The gas streams may be inter-mixed for polymerization. Heat and pressure may be employed appropriately to obtain optimal polymerization reaction conditions.

According to yet another aspect of the invention, the polymerization reactor may comprise a solution polymerization reactor wherein the monomer is contacted with the catalyst composition by suitable stirring or other means. A carrier comprising an inert organic diluent or excess monomer may be employed. If desired, the monomer may be brought in the vapor phase into contact with the catalytic reaction product, in the presence or absence of liquid material. The polymerization zone is maintained at temperatures and pressures that will result in the formation of a solution of the polymer in a reaction medium. Agitation may be employed to obtain better temperature control and to maintain uniform polymerization mixtures throughout the polymerization zone. Adequate means are utilized for dissipating the exothermic heat of polymerization. These reactors are known in the art.

Polymerization reactors suitable for the present invention may further comprise any combination of at least one raw material feed system, at least one feed system for catalyst or catalyst components, and/or at least one polymer recovery system. Suitable reactor systems for the present invention may further comprise systems for feedstock purification, catalyst storage and preparation, extrusion, reactor cooling, polymer recovery, fractionation, recycle, storage, load out, laboratory analysis, and process control.

Conditions that are controlled for polymerization efficiency and to provide resin properties include temperature, pressure and the concentrations of various reactants. Polymerization temperature can affect catalyst productivity, polymer molecular weight and molecular weight distribution. Suitable polymerization temperature may be any temperature below the de-polymerization temperature according to the Gibbs Free energy equation. Typically this includes from about 60° C. to about 280° C., for example, and from about 70° C. to about 110° C., depending upon the type of polymerization reactor.

Suitable pressures will also vary according to the reactor and polymerization type. The pressure for liquid phase polymerizations in a loop reactor is typically less than about 1000 psig. Pressure for gas phase polymerization is usually from about 200 to about 500 psig. High pressure polymerization in tubular or autoclave reactors is generally run at from about 20,000 to about 75,000 psig. Polymerization reactors can also be operated in a supercritical region occurring at generally higher temperatures and pressures. Operation above the critical point of a pressure/temperature diagram (supercritical phase) may offer advantages.

The concentration of various reactants can be controlled to produce resins with certain physical and mechanical properties. The proposed end-use product that will be formed by the resin and the method of forming that product determines the desired resin properties. Mechanical properties include tensile, flexural, impact, creep, stress relaxation and hardness tests. Physical properties include density, molecular weight, molecular weight distribution, melting temperature, glass transition temperature, temperature melt of crystallization, density, stereoregularity, crack growth, long chain branching and rheological measurements.

The concentrations of monomer, co-monomer, hydrogen, co-catalyst, modifiers, and electron donors are important in producing these resin properties. Comonomer is used to control product density. Hydrogen is used to control product molecular weight. Co-catalysts can be used to alkylate, scavenge poisons and control molecular weight. Modifiers can be used to control product properties and electron donors affect stereoregularity. In addition, the concentration of poisons must be minimized since they impact the reactions and product properties.

The polymer or resin may be formed into various articles, including, but not limited to, bottles, drums, toys, household containers, utensils, film products, drums, fuel tanks, pipes, geomembranes, and liners. Various processes may be used to form these articles, including, but not limited to, blow molding, extrusion molding, rotational molding, thermoforming, cast molding and the like. After polymerization, additives and modifiers can be added to the polymer to provide better processing during manufacturing and for desired properties in the end product. Additives include surface modifiers such as slip agents, antiblocks, tackifiers; antioxidants such as primary and secondary antioxidants; pigments; processing aids such as waxes/oils and fluoroelastomers; and special additives such as fire retardants, antistats, scavengers, absorbers, odor enhancers, and degradation agents.

Ethylene Polymers Prepared According to this Invention

Figure 2:
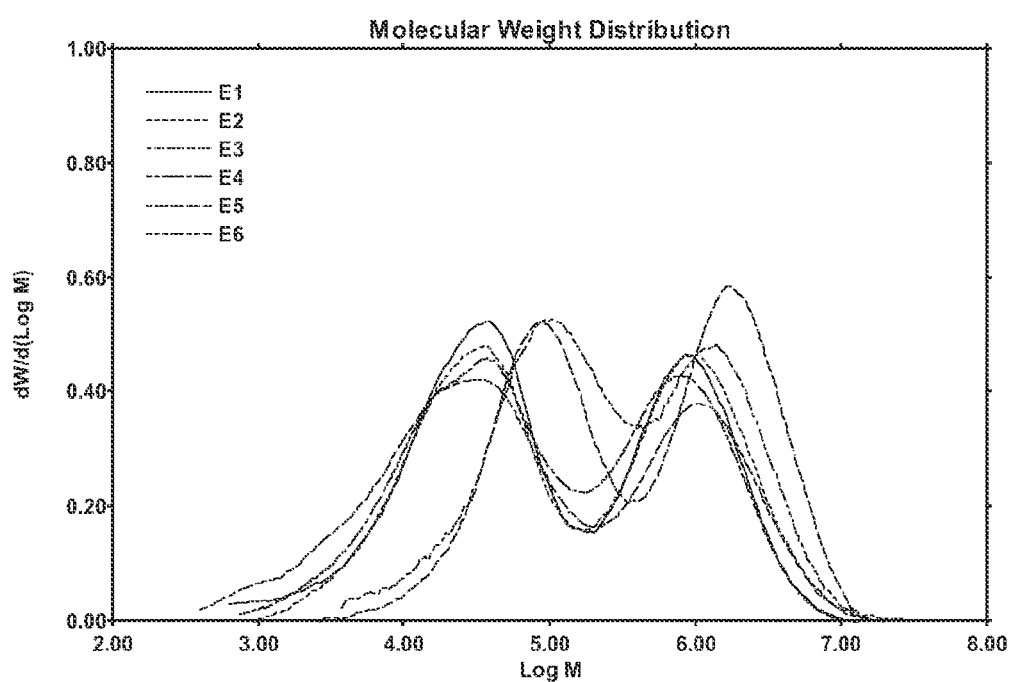
FIG. 2 provides comparison gel permeation chromatograms (GPCs) for ethylene homopolymers and copolymers of Examples 1-6 (E1-E6), prepared as provided in Table 1.
Figure 3:
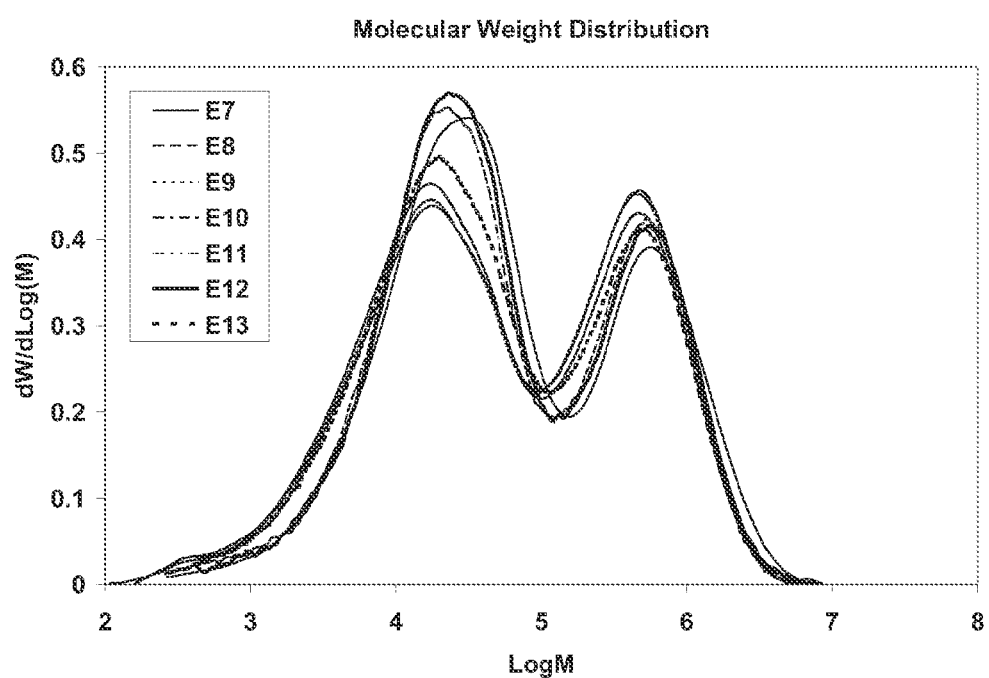
FIG. 3 provides comparison gel permeation chromatograms (GPCs) for ethylene copolymers prepared according to inventive Examples 7-13 (E7-E13), prepared as provided in Table 2.

In one aspect, the ethylene polymers and copolymers produced using the catalyst composition of this invention can be characterized by a bimodal or multimodal molecular weight distribution, examples of which are illustrated in FIGS. 2 and 3. The high molecular weight component is observed to be formed with the first, or ansa-metallocene component, while the low molecular weight component is observed to be formed with second metallocene component. Regarding the high molecular weight component, lower than expected levels of long chain branching (LCB) are observed, typically, as compared to polymers produced using ansa-metallocenes without an olefin-containing moiety bonded to a cyclopentadienyl-type ligand, even when the comparative metallocene comprises at least one aryl group bonded to the bridging atom of the bridging ligand. In a further aspect, the high molecular weight polymer is characterized typically by higher molecular weights than are usually observed when using a tightly-bridged ansa-metallocene compound without at least one aryl group bonded to the bridging atom of the bridging ligand, even when the comparative metallocene comprises an olefin-containing moiety bonded to a cyclopentadienyl-type ligand.

FIG. 2 provides comparison gel permeation chromatograms (GPCs) for ethylene homopolymers and copolymers of Examples 1-6 (E1-E6), prepared as provided in Table 1, and FIG. 3 provides comparison gel permeation chromatograms (GPCs) for ethylene copolymers prepared according to Examples 7-13 (E7-E13), prepared as provided in Table 2. The bimodal molecular weight distribution as evident in these chromatograms is useful for pipe and film applications. As illustrated by these figures, the resins produced by the inventive catalysts are observed to have broad molecular weight distributions. Another indication of this molecular weight distribution is the large values of $M_w/M_n$, as provided in Tables 1 and 2. The low molecular weight components, as seen in the low molecular weight GPC peak of FIGS. 2 and 3, are sufficiently low in molecular weight to provide good melt flow without the presence of very low molecular weight tails, a feature which can contribute to smoking during processing. Further, the high molecular weight components, indicated by $M_w$ and $M_z$ of Tables 1 and 2, are sufficient to provide high physical strength to the final products.

DEFINITIONS

In order to more clearly define the terms used herein, the following definitions are provided. To the extent that any definition or usage provided by any document incorporated herein by reference conflicts with the definition or usage provided herein, the definition or usage provided herein controls.

The term "polymer" is used herein to mean homopolymers comprising ethylene and/or copolymers of ethylene and another olefinic comonomer. "Polymer" is also used herein to mean homopolymers and copolymers of any other polymerizable monomer disclosed herein.

The term "cocatalyst" is generally used herein to refer to the organoaluminum compounds that can constitute one component of the catalyst composition, but also refers to the optional components of the catalyst composition including, but not limited to, aluminoxanes, organoboron compounds, organoborate compounds, or ionizing ionic compounds, as disclosed herein. In one aspect, cocatalysts can be organoaluminum compounds of the formula $Al(X^{13})_n(X^{14})_{3-n}$, wherein $(X^{13})$ is a hydrocarbyl having from 1 to about 20 carbon atoms; $(X^{14})$ is alkoxide or aryloxide, any of which having from 1 to about 20 carbon atoms, halide, or hydride; and n is a number from 1 to 3, inclusive. The term cocatalyst can be used regardless of the actual function of the compound or any chemical mechanism by which the compound might operate.

The term "precontacted" mixture is used herein to describe a first mixture of catalyst components that are contacted for a first period of time prior to the first mixture being used to form a "postcontacted" or second mixture of catalyst components that are contacted for a second period of time. Typically, the precontacted mixture describes a mixture of at least one metallocene, optionally at least one olefin monomer, and at least one organoaluminum compound, before this mixture is contacted with the activator-support and optionally additional organoaluminum compound. Thus, "precontacted" describes components that are used to contact each other, but prior to contacting the components in the second, postcontacted mixture. Accordingly, this invention may occasionally distinguish between a component used to prepare the precontacted mixture and that component after the mixture has been prepared. For example, according to this description, it is possible for the precontacted organoaluminum compound, once it is contacted with the metallocene and the optional olefin monomer, to have reacted to form at least one different chemical compound, formulation, or structure from the distinct organoaluminum compound used to prepare the precontacted mixture. In this case, the precontacted organoaluminum compound or component is described as comprising an organoaluminum compound that was used to prepare the precontacted mixture.

Similarly, the term "postcontacted" mixture is used herein to describe a second mixture of catalyst components that are contacted for a second period of time, and one constituent of which is the "precontacted" or first mixture of catalyst components that were contacted for a first period of time. Typically, the term "postcontacted" mixture is used herein to describe the mixture of metallocene, olefin monomer, organoaluminum compound, and activator-support, formed from contacting the precontacted mixture of a portion of these components with the any additional components added to make up the postcontacted mixture. Generally, the additional component added to make up the postcontacted mixture is the solid oxide activator, and optionally can include an organoaluminum compound the same or different from the organoaluminum compound used to prepare the precontacted mixture, as described herein. Accordingly, this invention may also occasionally distinguish between a component used to prepare the postcontacted mixture and that component after the mixture has been prepared.

The term tightly-bridged ansa-metallocene describes a metallocene compound in which the two $\eta^5$-cycloalkadienyl-type ligands in the molecule are linked by a bridging moiety, wherein the shortest link between the two $\eta^5$-cycloalkadienyl-type ligands comprises one atom. Thus, the length of the bridge or the chain between the two cyclopentadienyl-type ligands is a single atom, although this bridging atom is substituted. Thus, the metallocenes of this invention are bridged bis($\eta^5$-cycloalkadienyl)-type compounds, wherein the $\eta^5$-cycloalkadienyl portions include cyclopentadienyl ligands, indenyl ligands, fluorenyl ligands, and the like, including substituted analogs and partially saturated analogs thereof. Possible substituents on these ligands include hydrogen, therefore the description "substituted derivatives thereof" in this invention includes partially saturated ligands such as tetrahydroindenyl, tetrahydrofluorenyl, octahydrofluorenyl, partially saturated indenyl, partially saturated fluorenyl, substituted partially saturated indenyl, substituted partially saturated fluorenyl, and the like. In some contexts, the metallocene is referred to simply as the "catalyst", in much the same way the term "cocatalyst" is used herein to refer to the organoaluminum compound.

The terms "catalyst composition," "catalyst mixture," and the like do not depend upon the actual product of the reaction of the components of the mixtures, the nature of the active catalytic site, or the fate of the aluminum cocatalyst, ansa-metallocene, any olefin monomer used to prepare a precontacted mixture, or the solid oxide activator after combining these components. Therefore, the terms catalyst composition, catalyst mixture, and the like include both heterogeneous compositions and homogenous compositions.

The term "hydrocarbyl" is used to specify a hydrocarbon radical group that includes, but is not limited to aryl, alkyl, cycloalkyl, alkenyl, cycloalkenyl, cycloalkadienyl, alkynyl, aralkyl, aralkenyl, aralkynyl, and the like, and includes all substituted, unsubstituted, branched, linear, heteroatom substituted derivatives thereof. Unless otherwise specified, the hydrocarbyl groups of this invention typically comprise up to about 20 carbon atoms. In one aspect, hydrocarbyl groups can have up to 12 carbon atoms, up to 8 carbon atoms, or up to 6 carbon atoms.

The term "hydrocarbyloxide" group is used generically to refer collectively to both alkoxide and aryloxide groups. Unless otherwise specified, the hydrocarbyl oxide groups of this invention typically comprise up to about 20 carbon atoms. In one aspect, hydrocarbyloxide groups can have up to 12 carbon atoms, up to 8 carbon atoms, or up to 6 carbon atoms.

The term "hydrocarbylamino" group is used generically to refer collectively to alkylamino (NHR), arylamino (NHAr), dialkylamino (NR$_2$), and diarylamino (NAr$_2$) groups. Unless otherwise specified, the hydrocarbyl amino groups of this invention typically comprise up to about 20 carbon atoms. In one aspect, hydrocarbylamino groups can have up to 12 carbon atoms, up to 8 carbon atoms, or up to 6 carbon atoms.

The term "alkenyl" is used broadly to specify a hydrocarbyl group that comprises an alkene moiety, regardless of the particular regiochemistry of the alkene moiety and encompassing all stereochemical isomers. Thus, for example, the term alkenyl is intended to include any CH=CH$_2$-substituted or CH=CMe$_2$-substituted alkyl group, regardless of where the substitution occurs within the alkyl group. Terms such as olefin-containing hydrocarbyl group or olefin-containing pendant group are typically used interchangeably with alkenyl group, again illustrating that these terms are not intended to be bound by the particular location of the C=C double bond within the group. Unless otherwise specified, the alkenyl groups of this invention typically comprise up to about 20 carbon atoms. In one aspect, alkenyl groups can have up to 12 carbon atoms, up to 8 carbon atoms, or up to 6 carbon atoms.

The terms solid oxide activator-support, acidic activator-support, activator-support, treated solid oxide, treated solid oxide activator-support, treated solid oxide compound, and the like are used herein to indicate a treated, solid, inorganic oxide of relatively high porosity, which exhibits Lewis acidic or Brønsted acidic behavior, which has been treated with an electron-withdrawing component, typically an anion, and which is calcined. The electron-withdrawing component is typically an electron-withdrawing anion source compound. Thus, the treated solid oxide compound comprises the calcined contact product of at least one solid oxide compound with at least one electron-withdrawing anion source compound. Typically, the activator-support or "treated solid oxide compound" comprises at least one ionizing, acidic solid oxide compound. The terms support or activator-support are not used to imply these components are inert, and this component should not be construed as an inert component of the catalyst composition.

The term "activator," as used herein, refers generally to a substance that is capable of converting the contact product of: 1) a metallocene component; and 2) a component that provides an activatable ligand such as an alkyl or hydride ligand to the metallocene, when the metallocene compound does not already comprise such a ligand; into a catalyst that can polymerize olefins. This term is used regardless of whether an activator ionizes the metallocene, abstracts an anionic ligand to form an ion pair, weakens a metal-ligand bond in the metallocene, simply coordinates to an anionic ligand, or any other mechanism. As disclosed herein, the contact product comprises at least one activator, which can be selected independently from: i) an activator-support selected from a solid oxide treated with an electron-withdrawing anion, a layered mineral, an ion-exchangeable activator-support, or any combination thereof, ii) an organoaluminoxane compound; iii) an organoboron or an organoborate compound; or iv) any combination of these components.

The term "clay" is used herein to refer to that component of the catalyst composition, a substantial portion of which constitutes a clay mineral or a mixture of clay minerals that have been pretreated by either exchanging cations, pillaring or simply wetting, that can be used as an activator-support in the catalyst composition described herein. The transition metal compound and organometal cocatalyst are reacted with the clay activator-support to form the active catalyst. While not intending to be bound by the following statement, the clay component of the catalyst composition of this invention probably functions as an activator-support for the transition metal compound, as well as a cocatalyst from the standpoint that it is in intimate physical chemical contact with the transition metal component.

As used herein, the collective term "clay mineral" is used herein to describe the large group of finely-crystalline, sheet like clay minerals that are found in nature in fine-grained sediments, sedimentary rocks, and the like. Clay minerals are a class of hydrous silicate and aluminosilicate minerals with sheet-like structures and very high surface areas. This term is also used to describe hydrous magnesium silicates with a phyllosilicate structure. Many common clay minerals belong to the kaolinite, montmorillonite, or illite groups of clays. Thus, the term "clay mineral" is not used herein to refer to the fine-grained soil consisting of mineral particles, not necessarily clay minerals, that are less than about 0.002 mm in size.

The term "pillared clay" is used herein to refer to a component of the catalyst composition comprising clay minerals, typically of the of the smectite group and other phyllosilicates in addition to sepiolites and palygorskites, that have been ion exchanged with large, typically polynuclear, highly charged metal complex cations. Examples of such ions include, but are not limited to, Keggin ions which can have charges such as 7+, various polyoxometallates, and other large ions. Thus, the term pillaring refers to a simple exchange reaction in which the exchangeable cations of a clay material are replaced with large, highly charged ions, such as Keggin ions. These polymeric cations are then immobilized within the interlayers of the clay and when calcined are converted to metal oxide "pillars," effectively supporting the clay layers as column-like structures. Examples of pillaring and pillared clays are found in: T. J. Pinnavaia, *Science* 220 (4595), 365-371 (1983); J. M. Thomas, Intercalation Chemistry, (S. Whittington and A. Jacobson, eds.) Ch. 3, pp. 55-99, Academic Press, Inc., (1972); U.S. Pat. No. 4,452,910; U.S. Pat. No. 5,376,611; and U.S. Pat. No. 4,060,480; each of which is incorporated herein in its entirety.

Although any methods, devices, and materials similar or equivalent to those described herein can be used in the practice or testing of the invention, the typical methods, devices and materials are herein described.

All publications and patents mentioned herein are incorporated herein by reference for the purpose of describing and disclosing, for example, the constructs and methodologies that are described in the publications, which might be used in connection with the presently described invention. The publications discussed above and throughout the text are provided solely for their disclosure prior to the filing date of the present application. Nothing herein is to be construed as an admission that the inventors are not entitled to antedate such disclosure by virtue of prior invention.

For any particular compound disclosed herein, any general structure presented also encompasses all conformational isomers, regioisomers, stereoisomers, and the like, that can arise from a particular set of substituents. The general structure also encompasses all enantiomers, diastereomers, and other optical isomers whether in enantiomeric or racemic forms, as well as mixtures of stereoisomers, as the context requires.

The present invention is further illustrated by the following examples, which are not to be construed in any way as imposing limitations upon the scope thereof. On the contrary, it is to be clearly understood that resort can be had to various other aspects, embodiments, modifications, and equivalents thereof which, after reading the description herein, may suggest themselves to one of ordinary skill in the art without departing from the spirit of the present invention or the scope of the appended claims.

In the following examples, unless otherwise specified, the syntheses and preparations described herein were carried out under an inert atmosphere such as nitrogen and/or argon. Solvents were purchased from commercial sources and were typically dried over activated alumina prior to use. Unless otherwise specified, reagents were obtained from commercial sources.

General testing procedures, characterization, and synthetic procedures are provided herein. Synthetic methods to prepare the metallocenes, treated solid oxides, and other reagents of this invention are also provided herein.

General Testing Procedures

Melt index (MI, g/10 min) was determined in accordance with ASTM D1238 condition F at 190° C. with a 2,160 gram weight.

High load melt index (HLMI, g/10 min) was determined in accordance with ASTM D 1238 condition E at 190° C. with a 21,600 gram weight.

Polymer density was determined in grams per cubic centimeter (g/cc) on a compression molded sample, cooled at about 15° C. per hour, and conditioned for about 40 hours at room temperature in accordance with ASTM D1505 and ASTM D1928, procedure C.

Molecular weight and molecular weight distributions were obtained using a PL-GPC 220 (Polymer Labs, UK) system equipped with a differential refractive index detector and three 7.5 mm×300 mm 20 um Mixed A-LS columns (Polymer Labs) running at 145° C. The flow rate of the mobile phase, 1,2,4-trichlorobenzene (TCB) containing 0.5 g/L 2,6-di-t-butyl-4-methylphenol (BHT), was set at 1 mL/min and the concentration of polymer solutions was generally kept in the range of 1.0-1.5 mg/mL, depending on the molecular weights. Sample preparation was conducted at 150° C. for 4 h with occasional and gentle agitation before the solutions being transferred to sample vials for injection. In order to minimize unbalanced solvent peak, solvent with the same composition as the mobile phase was used for solution preparation. The integral calibration method was employed to deduce molecular weights and molecular weight distributions using a Chevron Phillips Chemicals Company's broad linear polyethylene, Marlex BHB5003, as the broad standard. The integral table of the broad standard was pre-determined in a separate experiment with SEC-MALS.

Preparation of a Sulfated Alumina Activator-Support

Sulfated alumina was formed by a process wherein alumina was chemically-treated with a sulfate or bisulfate source, typically selected from, but not limited to, sulfuric acid, ammonium sulfate, or ammonium bisulfate. One example follows.

A commercial alumina sold as W. R. Grace Alumina A was sulfated by impregnation with an aqueous solution containing about 15-20% $(NH_4)_2SO_4$ or $H_2SO_4$. This sulfated alumina was calcined at 550° C. in air (240° C./h ramp rate), with a 3 h hold period at this temperature. Afterward, the alumina was collected and stored under dry nitrogen, and was used without exposure to the atmosphere.

Metallocene Preparations

All manipulations involving air-sensitive reagents and materials were performed under nitrogen by using standard Schlenk line or dry box techniques. Unless specified otherwise, reagents were typically obtained from Aldrich Chemical Company and were used as received. 2,7-Di-tert-butylfluorene was purchased from commercial sources including Degussa and Aldrich Chemical Company the Grignard reagent CpMgCl (1M in THF) was purchased from Boulder Scientific Company, and hafnium(IV) chloride was purchased from Strem. The solvent THF was distilled from potassium, while anhydrous diethyl ether, methylene chloride, pentane, and toluene (Fisher Scientific Company) were stored over activated alumina. All solvents were degassed and stored under nitrogen. Zirconium(IV) chloride (99.5%) and n-butyllithium were purchased from Aldrich Chemical Company and were used as received. Bis($\eta^5$-indenyl) zirconium dichloride (M-B) and bis[$\eta^5$-n-butylcyclopentadienyl]zirconium dichloride (M-D) were purchased from commercial sources such as, for example, Strem Chemicals, Boulder Scientific and Crompton. Reaction products were analyzed by $^1$H NMR spectroscopy (300 MHz, CDCl$_3$ referenced against either the residual proton peak at 7.24 ppm for CHCl$_3$ or TMS at 0 ppm) or $^{13}$C NMR (75 MHz, CDCl$_3$, referenced against central line of CDCl$_3$ at 77.00 ppm).

The following fulvenes, F-1 through F-3, were prepared as disclosed herein and used to prepare the ligands L-1 through L-3 as provided herein.

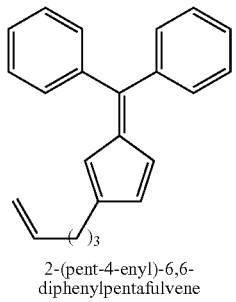

2-(pent-4-enyl)-6,6-diphenylpentafulvene

F-1

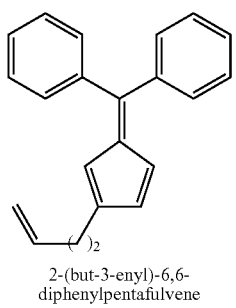

2-(but-3-enyl)-6,6-diphenylpentafulvene

F-2

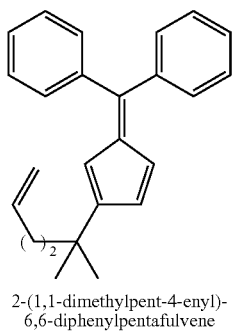

2-(1,1-dimethylpent-4-enyl)-6,6-diphenylpentafulvene

F-3

The following ligands L-1 through L-3 were prepared as disclosed herein.

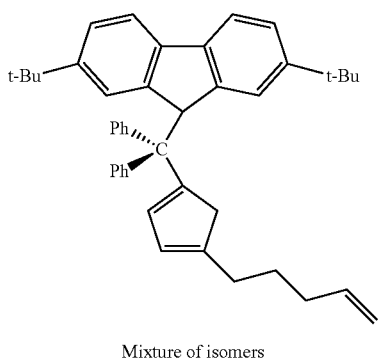

Mixture of isomers

L-1

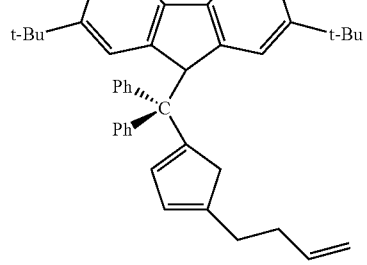

Mixture of isomers

L-2

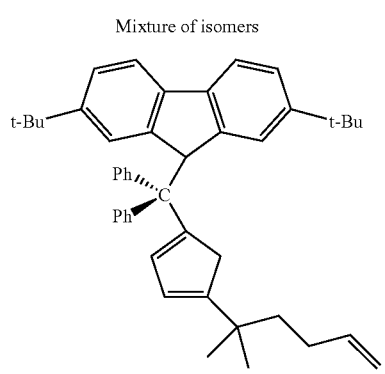

Mixture of isomers

L-3

Synthesis of
2-(pent-4-enyl)-6,6-diphenylpentafulvene (F-1)

To 5-bromo-1-pentene (100 g of 95 wt %, 0.637 mol) was added cyclopentadienyl magnesium chloride (700 mL of 1 M solution in THF, 0.7 mol) at 0° C. in an hour. After stirring for an additional 30 minutes at 0° C., the mixture was warmed to room temperature. After stirring overnight, the reaction was quenched with a mixture of ice and water. The mixture was extracted with pentane. The organic layer was washed with water and dried over anhydrous sodium sulfate. Removal of the solvent under vacuum at room temperature gave a yellow-brown liquid (98 g, crude pent-4-enylcyclopentadiene). To the crude pent-4-enylcyclopentadiene (89 g) dissolved in THF (500 mL) was added n-BuLi (60 mL of 10 M in hexanes, 0.6 mol) at −78° C. The mixture was warmed up to room temperature and stirred overnight. The anion solution was added to benzophenone (110 g, 0.604 mol) dissolved in THF (500 mL) at 0° C. in 25 minutes. The mixture was warmed to room temperature and stirred overnight. The reaction was quenched with a mixture of ice and 10% HCl aqueous solution. The mixture was extracted with pentane. The organic layer was washed with water and dried over anhydrous sodium sulfate. Removal of the solvent under vacuum at 40° C. gave a dark red viscous oil. The oil was dissolved in heptane and filtered through silica gel. The product was collected by washing the silica gel with 5-10% $CH_2Cl_2$ in heptane. Removal of the solvent gave the desired product (145 g, 84% yield based on 5-bromo-1-pentene) as a dark red viscous oil. $^1$H NMR (300 MHz, $CDCl_3$) δ 7.41-7.48 (m, 10H), 6.59-6.62 (dd, J=5.1 Hz, 1.4 Hz, 1H), 6.40-6.42 (dd, J=5.1 Hz, 1.4 Hz, 1H), 6.12-6.15 (m, 1H), 5.86-6.02 (m, 1H), 5.08-5.20 (m, 2H), 2.55-2.60 (t, J=7.2 Hz, 2H), 2.22-2.30 (m, 2H), 1.76-1.88 (quin, J=7.2 Hz, 2H); $^{13}$C NMR (75 MHz, $CDCl_3$) δ 148.28, 148.13, 143.28, 140.85, 140.76, 138.01, 133.51, 131.34, 131.29, 127.76, 127.74, 127.13, 127.08, 124.74, 118.24, 114.24, 33.95, 30.13, 28.46.

Synthesis of 1-(3-(pent-4-enyl)cyclopentadienyl)-1-(2,7-di-tert-butylfluorenyl)-1,1-diphenylmethane (L-1)

To 2,7-di-tert-butylfluorene (125.1 g, 0.45 mol) dissolved in $Et_2O$ (700 mL) was added n-BuLi (47 mL of 10 M in hexanes, 0.47 mol) at 0° C. The mixture was warmed to room temperature and stirred overnight. The anion solution was added to 2-(pent-4-enyl)-6,6-diphenylpentafulvene (F-1) (145 g, 0.487 mol) dissolved in $Et_2O$ (300 mL) at −78° C. in 10 minutes. The mixture was warmed to room temperature and stirred overnight. The reaction was quenched with a mixture of ice and 10% HCl aqueous solution. The mixture was extracted with $Et_2O$. The organic layer was washed with water and dried over anhydrous sodium sulfate. Removal of the solvent under vacuum gave a pale brown solid. The solid was washed with heptane and dried under vacuum. A mixture of isomers for the desired product (191.7 g, 74% yield) was obtained as a white solid.

Synthesis of 2-(but-3-enyl)-6,6-diphenylpentafulvene (F-2)

To 4-bromo-1-butene (100 g of 97 wt %, 0.719 mol) was added cyclopentadienyl magnesium chloride (800 mL of 1 M solution in THF, 0.8 mol) at 0° C. in 50 minutes. After stirring for an additional 15 minutes at 0° C., the mixture was warmed to room temperature. After stirring overnight, the reaction was quenched with a mixture of ice and water. The mixture was extracted with pentane. The organic layer was washed with water and dried over anhydrous sodium sulfate. Removal of the solvent under vacuum at room temperature gave a brown liquid (94.2 g, crude but-3-enylcyclopentadiene). To the crude but-3-enylcyclopentadiene (94.2 g) dissolved in THF (500 mL) was added n-BuLi (70 mL of 10 M in hexanes, 0.7 mol at −78° C. The mixture was warmed up to room temperature and stirred overnight. The anion solution was added to benzophenone (133.8 g, 0.735 mol) dissolved in THF (400 mL) at 0° C. in 35 minutes. The mixture was warmed to room temperature and stirred overnight. The reaction was quenched with a mixture of ice and 10% HCl aqueous solution. The mixture was extracted with pentane. The organic layer was washed with water and dried over anhydrous sodium sulfate. Removal of the solvent under vacuum at 40° C. gave a dark red viscous oil. The oil was dissolved in heptane and filtered through silica gel. The product was collected by washing the silica gel with 5-10% $CH_2Cl_2$ in heptane. Removal of the solvent gave the desired product (152 g, 74.4% yield based on 4-bromo-1-butene) as a dark red viscous oil. $^1H$ NMR (300 MHz, $CDCl_3$) δ 7.29-7.41 (m, 10H), 6.50-6.53 (dd, J=5.2 Hz, 1.4 Hz, 1H), 6.29-6.31 (dd, J=5.2 Hz, 1.4 Hz, 1H), 6.02-6.05 (m, 1H), 5.82-5.98 (m, 1H), 4.94-5.16 (m, 2H), 2.53-2.60 (m, 2H), 2.33-2.43 (m, 2H); $^{13}C$ NMR (75 MHz, $CDCl_3$) δ 148.59, 147.67, 143.18, 140.86, 140.78, 137.85, 133.48, 131.38, 131.36, 127.85, 127.82, 127.18, 127.13, 124.75, 118.35, 114.29, 33.36, 30.20.

Synthesis of 1-(3-(but-3-enyl)cyclopentadienyl)-1-(2,7-di-tert-butylfluorenyl)-1,1-diphenylmethane (L-2)

To 2,7-di-tert-butylfluorene (91.7 g, 0.33 mol) dissolved in $Et_2O$ (500 mL) was added n-BuLi (35 mL of 10 M in hexanes, 0.35 mol) at 0° C. The mixture was warmed to room temperature and stirred overnight. The anion solution was added to 2-(but-3-enyl)-6,6-diphenylpentafulvene (compound F-2) (104 g, 0.366 mol) dissolved in $Et_2O$ (200 mL) at 0° C. in 35 minutes. After stirring for an additional 30 minutes at 0° C., the mixture was warmed to room temperature and stirred overnight. The reaction was quenched with a mixture of ice and 10% HCl aqueous solution. The mixture was extracted with $CH_2Cl_2$. The organic layer was washed with water and dried over anhydrous sodium sulfate. Removal of the solvent under vacuum gave a pale brown solid. The solid was washed with heptane and dried under vacuum. A mixture of isomers for the desired product (142 g, 76.5% yield) was obtained as a white solid.

Synthesis of 2-(1,1-dimethylpent-4-enyl)-6,6-diphenylpentafulvene (F-3)

To a solution of 6-butenyl-6-methylpentafulvene (17.8 g, 122 mmol) (prepared by the method of K. J. Stone and R. D. Little, *J. Org. Chem.*, 1984, 49(11), 1849-1853) in dry THF (50 mL) was added a solution of methyllithium (75 mL of 1.6 M in ether, 120 mmol) while cooling in dry ice. After stirring for 20 hours and warming to room temperature, the yellow solution was gradually added to a solution of benzophenone (21.87 g, 120 mmol) in THF (50 mL) while cooling in ice. A red color formed immediately and after 4 hours analysis of an aliquot showed that the reaction was nearly complete. After an additional hour, the mixture was cooled while a solution of concentrated hydrochloric acid (20 mL) in water (200 mL) was added. Following addition of pentane (150 mL), the organic layer was washed with water and dried over sodium sulfate. The solvent was removed under vacuum and the red liquid was cooled to −15° C. overnight. The red crystalline product was washed with cold methanol and dried under vacuum to a red solid (32.8 g, 84% yield). $^1H$ NMR (300 MHz, $CDCl_3$) δ 7.22-7.40 (m, 10H), 6.56-6.58 (dd, J=5.1 Hz, 1.8 Hz, 1H), 6.24-6.26 (dd, J=5.1 Hz, 1.8 Hz, 1H), 5.91-5.93 (t, J=1.8 Hz, 1H), 5.70-5.85 (m, 1H), 4.84-5.00 (m, 2H), 1.88-2.00 (m, 2H), 1.52-1.60 (m, 2H), 1.17 (s, 6H); $^{13}C$ NMR (75 MHz, $CDCl_3$) δ 156.16, 148.39, 143.20, 140.96, 140.92, 138.98, 131.61, 131.43, 131.39, 127.81, 127.77, 127.24, 127.14, 124.88, 116.30, 113.45, 41.96, 35.86, 29.90, 27.90.

Synthesis of 1-(3-(1,1-dimethylpent-4-enyl)cyclopentadienyl)-1-(2,7-di-tert-butylfluorenyl)-1,1-diphenylmethane (L-3)

A solution of 2,7-di-tert-butylfluorene (27.8 g, 100 mmol) in $Et_2O$ (200 mL) was cooled in dry ice and n-BuLi (68 mL of 1.6 M in hexanes, 0109 mmol) was added dropwise. The slurry was warmed to room temperature and stirred for 24 hours. The dark solution was cooled in dry ice and a solution of 2-(1,1-dimethylpent-4-enyl)-6,6-diphenylpentafulvene (compound F-3) (32.8 g, 54.3 mmol) in $Et_2O$ (100 mL) was then added rapidly. The mixture was warmed to room temperature and stirred for 20 hours. After cooling in ice, a solution of concentrated hydrochloric acid (20 mL) in water (200 mL) was added. Following addition of pentane (100 mL), the organic layer was separated and washed with water. After drying over sodium sulfate and filtering, the solvent was removed under vacuum leaving a glassy solid. The solid was heated with methanol (100 mL) and the hot methanol solution was poured off. This process was repeated four times. The solid was then dissolved in hot pentane, which was then removed under vacuum while heating. The solid was broken up, dried under vacuum, and then heated with ethanol (70 mL). After cooling, the solid was filtered and dried. A mixture of isomers for the desired product (18.1 g, 30% yield) was obtained as a white solid.

Synthesis of diphenylmethylidene{$\eta^5$-[3-(pent-4-enyl)cyclopentadien-1-ylidene]}[$\eta^5$-(2,7-di-tert-butylfluoren-9-ylidene)]hafnium dichloride (M-1)

To 1-(3-(pent-4-enyl)cyclopentadienyl)-1-(2,7-di-tert-butylfluorenyl)-1,1-diphenylmethane (compound L-1) (45.3 g, 78.6 mmol) dissolved in Et$_2$O (400 mL) was slowly added n-BuLi (68.5 mL of 2.5 M in hexanes, 171.3 mmol) at 0° C. The mixture was warmed to room temperature, stirred overnight, and then added via cannula to HfCl$_4$ (26.8 g, 83.6 mmol) suspended in a mixture of pentane (450 mL) and Et$_2$O (30 mL) at 0° C. in 30 minutes. The mixture was warmed to room temperature and stirred for two days. The slurry was concentrated and centrifuged. The liquid was decanted off. The remaining solid was washed a second time with pentane (100 mL), then extracted with methylene chloride and centrifuged. The solution was taken to dryness under vacuum to give a yellow solid (46.4 g, 71.7%). $^1$H NMR (300 MHz, CDCl$_3$) δ 7.88-7.98 (m, 3H), 7.78-7.88 (m, 3H), 7.40-7.50 (m, 2H), 7.29-7.38 (broad t, J=7.2 Hz, 2H), 7.11-7.28 (m, 4H), 6.28 (broad s, 1H), 6.24 (broad s, 1H), 5.87-5.93 (t, J=2.7 Hz, 1H), 5.61-5.78 (m, 1H), 5.44-5.50 (t, J=2.7 Hz, 1H), 5.19-5.25 (t, J=2.7 Hz, 1H), 4.82-4.96 (m, 2H), 2.28-2.48 (m, 2H), 1.94-2.05 (m, 2H), 1.46-1.60 (m, 2H), 0.98 (s, 18H); $^{13}$C NMR (75 MHz, CDCl$_3$) δ 149.41, 149.21, 144.47, 144.24, 137.71, 132.69, 129.08, 128.83, 128.45, 128.39, 128.22, 126.50, 126.46, 126.13, 125.97, 123.70, 123.46, 123.40, 123.34, 119.89, 119.66, 119.01, 118.86, 118.82, 118.53, 114.75, 114.39, 111.11, 100.92, 100.69, 76.88, 57.88, 35.29, 35.27, 33.75, 31.04, 31.02, 29.48, 29.31.

Synthesis of diphenylmethylidene{$\eta^5$-[3-(but-3-enyl)cyclopentadien-1-ylidene]}[$\eta^5$-(2,7-di-tert-butylfluoren-9-ylidene)]hafnium dichloride (M-2)

To 1-(3-(but-3-enyl)cyclopentadienyl)-1-(2,7-di-tert-butylfluorenyl)-1,1-diphenylmethane (compound L-2) (3.2 g, 5.7 mmol) dissolved in Et$_2$O (30 mL) was slowly added n-BuLi (5.2 mL of 2.5 M in hexanes, 13 mmol) at 0° C. The mixture was warmed to room temperature, stirred overnight, and then added via cannula to HfCl$_4$ (2.1 g, 6.5 mmol) suspended in a mixture of pentane (30 mL) and Et$_2$O (5 mL) at 0° C. in 10 minutes. The mixture was warmed to room temperature and stirred for two days. The slurry was concentrated and centrifuged. The liquid was decanted off. The remaining solid was washed a second time with pentane (80 mL), then extracted with methylene chloride and centrifuged. The solution was taken to dryness under vacuum to give a yellow solid (3.1 g, 67.4% yield). $^1$H NMR (300 MHz, CDCl$_3$) δ 7.87-7.98 (m, 3H), 7.79-7.86 (m, 3H), 7.43-7.49 (m, 2H), 7.30-7.38 (dt, J=7.5 Hz, 1.4 Hz, 2H), 7.14-7.29 (m, 4H), 6.24-6.27 (d, J=0.6 Hz, 1H), 6.20-6.24 (d, J=0.6 Hz, 1H), 5.87-5.92 (t, J=2.7 Hz, 1H), 5.62-5.77 (m, 1H), 5.42-5.47 (t, J=2.7 Hz, 1H), 5.18-5.23 (t, J=2.7 Hz, 1H), 4.85-4.98 (m, 2H), 2.35-2.55 (m, 2H), 2.13-2.22 (m, 2H), 0.96 (s, 18H); $^{13}$C NMR (75 MHz, CDCl$_3$) δ 149.52, 149.33, 144.51, 144.30, 137.33, 132.16, 129.13, 128.89, 128.51, 128.45, 128.30, 128.26, 126.58, 126.53, 126.24, 126.06, 123.77, 123.54, 123.42, 123.36, 119.97, 119.75, 119.08, 118.90, 118.58, 114.94, 114.83, 111.14, 101.01, 100.68, 76.93, 57.94, 35.36, 35.35, 34.11, 31.08, 31.05, 29.42.

Synthesis of diphenylmethylidene{$\eta^5$-[3-(pent-4-enyl)cyclopentadien-1-ylidene]}[$\eta^5$-(2,7-di-tert-butylfluoren-9-ylidene)]zirconium dichloride (M-3)

To 1-(3-(pent-4-enyl)cyclopentadienyl)-1-(2,7-di-tert-butylfluorenyl)-1,1-diphenylmethane (compound L-1) (34.7 g, 60.2 mmol) dissolved in Et$_2$O (300 mL) was slowly added n-BuLi (52 mL of 2.5 M in hexanes, 130 mmol) at 0° C. The mixture was warmed to room temperature, stirred overnight, and then added via cannula to ZrCl$_4$ (14.7 g, 63.1 mmol) suspended in a mixture of pentane (250 mL) and Et$_2$O (20 mL) at 0° C. in 30 minutes. The mixture was warmed to room temperature, stirred for one day, and evacuated to dryness. The residue was stirred in pentane (200 mL) and centrifuged. The supernatant was discarded. The remaining solid was washed a second time with pentane (50 mL), then extracted with methylene chloride and centrifuged. The solution was taken to dryness under vacuum to give a red solid (33.5 g, 75.6%). $^1$H NMR (300 MHz, CDCl$_3$) δ 7.94-7.99 (m, 2H)], 7.89-7.94 (m, 1H), 7.77-7.87 (m, 3H), 7.47-7.53 (m, 2H), 7.32-7.39 (dt, J=7.2 Hz, 1.2 Hz, 2H), 7.15-7.29 (m, 4H), 6.23 (broad s, 1H), 6.19 (broad s, 1H), 5.94-5.98 (t, J=2.7 Hz, 1H), 5.62-5.76 (m, 1H), 5.50-5.54 (t, J=2.7 Hz, 1H), 5.24-5.29 (t, J=2.7 Hz, 1H), 4.82-4.96 (m, 2H), 2.23-2.43 (m, 2H), 1.97-2.05 (m, 2H), 1.48-1.61 (m, 2H), 0.97 (s, 18H); $^{13}$C NMR (75 MHz, CDCl$_3$) δ 149.85, 149.65, 144.27, 144.03, 137.79, 134.18, 129.11, 128.85, 128.51, 128.46, 128.34, 126.59, 126.55, 126.18, 126.03, 124.04, 123.79, 123.54, 123.47, 121.09, 120.89, 120.32, 120.06, 119.46, 119.26, 115.61, 114.44, 108.51, 103.36, 103.29, 76.69, 58.13, 35.39, 35.37, 33.78, 31.06, 31.03, 29.61, 29.33.

Synthesis of diphenylmethylidene{$\eta^5$-[3-(but-3-enyl)cyclopentadien-1-ylidene]}[$\eta^5$-(2,7-di-tert-butylfluoren-9-ylidene)]zirconium dichloride (M-4)

To 1-(3-(but-3-enyl)cyclopentadienyl)-1-(2,7-di-tert-butylfluorenyl)-1,1-diphenylmethane (compound L-2) (40.5 g, 72.1 mmol) suspended in Et$_2$O (400 mL) was slowly added n-BuLi (15.2 mL of 10 M in hexanes, 152 mmol) at 0° C. The mixture was warmed to room temperature, stirred overnight, and then added via cannula to ZrCl$_4$ (18.5 g, 79.4 mmol) suspended in a mixture of pentane (400 mL) and Et$_2$O (30 mL) at 0° C. in 15 minutes. The mixture was warmed to room temperature, stirred for one day, and evacuated to dryness. The residue was stirred in pentane (300 mL) and centrifuged. The supernatant was discarded. The remaining solid was washed a second time with pentane (100 mL), then extracted with methylene chloride and centrifuged. The solution was taken to dryness under vacuum to give a red solid (38.1 g, 73.3% yield). $^1$H NMR (300 MHz, CDCl$_3$) δ 7.88-8.02 (m, 3H), 7.77-7.88 (m, 3H), 7.46-7.54 (m, 2H), 7.31-7.40 (broad t, J=7.5 Hz, 2H), 7.14-7.32 (m, 4H), 6.24 (s, 1H), 6.20 (s, 1H), 5.96-6.02 (unresolved t, 1H), 5.63-5.79 (m, 1H), 5.50-5.55 (unresolved t, 1H), 5.25-5.31 (unresolved t, 1H), 4.87-5.01 (m, 2H), 2.33-2.53 (m, 2H), 2.15-2.27 (m, 2H), 0.97 (s, 18H); $^{13}$C NMR (75 MHz, CDCl$_3$) δ 149.85, 149.65, 144.23, 144.01, 137.27, 133.51, 129.08, 128.84, 128.50, 128.45, 128.33, 128.30, 126.58, 126.54, 126.18, 126.01, 124.04, 123.81, 123.55, 123.48, 121.08, 120.89, 120.31, 120.03, 119.43, 119.24, 115.71, 114.86, 108.44, 103.37, 103.18, 76.66, 58.10, 35.38, 35.36, 33.98, 31.05, 31.02, 29.46.

Synthesis of diphenylmethylidene{$\eta^5$-[3-(1,1-dimethylpent-4-enyl)cyclo-pentadien-1-ylidene]}[$\eta^5$-(2,7-di-tert-butylfluoren-9-ylidene)]zirconium dichloride (M-5)

A slurry of 1-(3-(1,1-dimethylpent-4-enyl)cyclopentadienyl)-1-(2,7-di-tert-butylfluorenyl)-1,1-diphenylmethane (compound L-3) (10.8 g, 17.9 mmol) in Et$_2$O (50 mL) was cooled in dry ice and n-BuLi (22.2 mL of 1.6 M in hexanes, 35.5 mmol) was added dropwise. After 1 hour, the bath was removed and the mixture was stirred for 48 hours at room temperature. The mixture was added to ZrCl$_4$ (4.37 g, 18.8 mmol) suspended in pentane (50 mL) while cooling in ice. The slurry was stirred for 65 hours at room temperature. The slurry was concentrated until thick and pentane (70 mL) was added. The slurry was stirred overnight and the liquid was decanted off. The solid was washed a second time with pentane and then extracted with methylene chloride and centrifuged. The solution was taken to dryness under vacuum to give a red solid (11.65 g, 85.2% yield). $^1$H NMR (300 MHz, CDCl$_3$) δ 7.93-8.02 (m, 3H), 7.80-7.91 (m, 3H), 7.52-7.60 (dt, J=8.7 Hz, 1.5 Hz, 2H), 7.38-7.47 (m, 2H), 7.20-7.35 (m, 4H), 6.27 (broad s, 2H), 6.14-6.18 (t, J=3.0 Hz, 1H), 5.67-5.83 (m, 1H), 5.61-5.64 (t, J=3.0 Hz, 1H), 5.48-5.52 (t, J=3.0 Hz, 1H), 4.88-5.04 (m, 2H), 1.76-2.10 (m, 2H), 1.44-1.53 (m, 2H), 1.26 (s, 3H), 1.07 (s, 3H), 1.02 (s, 18H); $^{13}$C NMR (75 MHz, CDCl$_3$) δ 149.67, 149.60, 144.31, 144.13, 143.46, 138.49, 129.15, 128.89, 128.51, 128.48, 128.39, 128.33, 126.58, 126.52, 126.11, 125.97, 124.18, 124.10, 123.73, 123.36, 121.09, 120.78, 120.20, 119.75, 118.88, 114.16, 113.84, 108.10, 104.30, 100.60, 77.19, 57.65, 46.43, 36.32, 35.38, 35.36, 31.06, 31.03, 29.47, 26.99, 24.19.

Synthesis of bis[(η$^5$-1-(3-phenylpropyl)indenyl)] zirconium dichloride (M-A)

This metallocene was prepared according to the general preparative method for substituted bis(indenyl) metallocenes reported in: Alt, H G., et. al. *J. Organomet. Chem.* 2000, 599, 275; and Alt, H G., et. al. *J. Organomet. Chem.* 2001, 621, 304. General preparative methods for forming substituted bis(indenyl) metallocenes are reported in a number of references.

Synthesis of bis(η$^5$-indenyl) zirconium dibenzyl (M-C)

This metallocene was prepared according to the general preparative method for forming hydrocarbyl-substituted metallocenes by substitution reactions, such as alkylating metallocene chlorides, as reported in: Resconi, L., et. al. *J. Organomet. Chem.* 2003, 683, 2; Basset, J.-M., et. al. *J. Am. Chem. Soc.*, 2001, 123, 3520; Marks, T. J. *Acc. Chem. Res.*, 1992, 25, 57; and Marks, T. J. *Organometallics*, 2002, 21, 1788. General preparative methods for forming hydrocarbyl-substituted metallocenes are reported in a number of references.

Synthesis of {η$^5$-[1-(prop-2-enyl)indenyl]}[η$^5$-(n-butylcyclopentadienyl)]-zirconium dichloride (M-E)

A 500 mL Schlenk flask was charged with (n-BuC$_5$H$_4$)ZrCl$_3$ (20.0 g, 62.7 mmol; prepared by the reaction of (n-BuC$_5$H$_4$)$_2$ZrCl$_2$ and ZrCl$_4$ in refluxing toluene) and approximately 400 mL of diethyl ether. The resulting slurry was cooled to 0° C., after which time Li(1-allylindene) (10.7 g, 66.0 mmol) was added via cannula as an ethereal solution. The reaction mixture was stirred overnight at ambient temperature and the solvent was removed in vacuo. The resulting solid was dissolved in toluene and centrifuged to remove LiCl. Removal of solvent in vacuo yielded a yellow-brown solid which was dissolved in a dichloromethane/pentane mixture and was cooled to −35° C. for a couple of hours. Resulting slurry was filtered, and the precipitate was dried under reduced pressure (0.1 mm, 1 h) to yield the product as a yellow solid (17.0 g, 62%). $^1$H NMR (CDCl$_3$, δ) 0.87 (t, J=7.2 Hz, CH$_3$), 1.50-1.22 (m, CH$_2$(CH$_2$)$_2$CH$_3$), 2.58-2.42 (m, CH$_2$(CH$_2$)$_2$CH$_3$), 3.77-3.62 (m, CH$_2$=CHCH$_2$), 5.10-5.02 (m, CH$_2$=CHCH$_2$), 5.78-5.76 (m, 1, C$_5$H$_4$), 5.87-5.83 (m, 2, C$_5$H$_4$), 5.99-5.91 (m, CH$_2$=CHCH$_2$), 6.04-6.00 (m, 1, C$_5$H$_4$), 6.39-6.37 (m, 1, C$_9$H$_6$), 6.63 (d, J=3.0 Hz, 1, C$_9$H$_6$), 7.28-7.18 (m, 2, C$_9$H$_6$), 7.60-7.56 (m, 2, C$_9$H$_6$).

EXAMPLES 1-6

Bench Scale Catalytic Runs Varying the Metallocene, Activator-Support, and Conditions Examples 1-6 in Table 1 illustrate polymerization run data and polymer characterization data for ethylene homopolymer and ethylene-1-hexene copolymer prepared using the catalyst compositions disclosed herein. Polymerization runs were conducted in a one-gallon (3.785 liter) stainless steel reactor. Two liters of isobutane and alkyl aluminum cocatalyst/scavenger were used in all examples. Hydrogen, when added, was added slowly throughout the run and was measured as the pressure drop on a 340 mL steel cylinder. Metallocene solutions (1 mg/mL) were usually prepared by dissolving 30 mg of metallocene in 30 mL of toluene.

A typical polymerization procedure is as follows: Alkyl aluminum, SSA and the metallocene solution were added in that order through a charge port while venting isobutane vapor. The charge port was closed and two liters of isobutane were added. The contents of the reactor were stirred and heated to the desired run temperature. Hexene, when added, was flushed into the reactor as the ethylene was initially added. Ethylene was fed on demand to maintain the specified pressure for the specified length of the polymerization run. The reactor was maintained at the desired run temperature through the run by an automated heating-cooling system FIG. 2 provides comparison gel permeation chromatograms (GPCs) for ethylene homopolymers and copolymers of Examples 1-6 (E1-E6), prepared as provided in Table 1. Formulas for the particular metallocenes used in Examples 1-6 are illustrated in FIG. 1.

EXAMPLES 7-13

Pilot-Plant Scale Catalytic Runs Varying the Metallocene, Activator-Support, and Conditions Examples 7-13 (E7-E13) in Table 2 illustrate polymerization run data and polymer characterization data for ethylene-1-hexene copolymer prepared using the catalyst compositions disclosed herein. Polymerization runs were conducted as follows. A 27.3-gallon slurry loop reactor was employed as the polymerization reactor. Polymerization runs were carried out under continuous particle form process conditions in the loop reactor (also known as a slurry process) by contacting an isobutane solution of a first metallocene, having the formula indicated in FIG. 1, and a second metallocene, having the formula indicated in FIG. 1, with either triisobutylaluminum or tributylaluminum and a sulfated alumina activator-support in a 0.5 L stirred autoclave with continuous output to the loop reactor.

Precontacting was carried out in the following manner. Either triisobutylaluminum or tributylaluminum solution and both metallocene solutions in isobutane were fed as separate streams into a manifold upstream of the solid activator feeder outlet where they contacted each other and were combined with isobutane flush. The solid activator was flushed with the combined solution into the autoclave, briefly contacting the either triisobutylaluminum or tributylaluminum/metallocenes mixture/solid activator just before entering the autoclave. The combined solution flush used to transport the solid activator into the autoclave was set at a rate that would result in a residence time of approximately 6-24 minutes in the autoclave by adjusting the isobutane flow rate. The total flow from the autoclave then entered the loop reactor.

Ethylene used was polymerization grade ethylene (obtained from Union Carbide Corporation) which was purified through a column of alumina activated at 250° C. (482° F.) in nitrogen. 1-Hexene used was polymerization grade 1-hexene (obtained from Chevron Chemicals Company) which was further purified by distillation and subsequently passed through a column of alumina activated at 250° C. (482° F.) in nitrogen. The loop reactor was a liquid full, 15.2 cm diameter, loop reactor, having a volume of 27.3 gallons (103.3 liters). Liquid isobutane was used as the diluent. Some hydrogen was added to regulate the molecular weight of the low molecular weight component of the polymer product. The isobutane was polymerization grade isobutane (obtained from Phillips Petroleum Company, Borger, Tex.) that was further purified by distillation and subsequently passed through a column of alumina activated at 250° C. (482° F.) in nitrogen.

Reactor conditions included a pressure around 580 psi (4 MPa), and a temperature about 77-95° C. (170-203° F.) as indicated in Table 2. Also, the reactor was operated to have a residence time of about 1.1 hours. The solid activator was added through a 0.35 cc circulating ball-check feeder and fed to the 0.5-Liter autoclave as described above. Metallocene concentrations in the reactor were within a range of about 1.32 to 3.58 parts per million (ppm) of the diluent in the polymerization reactor. Polymer was removed from the reactor at the rate of about 22-27 lbs per hour and recovered in a flash chamber. A Vulcan dryer was used to dry the polymer under nitrogen at about 60-80° C. (140-176° F.).

The cocatalyst (TIBA or TNBA) was added in a concentration in a range of from about 110 to 201 parts per million of the diluent in the polymerization reactor. To prevent static buildup of the reactor, a small amount (less than 5 ppm, by weight, of diluent) of a commercial antistatic agent sold as "Stadis 450" was usually added. The various resins were prepared according to the above procedure, as specified in Table 2.

FIG. 3 provides comparison gel permeation chromatograms (GPCs) for ethylene homopolymers and copolymers of Examples 7-13 (E7-E13), prepared as provided in Table 2. Formulas for the particular metallocenes used in Examples 7-13 are illustrated in FIG. 1.

TABLE 1

Laboratory polymerization conditions and polymerization results.

| Example No. | First Metallocene[1] | Second Metallocene[1] | Time (min) | Temp (° C.) | Reactor Pressure (psi) | $H_2$ (340 mL vessel, Δ psi) | 1-Hexene (g) | Support-Activator | Support-Activator weight (mg) |
|---|---|---|---|---|---|---|---|---|---|
| E1 | 1 mg M-B | 2.1 mg M-1 | 30 | 95 | 420 | 30 | 0.0 | Sulfated Alumina | 200 |
| E2 | 1 mg M-B | 1.5 mg M-1 | 60 | 95 | 450 | 30 | 0.0 | Sulfated Alumina | 100 |
| E3 | 1.5 mg M-A | 1.5 mg M-1 | 60 | 90 | 450 | 30 | 10.0 | Sulfated Alumina | 100 |
| E4 | 1.5 mg M-E | 1.5 mg M-1 | 60 | 90 | 450 | 30 | 0.0 | Sulfated Alumina | 100 |
| E5 | 1 mg M-B | 2.1 mg M-1 | 30 | 95 | 420 | | 0.0 | Sulfated Alumina | 200 |
| E6 | 1.5 mg M-D | 1.5 mg M-1 | 30 | 95 | 450 | 0 | 0.0 | Sulfated Alumina | 91 |

| Example No. | $R_3Al$[2] (mmol) | Solid PE (g) | MI | HLMI | Mn/1000 | Mw/1000 | Mz/1000 | HI |
|---|---|---|---|---|---|---|---|---|
| E1 | 0.25 TIBA | 351 | 0.0 | 3.40 | 19.24 | 540.77 | 2194.97 | 28.11 |
| E2 | 0.25 TIBA | 472 | 0.0 | 0.62 | 26.55 | 748.46 | 3815.97 | 28.19 |
| E3 | 0.25 TIBA | 270 | 0.0 | 1.48 | 11.28 | 640.72 | 3240.33 | 56.8 |
| E4 | 0.25 TIBA | 421 | 0.0 | 1.65 | 20.68 | 523.35 | 2185.03 | 25.31 |
| E5 | 0.25 TIBA | 206 | 0.0 | 0.03 | 98.95 | 1269.04 | 3823.54 | 12.83 |
| E6 | 0.5 TIBA | 139 | 0.0 | 0.008 | 78.21 | 900.05 | 3182.16 | 12.83 |

[1]Metallocene formulas are illustrated in FIG. 1.
[2]TIBA, triisobutylaluminum.

TABLE 2

Pilot plant polymerization conditions and polymerization results.

| | Example No. | | | | | | |
|---|---|---|---|---|---|---|---|
| | E7 | E8 | E9 | E10 | E11 | E12 | E13 |
| Activator-Support | Sulfated Alumina | Sulfated Alumina | Sulfated Alumina | Sulfated Alumina | Sulfated Alumina | Sulfated Alumina | Sulfated Alumina |
| Metallocenes[1] | M-1 + M-E | M-1 + M-E | M-1 + M-E | M-1 + M-E | M-4 + M-C | M-4 + M-C | M-4 + M-E |
| Metallocene to Reactor (ppm) | M-1: 2.51 M-E: 1.07 | M-1: 2.25 M-E: 1.02 | M-1: 2.37 M-E: 1.06 | M-1: 2.51 M-E: 1.05 | M-4: 0.27 M-C: 0.79 | M-4: 0.27 M-C: 0.78 | M-4: 0.49 M-C: 0.83 |
| Autoclave Residence Time (Min) | 15.57 | 14.68 | 14.37 | 14.17 | 22.91 | 23.22 | 6.13 |
| Cocatalyst Type[2] | TIBA | TIBA | TIBA | TIBA | TNBA | TNBA | TNBA |
| Cocatalyst (precontactor + reactor) (ppm) | 20.02 + 181.48 | 19 + 168.5 | 20.02 + 174.5 | 19.69 + 89.5 | 87.82 + 44.58 | 87.26 + 45.14 | 85.7 + 40.16 |
| Rx Temp (° F.) | 202.9 | 202.9 | 202.8 | 202.8 | 179.7 | 179.7 | 169.6 |
| Ethylene (mol %) | 15.15 | 13.93 | 14.42 | 15.12 | 13.85 | 13.64 | 15.22 |
| 1-hexene (mol %) | 0.55 | 0.49 | 0.45 | 0.44 | 0.79 | 0.79 | 0.75 |
| C6=/C2= (Mole Ratio) | 0.04 | 0.04 | 0.03 | 0.03 | 0.06 | 0.06 | 0.05 |
| $H_2$(mlb/hr) | 6 | 8 | 8 | 8 | 4.6 | 4.6 | 8 |
| C2= Feed Rate (lb/hr) | 29.61 | 29.59 | 29.53 | 29.60 | 31.30 | 31.30 | 32.1 |
| 1-Hexene Feed Rate (lb/hr) | 0.56 | 0.61 | 0.61 | 0.61 | 1.21 | 1.24 | 1.01 |
| Total iC4 Flow Rate (lb/hr) | 59.3 | 61.48 | 60.1 | 60.07 | 57.88 | 57.89 | 62.67 |
| Solids Conc. wt. % | 24.63 | 24.22 | 24.23 | 24.3 | 28.25 | 28.61 | 26.09 |
| Polymer Production (lb/hr) | 22.48 | 22.67 | 22.33 | 22.42 | 26.00 | 26.33 | 25.44 |
| Density (pellets) (g/cc) | 0.9533 | 0.9517 | 0.952 | 0.9529 | 0.9497 | 0.9493 | 0.953 |
| Mw/1000 (pellets) | 317.04 | 292.07 | 276.43 | 264.06 | 283.45 | 281.93 | 261.8 |
| Mn/1000 (pellets) | 13.48 | 8.59 | 8.31 | 8.09 | 13.03 | 14.44 | 10.1 |
| Mw/Mn (pellets) | 23.5 | 34 | 33.3 | 32.6 | 21.8 | 19.5 | 25.9 |

[1]Metallocene formulas are illustrated in FIG. 1.
[2]TIBA, triisobutylaluminum; TNBA, tri-n-butylaluminum.

We claim:

1. A method of polymerizing olefins, comprising:
contacting an olefin monomer and an optional α-olefin comonomer with a catalyst composition under polymerization conditions to form a polymer or copolymer;
wherein the catalyst composition comprises a contact product of: 1) at least one first metallocene; 2) at least one second metallocene; 3) optionally, at least one organoaluminum compound; and 4) at least one activator-support, wherein:

a) the at least one first metallocene comprises an ansa-metallocene having the formula:

(M1-A), wherein $M^1$ is titanium, zirconium, or hafnium;

$(X^1)$ and $(X^2)$ are independently a substituted cyclopentadienyl, a substituted indenyl, or a substituted fluorenyl;

one substituent on $(X^1)$ and $(X^2)$ is a bridging group having the formula $ER^1R^2$, wherein E is a carbon atom, a silicon atom, a germanium atom, or a tin atom, and E is bonded to both $(X^1)$ and $(X^2)$, and wherein $R^1$ and $R^2$ are independently an alkyl group or an aryl group, either of which having up to 12 carbon atoms, or hydrogen, wherein at least one of $R^1$ and $R^2$ is an aryl group;

at least one substituent on $(X^1)$ or $(X^2)$ is a substituted or an unsubstituted alkenyl group having up to 12 carbon atoms; and $(X^3)$ and $(X^4)$ are independently: 1) F, Cl, Br, or I; 2) a hydrocarbyl group having up to 20 carbon atoms, H, or $BH_4$; 3) a hydrocarbyloxide group, a hydrocarbylamino group, or a trihydrocarbylsilyl group, any of which having up to 20 carbon atoms; or 4) $OBR^A_2$ or $SO_3R^A$, wherein $R^A$ is an alkyl group or an aryl group, any of which having up to 12 carbon atoms; and any additional substituent on the substituted cyclopentadienyl, substituted indenyl, substituted fluorenyl, or substituted alkenyl group is independently an aliphatic group, an aromatic group, a cyclic group, a combination of aliphatic and cyclic groups, an oxygen group, a sulfur group, a nitrogen group, a phosphorus group, an arsenic group, a carbon group, a silicon group, or a boron group, any of which having from 1 to 20 carbon atoms; a halide; or hydrogen;

b) the at least one second metallocene comprises an unbridged metallocene having the formula:

i)  (M2-A), wherein $M^2$ is titanium, zirconium, or hafnium;

$(X^5)$ and $(X^6)$ are independently a cyclopentadienyl, an indenyl, a substituted cyclopentadienyl, or a substituted indenyl;

$(X^7)$ and $(X^8)$ are independently: 1) F, Cl, Br, or I; 2) a hydrocarbyl group having up to 20 carbon atoms, H, or $BH_4$; 3) a hydrocarbyloxide group, a hydrocarbylamino group, or a trihydrocarbylsilyl group, any of which having up to 20 carbon atoms; or 4) $OBR^B_2$ or $SO_3R^B$, wherein $R^B$ is an alkyl group or an aryl group, any of which having up to 12 carbon atoms; and any substituent on the substituted cyclopentadienyl or substituted indenyl is independently an aliphatic group, an aromatic group, a cyclic group, a combination of aliphatic and cyclic groups, an oxygen group, a sulfur group, a nitrogen group, a phosphorus group, an arsenic group, a carbon group, a silicon group, or a boron group, any of which having from 1 to 20 carbon atoms; a halide; or hydrogen;

ii) $(X^9)(X^{10})(X^{11})(X^{12})M^3$     (M3-A), wherein $M^3$ is titanium, zirconium, or hafnium;

$(X^9)$ is a substituted cyclopentadienyl group, wherein one substituent is an aliphatic group, an aromatic group, or a combination of aliphatic and cyclic groups, any of which having up to 20 carbon atoms;

$(X^{10})$ is a substituted indenyl group, wherein one substituent is an aliphatic group, an aromatic group, or a combination of aliphatic and cyclic groups, any of which having up to 20 carbon atoms;

$(X^{11})$ and $(X^{12})$ are independently: 1) F, Cl, Br, or I; 2) a hydrocarbyl group having up to 20 carbon atoms, H, or $BH_4$; 3) a hydrocarbyloxide group, a hydrocarbylamino group, or a trihydrocarbylsilyl group, any of which having up to 20 carbon atoms; or 4) $OBR^C_2$ or $SO_3R^C$, wherein $R^C$ is an alkyl group or an aryl group, any of which having up to 12 carbon atoms; and any additional substituent on the substituted cyclopentadienyl or substituted indenyl is independently an aliphatic group, an aromatic group, a cyclic group, a combination of aliphatic and cyclic groups, an oxygen group, a sulfur group, a nitrogen group, a phosphorus group, an arsenic group, a carbon group, a silicon group, or a boron group, any of which having from 1 to 20 carbon atoms; a halide; or hydrogen;

or iii) any combination thereof;

c) the at least one organoaluminum compound comprises a compound having the formula:

$Al(X^{13})_n(X^{14})_{3-n}$, wherein $(X^{13})$ is a hydrocarbyl having from 1 to 20 carbon atoms; $(X^{14})$ is an alkoxide or an aryloxide, any of which having from 1 to 20 carbon atoms, halide, or hydride; and n is a number from 1 to 3, inclusive; and d) the at least one activator-support comprises a solid oxide treated with an electron-withdrawing anion;

wherein the at least one organoaluminum compound is optional when at least one of the following conditions exist:

1) a) at least one of $(X^3)$ and $(X^4)$ is a hydrocarbyl group having up to 20 carbon atoms, H, or $BH_4$; b) at least one of $(X^7)$ and $(X^8)$ is a hydrocarbyl group having up to 20 carbon atoms, H, or $BH_4$; and c) at least one of $(X^{11})$ and $(X^{12})$ is a hydrocarbyl group having up to 20 carbon atoms, H, or $BH_4$;

2) the catalyst composition comprises at least one organoaluminoxane compound; or 3) both conditions 1 and 2 exist.

2. A method of polymerizing olefins, comprising:

contacting an olefin monomer and an optional α-olefin comonomer with a catalyst composition under polymerization conditions to form a polymer or copolymer;

wherein the catalyst composition comprises a contact product of: 1) at least one first metallocene; 2) at least one second metallocene; and 3) at least one activator-support, wherein:

a) the at least one first metallocene comprises an ansa-metallocene having the formula:

$(X^1)(X^2)(X^3)(X^4)M^1$     (M1-B), wherein $M^1$ is titanium, zirconium, or hafnium;

$(X^1)$ and $(X^2)$ are independently a substituted cyclopentadienyl, a substituted indenyl, or a substituted fluorenyl;

one substituent on $(X^1)$ and $(X^2)$ is a bridging group having the formula $ER^1R^2$, wherein E is a carbon atom, a silicon atom, a germanium atom, or a tin atom, and E is bonded to both $(X^1)$ and $(X^2)$, and wherein $R^1$ and $R^2$ are independently an alkyl group or an aryl group, either of which having up to 12 carbon atoms, or hydrogen, wherein at least one of $R^1$ and $R^2$ is an aryl group;

at least one substituent on $(X^1)$ or $(X^2)$ is a substituted or an unsubstituted alkenyl group having up to 12 carbon atoms;

$(X^3)$ and $(X^4)$ are independently: 1) F, Cl, Br, or I; 2) a hydrocarbyl group having up to 20 carbon atoms, H, or $BH_4$; 3) a hydrocarbyloxide group, a hydrocarbylamino group, or a trihydrocarbylsilyl group, any of which having up to 20 carbon atoms; or 4) $OBR^A_2$ or $SO_3R^A$, wherein $R^A$ is an alkyl group or an aryl group, any of which having up to 12 carbon atoms; wherein at least one of $(X^3)$ and $(X^4)$ is a hydrocarbyl group having up to 20 carbon atoms, H, or $BH_4$; and any additional substituent on the substituted cyclopentadienyl, substituted indenyl, substituted fluorenyl, or substituted alkenyl group is independently an aliphatic group, an aromatic group, a cyclic group, a combination of aliphatic and cyclic groups, an oxygen group, a sulfur group, a nitrogen group, a phosphorus group, an arsenic group, a carbon group, a silicon group, or a boron group, any of which having from 1 to 20 carbon atoms; a halide; or hydrogen;

b) the at least one second metallocene comprises an unbridged metallocene having the formula:

i) $(X^5)(X^6)(X^7)(X^8)M^2$     (M2-C), wherein $M^2$ is titanium, zirconium, or hafnium;

$(X^5)$ and $(X^6)$ are independently a cyclopentadienyl, an indenyl, a substituted cyclopentadienyl, or a substituted indenyl;

$(X^7)$ and $(X^8)$ are independently: 1) F, Cl, Br, or I; 2) a hydrocarbyl group having up to 20 carbon atoms, H, or $BH_4$; 3) a hydrocarbyloxide group, a hydrocarbylamino group, or a trihydrocarbylsilyl group, any of which having up to 20 carbon atoms; or 4) $OBR^B_2$ or $SO_3R^B$, wherein $R^B$ is an alkyl group or an aryl group, any of which having up to 12 carbon atoms; wherein at least one of $(X^7)$ and $(X^8)$ is a hydrocarbyl group having up to 20 carbon atoms, H, or $BH_4$; and any substituent on the substituted cyclopentadienyl or substituted indenyl is independently an aliphatic group, an aromatic group, a cyclic group, a combination of aliphatic and cyclic groups, an oxygen group, a sulfur group, a nitrogen group, a phosphorus group, an arsenic group, a carbon group, a silicon group, or a boron group, any of which having from 1 to 20 carbon atoms; a halide; or hydrogen;

ii) $(X^9)(X^{10})(X^{11})(X^{12})M^3$     (M3-C), wherein $M^3$ is titanium, zirconium, or hafnium;

$(X^9)$ is a substituted cyclopentadienyl group, wherein one substituent is an aliphatic group, an aromatic group, or a combination of aliphatic and cyclic groups, any of which having up to 20 carbon atoms;

$(X^{10})$ is a substituted indenyl group, wherein one substituent is an aliphatic group, an aromatic group, or a combination of aliphatic and cyclic groups, any of which having up to 20 carbon atoms;

($X^{11}$) and ($X^{12}$) are independently: 1) F, Cl, Br, or I; 2) a hydrocarbyl group having up to 20 carbon atoms, H, or $BH_4$; 3) a hydrocarbyloxide group, a hydrocarbylamino group, or a trihydrocarbylsilyl group, any of which having up to 20 carbon atoms; or 4) $OBR^C_2$ or $SO_3R^C$, wherein $R^C$ is an alkyl group or an aryl group, any of which having up to 12 carbon atoms; wherein at least one of ($X^{11}$) and ($X^{12}$) is a hydrocarbyl group having up to 20 carbon atoms, H, or $BH_4$; and any additional substituent on the substituted cyclopentadienyl or substituted indenyl is independently an aliphatic group, an aromatic group, a cyclic group, a combination of aliphatic and cyclic groups, an oxygen group, a sulfur group, a nitrogen group, a phosphorus group, an arsenic group, a carbon group, a silicon group, or a boron group, any of which having from 1 to 20 carbon atoms; a halide; or hydrogen;

or iii) any combination thereof; and c) the at least one activator-support comprises a solid oxide treated with an electron-withdrawing anion.

3. The method of claim 1, wherein the at least one first metallocene comprises a compound having the formula:

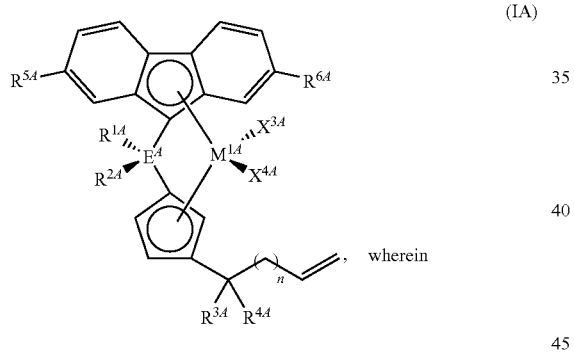

(IA)

wherein $M^{1A}$ is titanium, zirconium, or hafnium;

$X^{3A}$ and $X^{4A}$ are independently F, Cl, Br, I, benzyl, phenyl, or methyl;

$E^A$ is C or Si;

$R^{1A}$ and $R^{2A}$ are independently an alkyl group or an aryl group, either of which having up to 12 carbon atoms, or hydrogen, wherein at least one of $R^{1A}$ and $R^{2A}$ is an aryl group;

$R^{3A}$ and $R^{4A}$ are independently H or $CH_3$;

n is an integer from 0 to 5, inclusive; and $R^{5A}$ and $R^{6A}$ are independently an aliphatic group, an aromatic group, a cyclic group, a combination of aliphatic and cyclic groups, an oxygen group, a sulfur group, a nitrogen group, a phosphorus group, an arsenic group, a carbon group, a silicon group, or a boron group, any of which having from 1 to 12 carbon atoms; or hydrogen.

4. The method of claim 1, wherein the at least one first metallocene is:

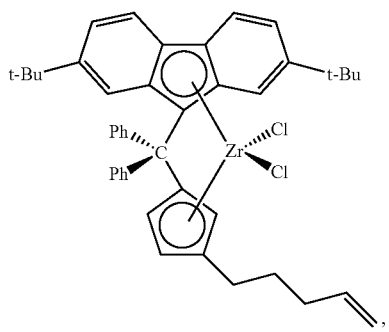

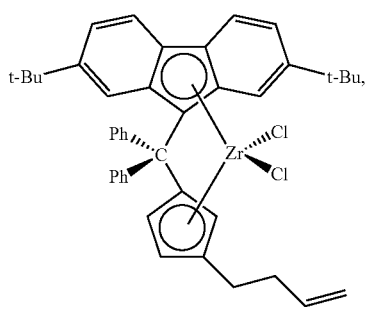

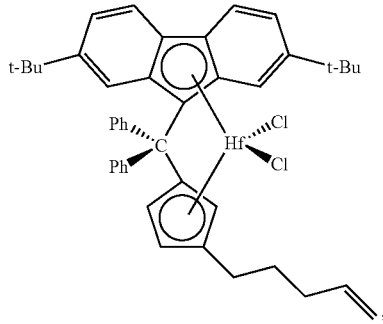

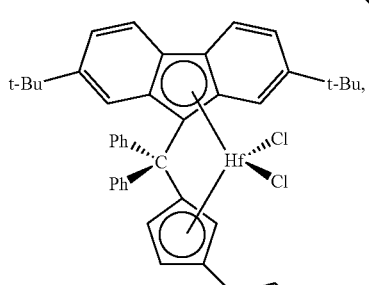

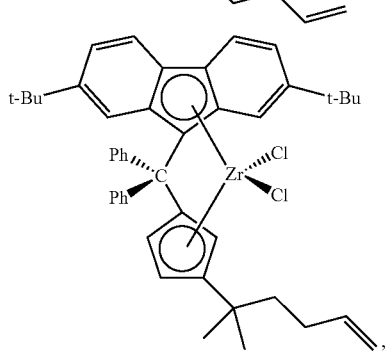

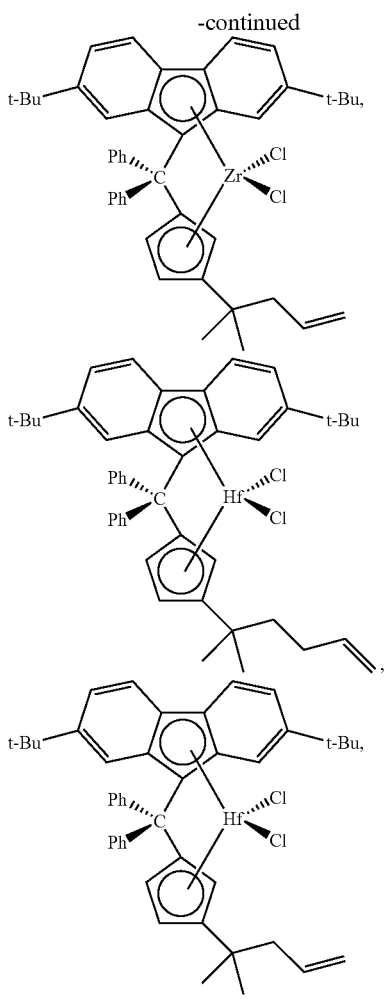

or any combination thereof.

5. The method of claim 1, wherein the at least one second metallocene comprises an unbridged metallocene having the formula:

i) $(X^5)(X^6)(X^7)(X^8)M^2$     (M2-B), wherein $M^2$ is zirconium or hafnium;

$(X^5)$ and $(X^6)$ are independently a cyclopentadienyl, an indenyl, a substituted cyclopentadienyl, or a substituted indenyl;

$(X^7)$ and $(X^8)$ are independently a hydrocarbyl group having up to 12 carbon atoms, H, $BH_4$, F, Cl, Br, or I; and any substituent on the substituted cyclopentadienyl or substituted indenyl is independently an aliphatic group, an aromatic group, a cyclic group, a combination of aliphatic and cyclic groups, any of which having from 1 to 20 carbon atoms;

ii) $(X^9)(X^{10})(X^{11})(X^{12})M^3$     (M3-B), wherein $M^3$ is zirconium or hafnium;

$(X^9)$ is a substituted cyclopentadienyl group, wherein any substituent is independently a linear or branched alkyl group having from 1 to 12 carbon atoms;)

$(X^{10})$ is a substituted indenyl group, wherein any substituent is independently an aliphatic group, an aromatic group, or a combination of aliphatic and cyclic groups, any of which having from 1 to 20 carbon atoms; and $(X^{11})$ and $(X^{12})$ are independently a hydrocarbyl group having up to 12 carbon atoms, H, $BH_4$, F, Cl, Br, or I; or iii) any combination thereof.

6. The method of claim 1, wherein the at least one second metallocene comprises a compound having the formula:

i)

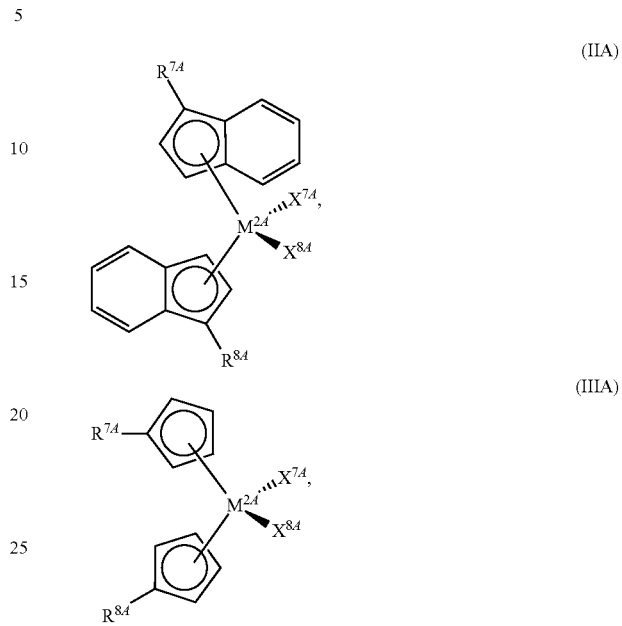

or any combination thereof, wherein $M^{2A}$ is, independently, zirconium or hafnium;

$X^{7A}$ and $X^{8A}$, in each occurrence, are independently F, Cl, Br, I, benzyl, phenyl, or methyl; and $R^{7A}$ and $R^{8A}$, in each occurrence, are independently H, methyl, ethyl, n-propyl, n-butyl, n-pentyl, $CH_2CH_2CH_2Ph$, $CH_2CH=CH_2$, $CH_2CH_2CH=CH_2$, or $CH_2CH_2CH_2CH=CH_2$;

ii)

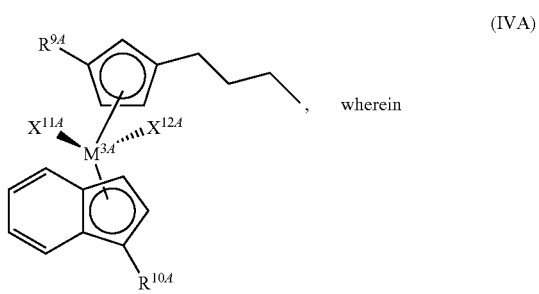

$M^{3A}$ is zirconium or hafnium;

$R^{9A}$ is H or $CH_3$;

$R^{10A}$ is H, $CH_2CH=CH_2$, $CH_2CH_2CH=CH_2$, $CH_2CH_2CH_2CH=CH_2$, $CH_2CH_2CH_2Ph$, or $CH_2CH_2CH_2CH_3$; and $X^{11A}$ and $X^{12A}$ are independently F, Cl, Br, I, benzyl, phenyl, or methyl;

or iii) any combination thereof.

7. The method of claim 1, wherein the at least one second metallocene comprises a compound having the formula:

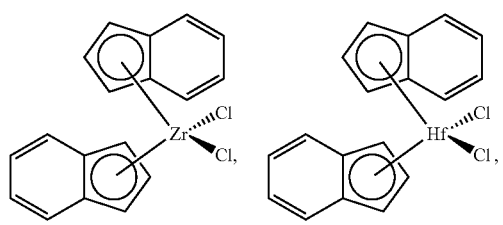
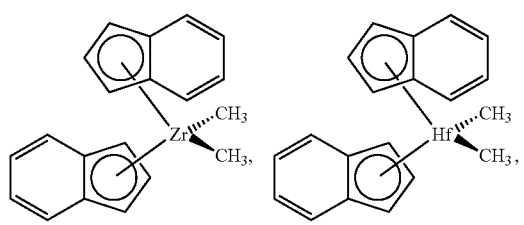
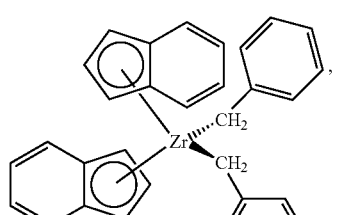
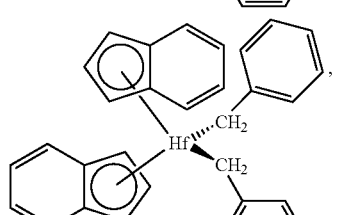
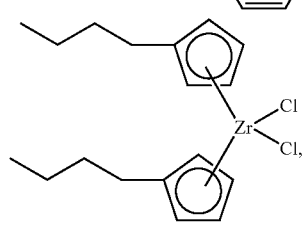
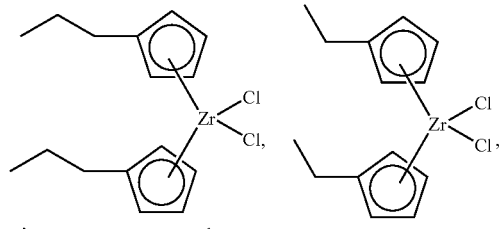
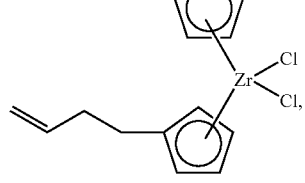
-continued
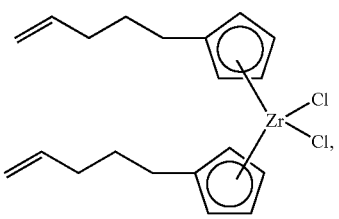
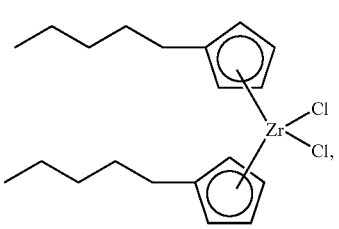
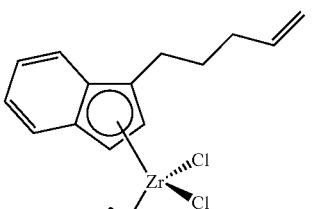
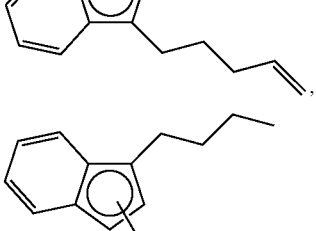
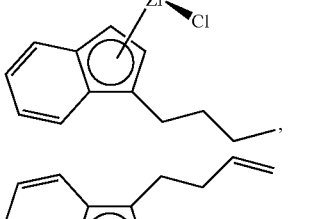
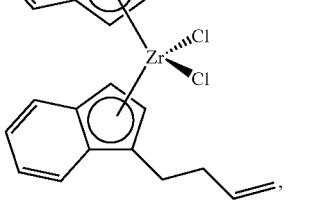
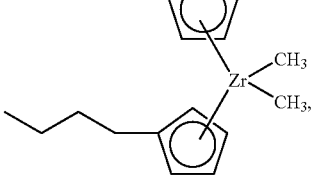

-continued
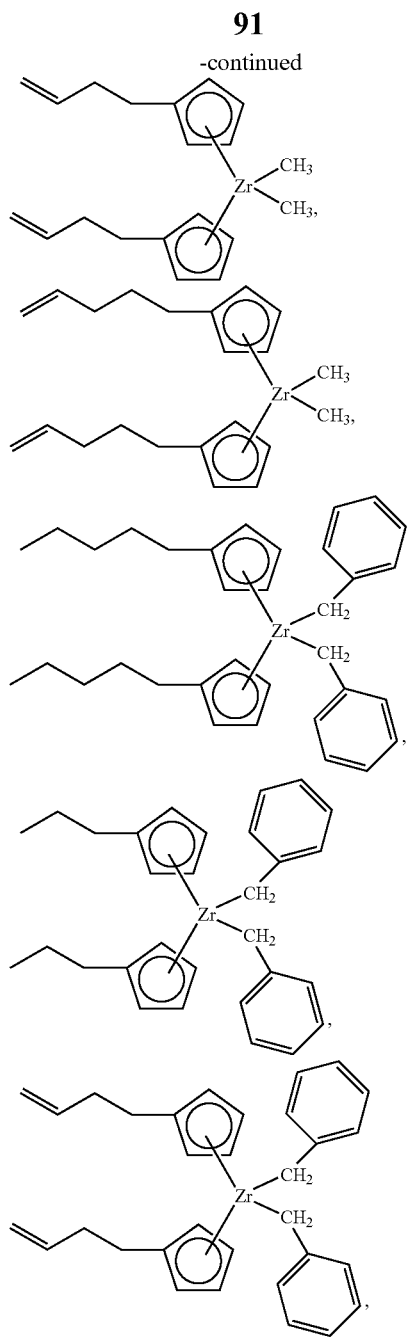
or any combination thereof.
8. The method of claim 1, wherein the at least one second metallocene is:
-continued
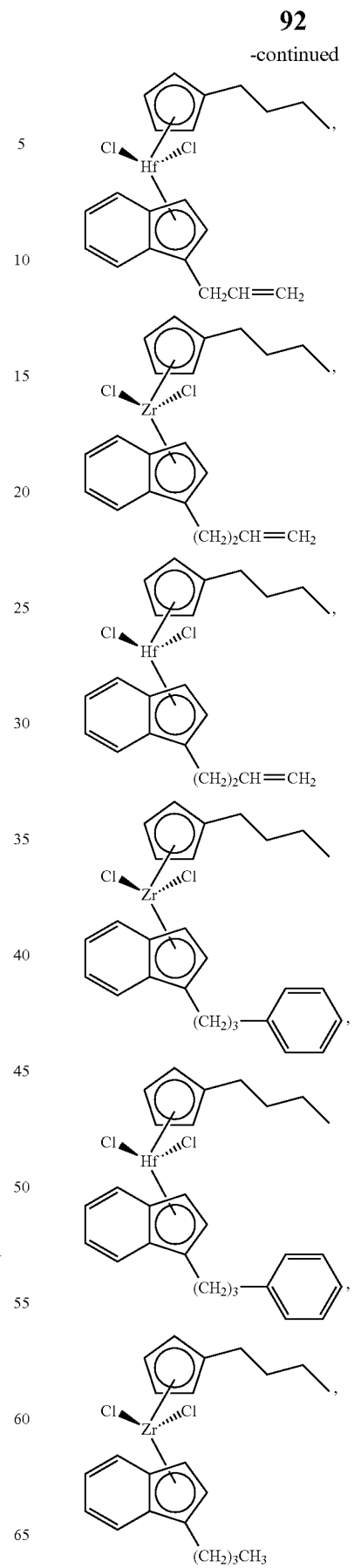

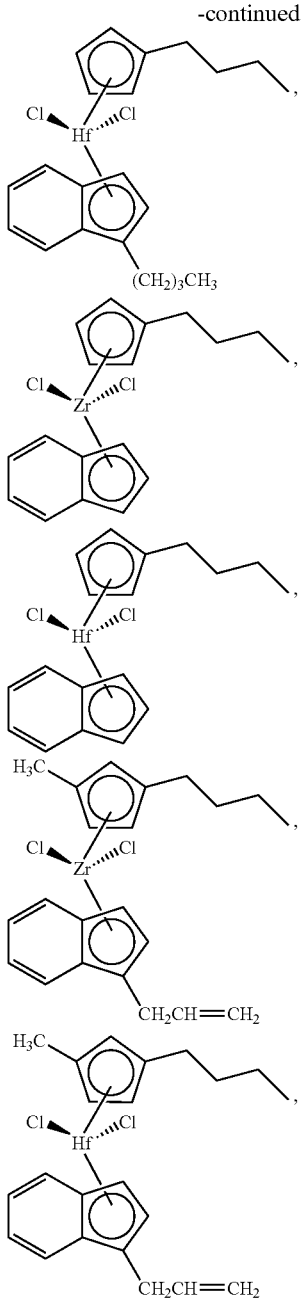

or any combination thereof.

9. The method of claim 1, wherein the at least one organoaluminum compound comprises trimethylaluminum, triethylaluminum, tripropylaluminum, tributylaluminum, triisobutylaluminum, trihexylaluminum, trioctylaluminum, diethylaluminum ethoxide, diisobutylaluminum hydride, diethylaluminum chloride, or any combination thereof.

10. The method of claim 1, wherein the at least one activator-support comprises a solid oxide treated with an electron-withdrawing anion, wherein:
the solid oxide is silica, alumina, silica-alumina, aluminophosphate, aluminum phosphate, zinc aluminate, heteropolytungstate, titania, zirconia, magnesia, boria, zinc oxide, mixed oxides thereof, or any combination thereof; and
the electron-withdrawing anion is fluoride, chloride, bromide, iodide, phosphate, triflate, bisulfate, sulfate, fluoroborate, fluorosulfate, trifluoroacetate, phosphate, fluorophosphate, fluorozirconate, fluorosilicate, fluorotitanate, permanganate, substituted or unsubstituted alkanesulfonate, substituted or unsubstituted arenesulfonate, or any combination thereof.

11. The method of claim 1, wherein the at least one activator-support comprises chlorided alumina, fluorided alumina, fluorided aluminophosphate, sulfated alumina, fluorided silica-alumina, or any combination thereof.

12. The method of claim 1, wherein:
a) the at least one first metallocene comprises a compound having the formula:

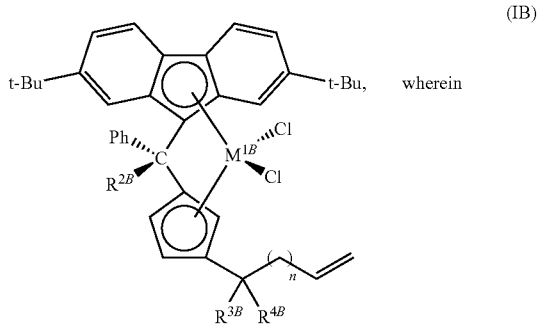

(IB)

wherein $M^{1B}$ is zirconium or hafnium;
$R^{2B}$ is methyl or phenyl;
$R^{3B}$ and $R^{4B}$ are independently H or $CH_3$; and
n is an integer from 0 to 5, inclusive;
b) the at least one second metallocene comprises a compound having the formula:
i)

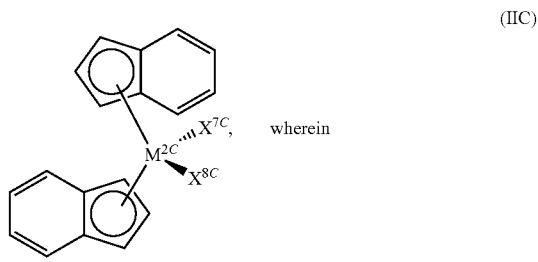

(IIC)

wherein $M^{2C}$ is zirconium or hafnium; and
$X^{7C}$ and $X^{8C}$ are independently benzyl, Cl, or methyl;
ii)

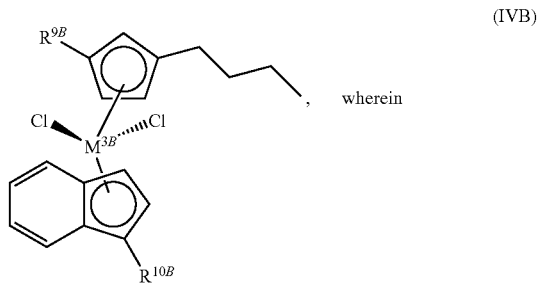

(IVB)

wherein $M^{3B}$ is zirconium or hafnium;
$R^{9B}$ is H or $CH_3$; and $R^{10B}$ is H, $CH_2CH=CH_2$, $CH_2CH_2CH=CH_2$, $CH_2CH_2CH_2Ph$, or $CH_2CH_2CH_2CH_3$;

or iii) any combination thereof.

13. The method of claim 1, wherein:

a) the at least one first metallocene comprises a compound having the formula:

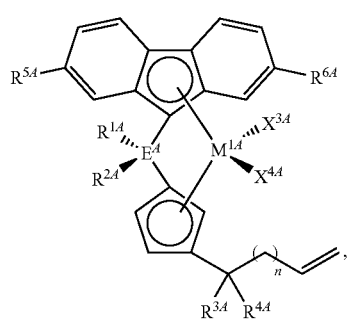
(IA)

wherein $M^{1A}$ is zirconium or hafnium;

$X^{3A}$ and $X^{4A}$ are independently F, Cl, Br, I, benzyl, phenyl, or methyl;

$E^A$ is C or Si;

$R^{1A}$ and $R^{2A}$ are independently an alkyl group or an aryl group, either of which having up to 12 carbon atoms, or hydrogen, wherein at least one of $R^{1A}$ and $R^{2A}$ is an aryl group;

$R^{3A}$ and $R^{4A}$ are independently H or $CH_3$;

n is an integer from 0 to 5, inclusive; and $R^{5A}$ and $R^{6A}$ are independently an aliphatic group, an aromatic group, a cyclic group, a combination of aliphatic and cyclic groups, an oxygen group, a sulfur group, a nitrogen group, a phosphorus group, an arsenic group, a carbon group, a silicon group, or a boron group, any of which having from 1 to 12 carbon atoms; or hydrogen;

b) the at least one second metallocene comprises a compound having the formula:

i)

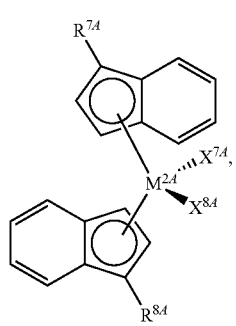
(IIA)

-continued

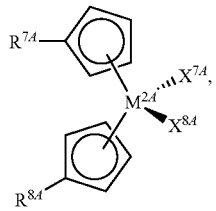
(IIIA)

or any combination thereof, wherein $M^{2A}$ is independently, zirconium or hafnium;

$X^{7A}$ and $X^{8A}$, in each occurrence, are independently F, Cl, Br, I, benzyl, phenyl, or methyl; and $R^{7A}$ and $R^{8A}$, in each occurrence, are independently H, methyl, ethyl, n-propyl, n-butyl, n-pentyl, $CH_2CH_2CH_2Ph$, $CH_2CH=CH_2$, $CH_2CH_2CH=CH_2$, or $CH_2CH_2CH_2CH=CH_2$;

ii)

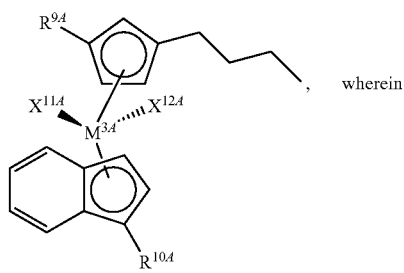
(IVA)

wherein $M^{3A}$ is zirconium or hafnium;

$R^{9A}$ is H or $CH_3$;

$R^{10A}$ is H, $CH_2CH=CH_2$, $CH_2CH_2CH=CH_2$, $CH_2CH_2CH_2CH=CH_2$, $CH_2CH_2CH_2Ph$, or $CH_2CH_2CH_2CH_3$; and $X^{11A}$ and $X^{12A}$ are independently F, Cl, Br, I, benzyl, phenyl, or methyl;

or iii) any combination thereof c) the at least one organoaluminum compound comprises trimethylaluminum, triethylaluminum, tripropylaluminum, tributylaluminum, triisobutylaluminum, trihexylaluminum, trioctylaluminum, diethylaluminum ethoxide, diisobutylaluminum hydride, diethylaluminum chloride, or any combination thereof and d) the at least one activator-support comprises a solid oxide treated with an electron-withdrawing anion, wherein:

the solid oxide is silica, alumina, silica-alumina, aluminophosphate, aluminum phosphate, zinc aluminate, heteropolytungstate, titania, zirconia, magnesia, boria, zinc oxide, mixed oxides thereof, or any combination thereof and the electron-withdrawing anion is fluoride, chloride, bromide, iodide, phosphate, triflate, bisulfate, sulfate, fluoroborate, fluorosulfate, trifluoroacetate, phosphate, fluorophosphate, fluorozirconate, fluorosilicate, fluorotitanate, permanganate, substituted or unsubstituted alkanesulfonate, substituted or unsubstituted arenesulfonate, or any combination thereof.

14. The method of claim 1, wherein:
a) the at least one first metallocene comprises:
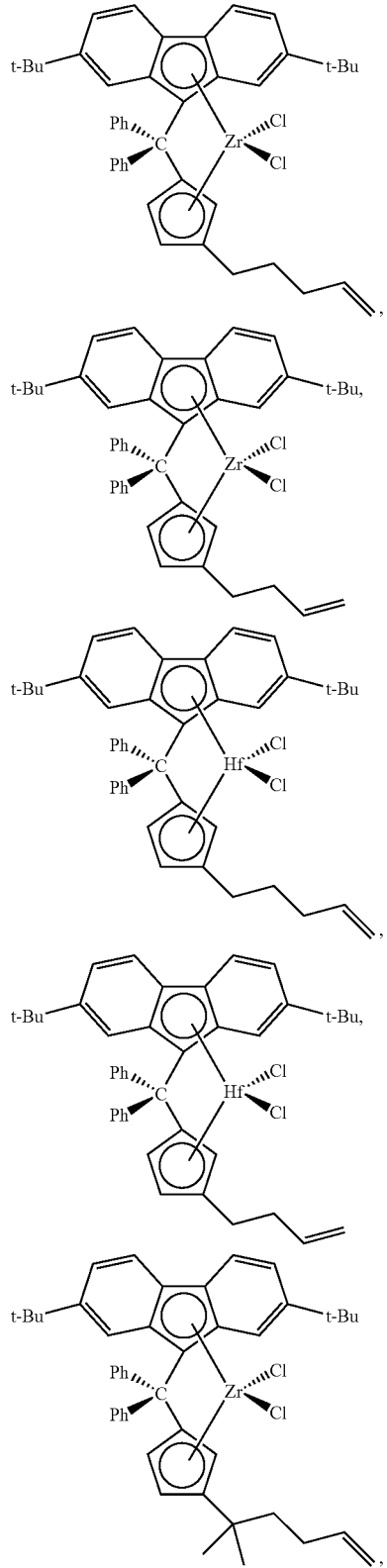
or any combination thereof;
b) the at least one second metallocene comprises:
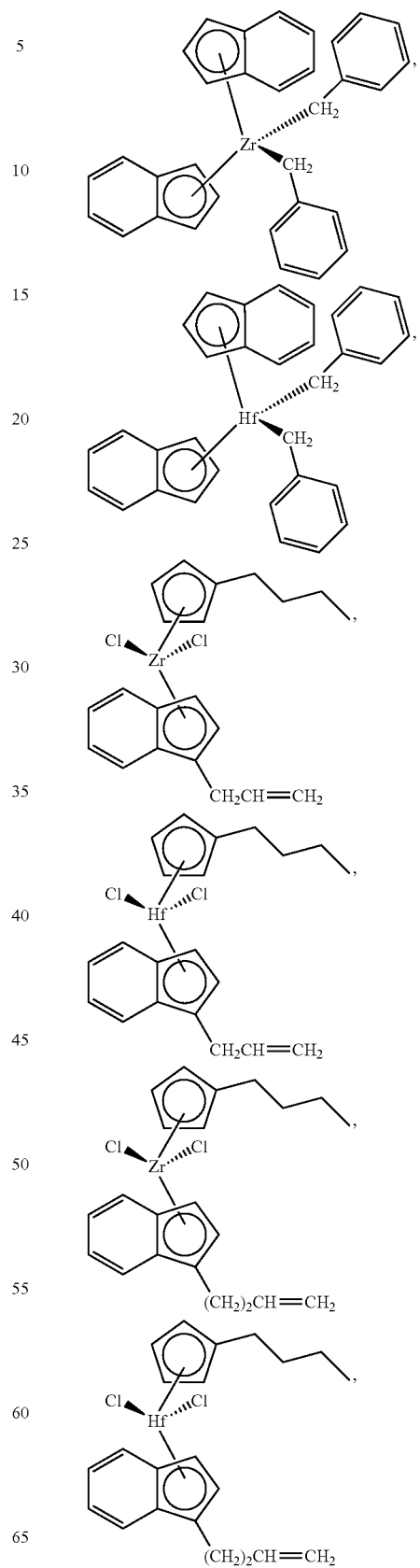

99

-continued

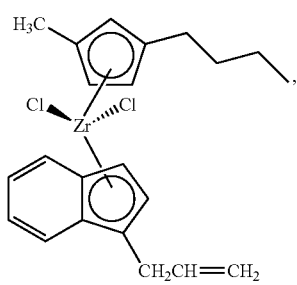

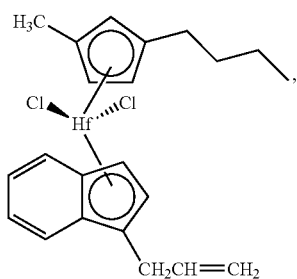

or any combination thereof;

c) the at least one organoaluminum compound comprises triethylaluminum, tri-n-butylaluminum, triisobutylaluminum, or any combination thereof; and
d) the at least one activator-support comprises a sulfated solid oxide.

15. The method of claim 1, wherein:

a) the at least one first metallocene is:

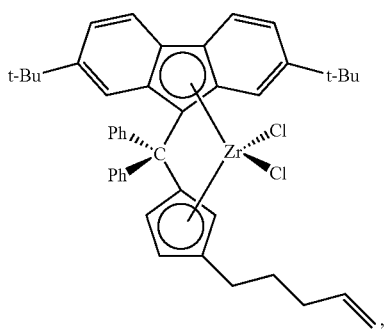

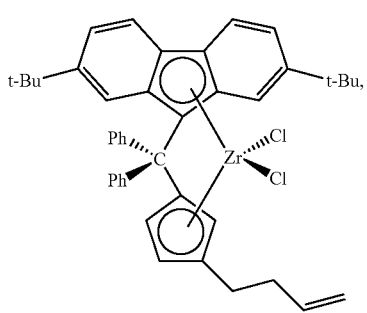

100

-continued

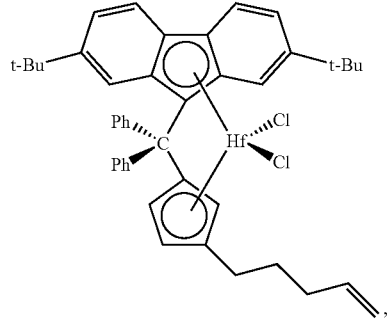

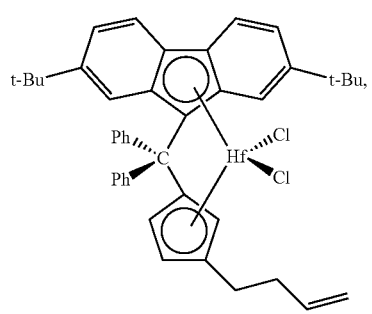

or any combination thereof;

b) the at least one second metallocene is:

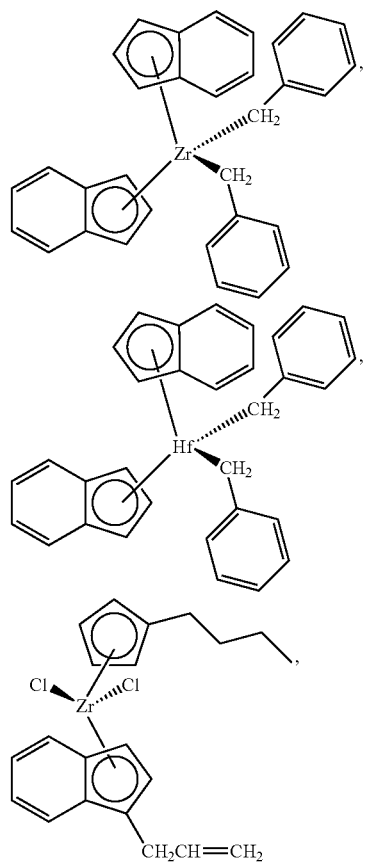

-continued

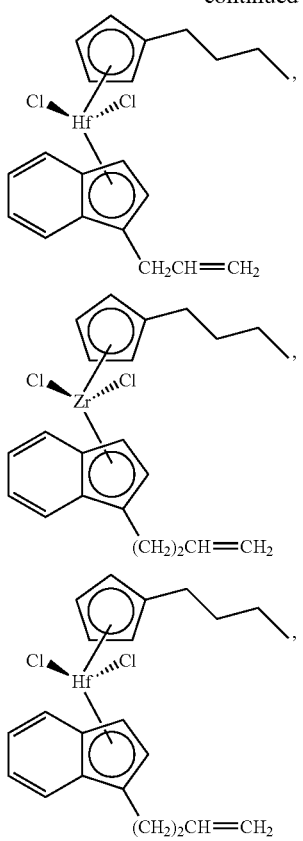

or any combination thereof;

c) the at least one organoaluminum compound comprises triethylaluminum, tri-n-butylaluminum, triisobutylaluminum, or any combination thereof; and
d) the at least one activator-support comprises sulfated alumina.

16. The method of claim 1, wherein:

a) the at least one first metallocene comprises a compound having the formula:

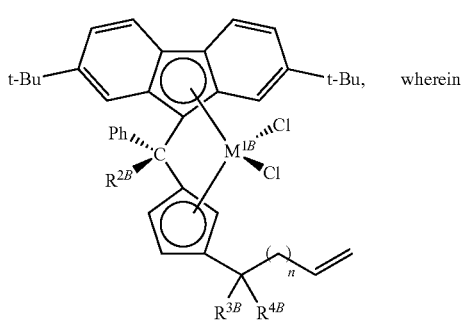

(IB)

wherein $M^{1B}$ is zirconium or hafnium;
$R^{2B}$ is methyl or phenyl;
$R^{3B}$ and $R^{4B}$ are independently H or $CH_3$; and
n is an integer from 0 to 5, inclusive;

b) the at least one second metallocene comprises a compound having the formula:

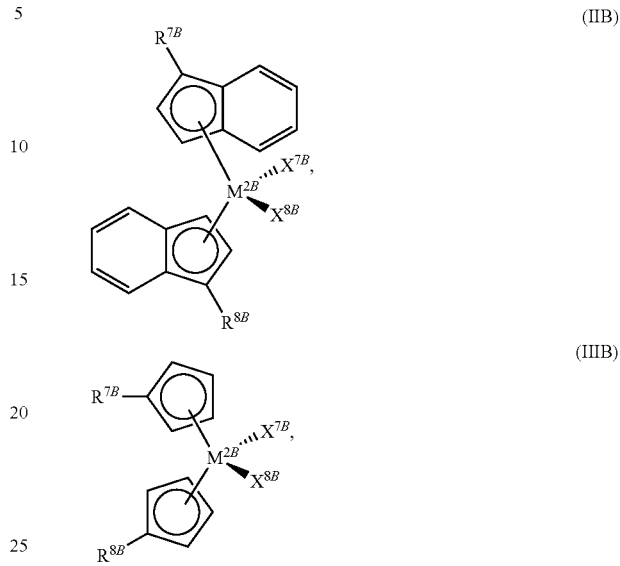

(IIB)

(IIIB)

or any combination thereof, wherein $M^{2B}$ is zirconium or hafnium;
$X^{7B}$ and $X^{8B}$ are independently benzyl, Cl, or methyl; and
$R^{7B}$ and $R^{8B}$ are independently H, methyl, ethyl, n-propyl, n-butyl, $CH_2CH{=}CH_2$, $CH_2CH_2CH{=}CH_2$, or $CH_2CH_2CH_2CH{=}CH_2$;

c) the at least one activator-support is chlorided alumina, fluorided alumina, sulfated alumina, fluorided silica-alumina, or any combination thereof; and
d) the at least one organoaluminum compound is triethylaluminum, tributylaluminum, triisobutylaluminum, or any combination thereof.

17. The method of claim 1, wherein:

a) the at least one first metallocene comprises a compound having the formula:

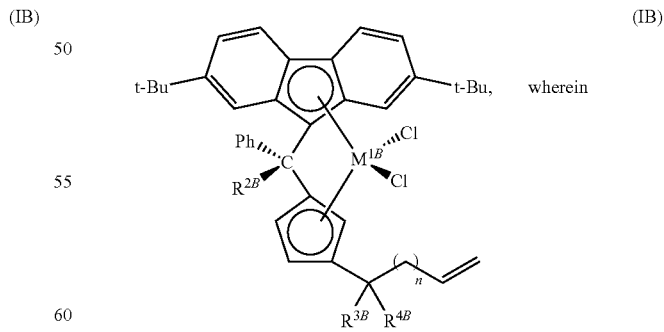

(IB)

wherein $M^{1B}$ is zirconium or hafnium;
$R^{2B}$ is methyl or phenyl;
$R^{3B}$ and $R^{4B}$ are independently H or $CH_3$; and
n is an integer from 0 to 5, inclusive;

b) the at least one second metallocene comprises a compound having the formula:

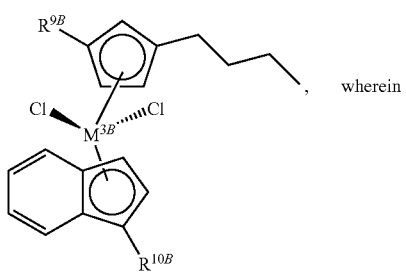
, wherein $M^{3B}$ is zirconium or hafnium;
$R^{9B}$ is H or $CH_3$; and
$R^{10B}$ is H, $CH_2CH=CH_2$, $CH_2CH_2CH=CH_2$, $CH_2CH_2CH_2Ph$, or $CH_2CH_2CH_2CH_3$;
c) the at least one activator-support is chlorided alumina, fluorided alumina, sulfated alumina, fluorided silica-alumina, or any combination thereof; and
d) the at least one organoaluminum compound is triethylaluminum, tributylaluminum, triisobutylaluminum, or any combination thereof.

18. The method of claim 1, wherein the at least one first metallocene comprises a compound having the formula:

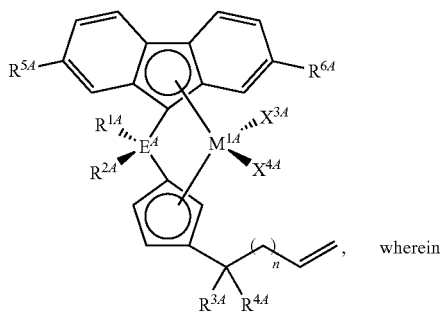
, wherein $M^{1A}$ is titanium, zirconium, or hafnium;
$X^{3A}$ and $X^{4A}$ are independently Cl or Ph;
$E^A$ is C or Si;
$R^{1A}$ and $R^{2A}$ are Ph;
$R^{3A}$ and $R^{4A}$ are independently H or $CH_3$;
n is an integer from 0 to 5, inclusive; and
$R^{5A}$ and $R^{6A}$ are t-Bu.

19. A method of polymerizing olefins, comprising:
contacting an olefin monomer and an optional α-olefin comonomer with a catalyst composition under polymerization conditions to form a polymer or copolymer;
wherein the catalyst composition comprises a contact product of: 1) at least one first metallocene; 2) at least one second metallocene; 3) at least one organoaluminum compound; and 4) at least one activator-support, wherein:
a) the at least one first metallocene comprises an ansa-metallocene having the formula:

$(X^1)(X^2)(X^3)(X^4)M^1$ (M1-A), wherein $M^1$ is titanium, zirconium, or hafnium;
$(X^1)$ and $(X^2)$ are independently a substituted cyclopentadienyl, a substituted indenyl, or a substituted fluorenyl;

one substituent on $(X^1)$ and $(X^2)$ is a bridging group having the formula $ER^1R^2$, wherein E is a carbon atom, a silicon atom, a germanium atom, or a tin atom, and E is bonded to both $(X^1)$ and $(X^2)$, and wherein $R^1$ and $R^2$ are independently an alkyl group or an aryl group, either of which having up to 12 carbon atoms, or hydrogen, wherein at least one of $R^1$ and $R^2$ is an aryl group;
at least one substituent on $(X^1)$ or $(X^2)$ is a substituted or an unsubstituted alkenyl group having up to 12 carbon atoms;
$(X^3)$ and $(X^4)$ are independently: 1) F, Cl, Br, or I; 2) a hydrocarbyl group having up to 20 carbon atoms, H, or $BH_4$; 3) a hydrocarbyloxide group, a hydrocarbylamino group, or a trihydrocarbylsilyl group, any of which having up to 20 carbon atoms; or 4) $OBR^A{}_2$ or $SO_3R^A$, wherein $R^A$ is an alkyl group or an aryl group, any of which having up to 12 carbon atoms; and
any additional substituent on the substituted cyclopentadienyl, substituted indenyl, substituted fluorenyl, or substituted alkenyl group is independently an aliphatic group, an aromatic group, a cyclic group, a combination of aliphatic and cyclic groups, an oxygen group, a sulfur group, a nitrogen group, a phosphorus group, an arsenic group, a carbon group, a silicon group, or a boron group, any of which having from 1 to 20 carbon atoms; a halide; or hydrogen;
b) the at least one second metallocene comprises an unbridged metallocene having the formula:

i) $(X^5)(X^6)(X^7)(X^8)M^2$ (M2-A), wherein $M^2$ is titanium, zirconium, or hafnium;
$(X^5)$ and $(X^6)$ are independently a cyclopentadienyl, an indenyl, a substituted cyclopentadienyl, or a substituted indenyl;
$(X^7)$ and $(X^8)$ are independently: 1) F, Cl, Br, or I; 2) a hydrocarbyl group having up to 20 carbon atoms, H, or $BH_4$; 3) a hydrocarbyloxide group, a hydrocarbylamino group, or a trihydrocarbylsilyl group, any of which having up to 20 carbon atoms; or 4) $OBR^B{}_2$ or $SO_3R^B$, wherein $R^B$ is an alkyl group or an aryl group, any of which having up to 12 carbon atoms; and
any substituent on the substituted cyclopentadienyl or substituted indenyl is independently an aliphatic group, an aromatic group, a cyclic group, a combination of aliphatic and cyclic groups, an oxygen group, a sulfur group, a nitrogen group, a phosphorus group, an arsenic group, a carbon group, a silicon group, or a boron group, any of which having from 1 to 20 carbon atoms; a halide; or hydrogen;

ii) $(X^9)(X^{10})(X^{11})(X^{12})M^3$ (M3-A), wherein $M^3$ is titanium, zirconium, or hafnium;
$(X^9)$ is a substituted cyclopentadienyl group, wherein one substituent is an aliphatic group, an aromatic group, or a combination of aliphatic and cyclic groups, any of which having up to 20 carbon atoms;
$(X^{10})$ is a substituted indenyl group, wherein one substituent is an aliphatic group, an aromatic group, or a combination of aliphatic and cyclic groups, any of which having up to 20 carbon atoms;
$(X^{11})$ and $(X^{12})$ are independently: 1) F, Cl, Br, or I; 2) a hydrocarbyl group having up to 20 carbon atoms, H, or $BH_4$; 3) a hydrocarbyloxide group, a hydrocarbylamino group, or a trihydrocarbylsilyl group, any of which having up to 20 carbon atoms; or 4) $OBR^C{}_2$ or SO$_3$R$^C$, wherein R$^C$ is an alkyl group or an aryl group, any of which having up to 12 carbon atoms; and any additional substituent on the substituted cyclopentadienyl or substituted indenyl is independently an aliphatic group, an aromatic group, a cyclic group, a combination of aliphatic and cyclic groups, an oxygen group, a sulfur group, a nitrogen group, a phosphorus group, an arsenic group, a carbon group, a silicon group, or a boron group, any of which having from 1 to 20 carbon atoms; a halide; or hydrogen;

or iii) any combination thereof;

c) the at least one organoaluminum compound comprises a compound having the formula:

Al(X$^{13}$)$_n$(X$^{14}$)$_{3-n}$, wherein (X$^{13}$) is a hydrocarbyl having from 1 to 20 carbon atoms; (X$^{14}$) is an alkoxide or an aryloxide, any of which having from 1 to 20 carbon atoms, halide, or hydride; and n is a number from 1 to 3, inclusive; and d) the at least one activator-support comprises a solid oxide treated with an electron-withdrawing anion, wherein:

the solid oxide is silica, alumina, silica-alumina, aluminophosphate, aluminum phosphate, zinc aluminate, heteropolytungstate, titania, zirconia, magnesia, boria, zinc oxide, mixed oxides thereof, or any combination thereof; and the electron-withdrawing anion is fluoride, chloride, bromide, iodide, phosphate, triflate, bisulfate, sulfate, fluoroborate, fluorosulfate, trifluoroacetate, phosphate, fluorophosphate, fluorozirconate, fluorosilicate, fluorotitanate, permanganate, substituted or unsubstituted alkanesulfonate, substituted or unsubstituted arenesulfonate, or any combination thereof.

20. The method of claim 19, wherein:

a) the at least one first metallocene comprises a compound having the formula:

(IA)

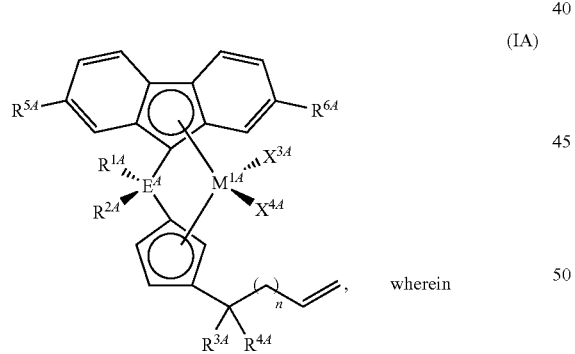

wherein

M$^{1A}$ is zirconium or hafnium;
X$^{3A}$ and X$^{4A}$ are independently F, Cl, Br, I, benzyl, phenyl, or methyl;
E$^A$ is C or Si;
R$^{1A}$ and R$^{2A}$ are independently an alkyl group or an aryl group, either of which having up to 12 carbon atoms, or hydrogen, wherein at least one of R$^{1A}$ and R$^{2A}$ is an aryl group;
R$^{3A}$ and R$^{4A}$ are independently H or CH$_3$;
n is an integer from 0 to 5, inclusive; and
R$^{5A}$ and R$^{6A}$ are independently an aliphatic group, an aromatic group, a cyclic group, a combination of aliphatic and cyclic groups, an oxygen group, a sulfur group, a nitrogen group, a phosphorus group, an arsenic group, a carbon group, a silicon group, or a boron group, any of which having from 1 to 12 carbon atoms; or hydrogen;

b) the at least one second metallocene comprises a compound having the formula:

i)

(IIA)

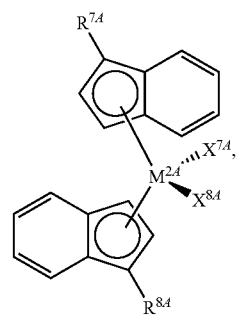

(IIIA)

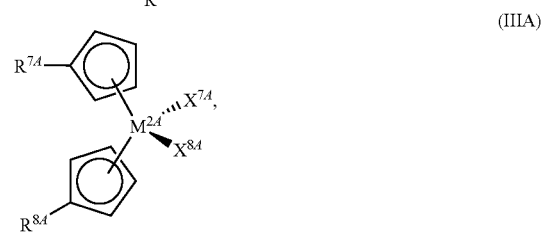

or any combination thereof, wherein

M$^{2A}$ is, independently, zirconium or hafnium;
X$^{7A}$ and X$^{8A}$, in each occurrence, are independently F, Cl, Br, I, benzyl, phenyl, or methyl; and
R$^{7A}$ and R$^{8A}$, in each occurrence, are independently H, methyl, ethyl, n-propyl, n-butyl, n-pentyl, CH$_2$CH$_2$CH$_2$Ph, CH$_2$CH=CH$_2$, CH$_2$CH$_2$CH=CH$_2$, or CH$_2$CH$_2$CH$_2$CH=CH$_2$;

ii)

(IVA)

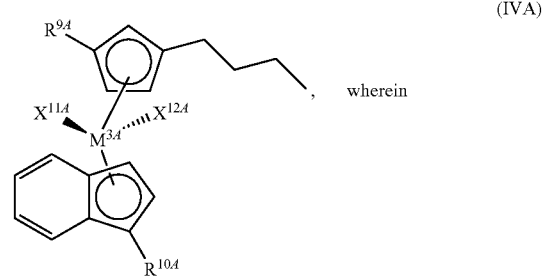

, wherein

M$^{3A}$ is zirconium or hafnium;
R$^{9A}$ is H or CH$_3$;
R$^{10A}$ is H, CH$_2$CH=CH$_2$, CH$_2$CH$_2$CH=CH$_2$, CH$_2$CH$_2$CH$_2$CH=CH$_2$, CH$_2$CH$_2$CH$_2$Ph, or CH$_2$CH$_2$CH$_2$CH$_3$; and
X$^{11A}$ and X$^{12A}$ are independently F, Cl, Br, I, benzyl, phenyl, or methyl;

or iii) any combination thereof; and c) the at least one organoaluminum compound comprises trimethylaluminum, triethylaluminum, tripropylaluminum, tributylaluminum, triisobutylaluminum, trihexylaluminum, trioctylaluminum, diethylaluminum ethoxide, diisobutylaluminum hydride, diethylaluminum chloride, or any combination thereof.

21. The method of claim 1, wherein the olefin monomer is ethylene, propylene, 1-butene, 2-butene, 3-methyl-1-butene, isobutylene, 1-pentene, 2-pentene, 3-methyl-1-pentene, 4-methyl-1-pentene, 1-hexene, 2-hexene, 3-hexene, 3-ethyl-1-hexene, 1-heptene, 2-heptene, 3-heptene, a normal octene, a normal nonene, a normal decene, or a combination thereof.

22. The method of claim 1, wherein the olefin monomer is ethylene and the optional α-olefin comonomer is propylene, 1-butene, 1-pentene, 1-hexene, 1-octene, or 1-decene.

23. The method of claim 1, wherein the method is conducted in a slurry reactor, a gas phase reactor, a solution reactor, a high pressure tubular reactor, a high pressure autoclave reactor, or a combination thereof.

24. The method of claim 2, wherein the olefin monomer is ethylene, propylene, 1-butene, 2-butene, 3-methyl-1-butene, isobutylene, 1-pentene, 2-pentene, 3-methyl-1-pentene, 4-methyl-1-pentene, 1-hexene, 2-hexene, 3-hexene, 3-ethyl-1-hexene, 1-heptene, 2-heptene, 3-heptene, a normal octene, a normal nonene, a normal decene, or a combination thereof.

25. The method of claim 2, wherein the olefin monomer is ethylene and the optional α-olefin comonomer is propylene, 1-butene, 1-pentene, 1-hexene, 1-octene, or 1-decene.

26. The method of claim 2, wherein the method is conducted in a slurry reactor, a gas phase reactor, a solution reactor, a high pressure tubular reactor, a high pressure autoclave reactor, or a combination thereof.

27. The method of claim 19, wherein the olefin monomer is ethylene, propylene, 1-butene, 2-butene, 3-methyl-1-butene, isobutylene, 1-pentene, 2-pentene, 3-methyl-1-pentene, 4-methyl-1-pentene, 1-hexene, 2-hexene, 3-hexene, 3-ethyl-1-hexene, 1-heptene, 2-heptene, 3-heptene, a normal octene, a normal nonene, a normal decene, or a combination thereof.

28. The method of claim 19, wherein the olefin monomer is ethylene and the optional α-olefin comonomer is propylene, 1-butene, 1-pentene, 1-hexene, 1-octene, or 1-decene.

29. The method of claim 19, wherein the method is conducted in a slurry reactor, a gas phase reactor, a solution reactor, a high pressure tubular reactor, a high pressure autoclave reactor, or a combination thereof.

* * * * *

UNITED STATES PATENT AND TRADEMARK OFFICE
CERTIFICATE OF CORRECTION

| | | |
|---|---|---|
| PATENT NO. | : 7,960,487 B2 | Page 1 of 1 |
| APPLICATION NO. | : 12/571824 | |
| DATED | : June 14, 2011 | |
| INVENTOR(S) | : Qing Yang et al. | |

It is certified that error appears in the above-identified patent and that said Letters Patent is hereby corrected as shown below:

Column 5, line 67:     "condions" should be changed to --conditions--
Column 46, line 51:    "many be" should be changed to --may be--
Column 96, line 14:    "is independently," should be changed to --is, independently,--
Column 96, line 46:    "thereof" should be changed to --thereof;--

Signed and Sealed this
Seventeenth Day of January, 2012

David J. Kappos
*Director of the United States Patent and Trademark Office*